(12) United States Patent
Cherkaoui et al.

(10) Patent No.: US 7,959,990 B2
(45) Date of Patent: Jun. 14, 2011

(54) FUNCTIONALIZED PHOTOREACTIVE COMPOUNDS

(75) Inventors: Zoubair Mohammed Cherkaoui, Niederdorf (CH); Peggy Studer, Huningue (FR); Joachim Reichardt, Grenzach-Wyhlen (DE); Hubert Seiberle, Weil am Rhein (DE)

(73) Assignee: Rolic AG, Zug (CH)

(*) Notice: Subject to any disclaimer, the term of this patent is extended or adjusted under 35 U.S.C. 154(b) by 287 days.

(21) Appl. No.: 12/067,376

(22) PCT Filed: Sep. 15, 2006

(86) PCT No.: PCT/CH2006/000499
§ 371 (c)(1),
(2), (4) Date: Mar. 19, 2008

(87) PCT Pub. No.: WO2007/033506
PCT Pub. Date: Mar. 29, 2007

(65) Prior Publication Data
US 2008/0274304 A1      Nov. 6, 2008

(30) Foreign Application Priority Data
Sep. 20, 2005 (EP) .................... 05405549

(51) Int. Cl.
C09K 19/00 (2006.01)
C09K 19/06 (2006.01)
C09K 19/52 (2006.01)

(52) U.S. Cl. ............. 428/1.3; 430/1.1; 430/1.2; 430/20; 252/299.01; 252/299.6

(58) Field of Classification Search ............ 428/1.1–1.3; 430/20, 270.1; 252/299.01, 299.1, 299.6
See application file for complete search history.

(56) References Cited

U.S. PATENT DOCUMENTS

| | | | |
|---|---|---|---|
| 4,107,189 A | 8/1978 | Van der Veen et al. | |
| 5,398,698 A | 3/1995 | Hiller et al. | |
| 5,539,074 A | 7/1996 | Herr et al. | |
| 5,582,882 A | 12/1996 | Kang et al. | |
| 5,602,661 A | 2/1997 | Schadt et al. | |
| 5,838,407 A | 11/1998 | Chigrinov et al. | |
| 6,107,427 A | 8/2000 | Herr et al. | |
| 6,160,597 A | 12/2000 | Schadt et al. | |
| 6,201,087 B1 | 3/2001 | Herr et al. | |
| 6,215,539 B1 | 4/2001 | Schadt et al. | |
| 6,300,991 B1 | 10/2001 | Schadt et al. | |
| 6,340,506 B1 | 1/2002 | Buchecker et al. | |
| 6,369,869 B2 | 4/2002 | Schadt et al. | |
| 6,608,661 B1 | 8/2003 | Schadt et al. | |
| 6,632,909 B2 | 10/2003 | Buchecker et al. | |
| 6,649,230 B1 | 11/2003 | Seiberle et al. | |
| 6,717,644 B2 | 4/2004 | Schadt et al. | |
| 6,833,421 B1 | 12/2004 | Marck | |
| 7,491,752 B2 * | 2/2009 | Marck et al. ............ 522/178 |

FOREIGN PATENT DOCUMENTS

| | | |
|---|---|---|
| EP | 0611786 A1 | 8/1994 |
| GB | 1376115 | 12/1974 |
| GB | 1376115 A | 12/1974 |
| JP | 58-71905 * | 4/1983 |
| JP | 63-175834 A | 7/1988 |
| WO | 00/59966 | 10/2000 |
| WO | 01/53384 | 7/2001 |
| WO | 02/053609 | 7/2002 |
| WO | 03/008472 | 1/2003 |
| WO | 2004/060861 | 7/2004 |

OTHER PUBLICATIONS

Schadt M, et al., "Surface-Induced Parallel Alignment of Liquid Crystals by Linearly Polymerized Photopolymers", Japanese Journal of Applied Physics, Japan Society of Applied Physics, Jul. 1992, pp. 2155-2164, vol. 31, No. 7 Part 1.

Martin Schadt, et al., "Surface-Induced Parallel Alignment of Liquid Crystals by Linearly Polymerized Photopolymers", Jpn. J. Appl. Phys. vol. 31, Jul. 1992, Pt. 1, No. 7, pp. 2155-2164.

Taiwanese Search Report, dated Sep. 22, 2009 (corresponding to Taiwanese Patent Application No. 95134565).

* cited by examiner

*Primary Examiner* — Geraldina Visconti
(74) *Attorney, Agent, or Firm* — Sughrue Mion, PLLC

(57) ABSTRACT

The present invention concerns functionalized photoreactive compounds of formula (I), that are particularly useful in materials for the alignment of liquid crystals. Due to the adjunction of an electron withdrawing group to specific molecular systems bearing an unsaturation directly attached to two unsaturated ring systems, exceptionally high photosensitivities, excellent alignment properties as well as good mechanical robustness could be achieved in materials comprising said functionalized photoreactive compounds of the invention.

(I)

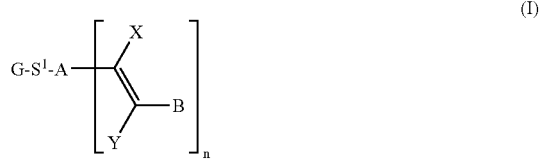

29 Claims, 1 Drawing Sheet

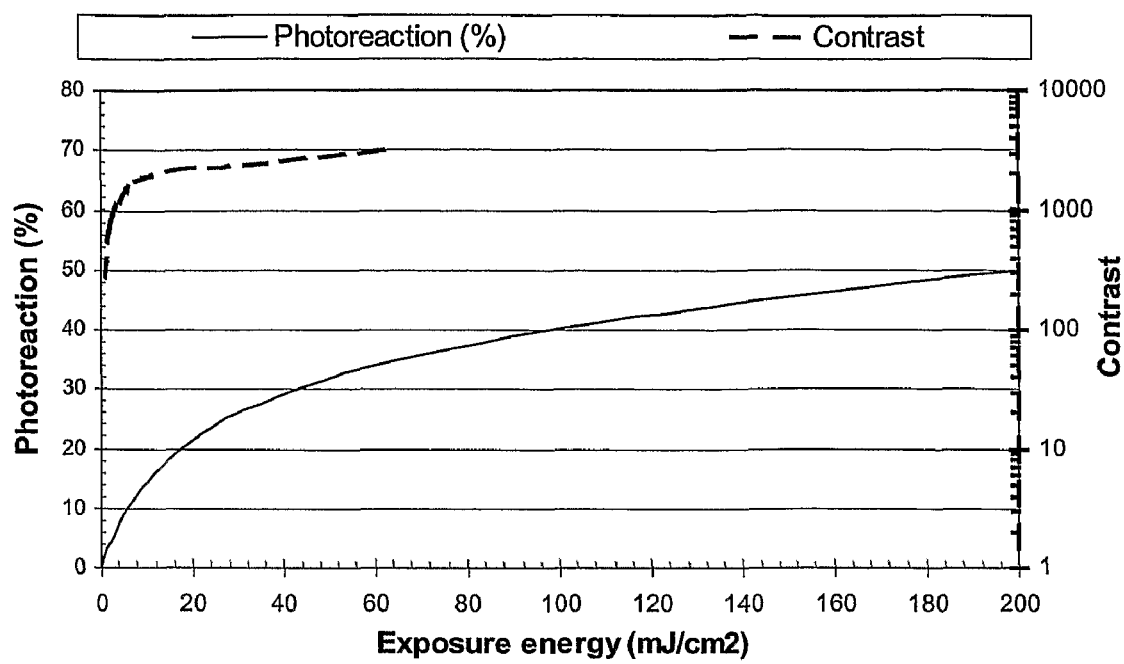
Figure 1: *Photoreactivity of 8-{4-[2-cyano-2-(3,4-dimethoxyphenyl)vinyl]-2-methoxyphenoxy}octyl polymethacrylate vs LPUV exposure energy*

FUNCTIONALIZED PHOTOREACTIVE COMPOUNDS

TECHNICAL FIELD

The present invention concerns functionalized photoreactive compounds that are particularly useful in materials for the alignment of liquid crystals.

BACKGROUND OF THE INVENTION

Liquid crystal devices are more and more used in many different applications. Examples are liquid crystal displays (LCD) and optical films, in particular polarizing films and retardation films, as well as security devices for preventing forgery, counterfeiting and copying.

The successful functioning and performance of a liquid crystal device relies on the ability of the liquid crystal molecules within that device to adopt and maintain an alignment imposed upon them. Alignment of the liquid crystal molecules is achieved by use of an alignment layer which defines a direction of orientation for the liquid crystal molecules with the result that the longitudinal axes of the molecules become aligned with the direction of orientation defined by the alignment layer. In addition to this directional alignment, for some applications the alignment layer should also be able to impart to the liquid crystal molecules an angle of tilt so that the molecules align themselves at an angle out of the surface of the alignment layer.

A well known method for preparing alignment layers is a rubbing treatment wherein a high molecular resin film such as polyimide is rubbed in a single direction with a cloth. The liquid crystal molecules adjacent to the rubbed surface are aligned in the rubbing direction. However, alignment films formed by rubbing have some disadvantages like dust generation and scratches, which occur during the rubbing process. In addition, rubbing methods are not adequate for the production of structured layers, i.e layers having small areas with different alignment directions.

These problems can be solved using liquid-crystal alignment control processes other than rubbing such as oblique deposition, photolithographic, Langmuir Blodgett film, ion irradiation, high velocity fluid jet and other processes. However, most of these processes are not practical for processing large-area substrates.

Other methods developed for the alignment of liquid crystals are alignment layers made by photo-orientation methods (usually using linearly polarized light), and especially well suited are linearly photo-polymerized (LPP) alignment layers, also known as photo-oriented polymer networks (PPN). Such methods are for instance disclosed in U.S. Pat. No. 5,389,698, U.S. Pat. No. 5,838,407, U.S. Pat. No. 5,602,661, U.S. Pat. No. 6,160,597, U.S. Pat. No. 6,369,869, U.S. Pat. No. 6,717,644, U.S. Pat. No. 6,215,539, U.S. Pat. No. 6,300,991, and U.S. Pat. No. 6,608,661.

These methods allow the generation of homogeneous alignment of liquid crystals. In the LPP process, which is a non-contact technique, alignment films similar to those obtained by rubbing can be obtained with high reproducibility by irradiating a photosensitive film on a large substrate area with polarized light. In addition, it is possible to vary the direction of orientation and the azimuthal and polar tilt angle within the photoreactive layer by controlling the direction of the irradiation of the linearly polarized light. By selectively irradiating specific regions of the photoreactive material, it is possible to align very specific regions of the layer and thus to provide alignment areas having different orientation which gives rise to structured alignment layer as described for example in Jpn. J. Appl. Phys., 31 (1992), 2155-64 (Schadt et al.).

SUMMARY OF THE INVENTION

For an efficient application process, photoalignment materials advantageously should have a high photosensitivity and a broad processing window. Especially interesting materials would develop similar alignment properties for a relatively large range of irradiation energy (i.e. a broad processing window with respect to the irradiation method) and irradiation frequencies (i.e. usable with different radiation sources).

It is thus an object of the present invention to provide such photoalignment materials.

The inventors have found that by the adjunction of an electron withdrawing group to specific molecular systems bearing an unsaturation directly attached to two unsaturated ring systems, exceptionally high photosensitivities could be achieved.

In addition to the good photosensitivity, also the alignment performance of these materials was found to be excellent.

As an illustration, the photoreactivity versus exposure energy of a specific compound according to the invention (the compound described under Example A1 below) is given in FIG. 1. It can be seen that already with an exposure energy of 20 mJ/cm$^2$ a very high photoreaction yield of 20% can be reached. Additionally indicated is the contrast of a liquid crystalline polymer layer oriented by the correspondingly exposed compound. The contrast is measured between polarizers and already with very low exposure energies reaches values of more than 2000 and thus illustrates the good alignment quality.

It has been found that the substitution pattern has a marked effect on the alignment properties of the material and selected substituents have been identified that are able to provide excellent alignment properties Furthermore, the high photoreaction yield also supports the formation of a good mechanical robustness in materials comprising functionalized photoreactive compounds according to the invention.

Moreover, the inventors were able to synthesize materials having various absorption properties which offer the possibility to better fit the absorption characteristics of these materials to the emission spectrum of the applied polarized light.

Also, many of the materials according to the present invention were found to have excellent alignment capability for cholesteric liquid crystals.

Thus the present invention relates in a first aspect to compounds according to the general formula (I)

wherein

A and B each independently are a ring system of 5 to 40 atoms, wherein each ring system includes at least one unsaturation directly connected via electron conjugation (π-π bonding) to the double bond shown in formula (I), wherein the ring system may be unsubstituted or mono- or poly-substituted by a halogen atom, a hydroxyl group and/or a polar group like nitro, nitrile or a carboxy group, and/or a cyclic, straight-chain or branched alkyl residue having from 1 to 30 carbon atoms, which is unsubstituted, mono- or poly-substituted by methyl, fluorine and/or chlorine, wherein one or more, preferably non-adjacent —$CH_2$— groups independently may be replaced by a group selected from —O—, —CO— —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —$Si(CH_3)_2$—O—$Si(CH_3)_2$—, an aromatic or an alicyclic group, wherein $R^1$ is a hydrogen atom or lower alkyl; and/or an acryloyloxy, alkoxy, alkylcarbonyloxy, alkyloxocarbonyloxy, methacryloyloxy, vinyl, allyl, vinyloxy and/or allyloxy group, having from 1 to 20 carbon atoms, preferably having from 1 to 10 carbon atoms, $S^1$ is a single covalent bond or a spacer unit;

n is 1, 2 or 3;

X and Y represent groups of which one is a hydrogen atom and the other is an electron withdrawing group, which preferably is selected from the groups —$COR^2$, —$COOR^2$, —$COSR^2$, —CO—$NR^2$, —$SOR^2$, —$SOCF_3$, —$SO_2CF_2COR^2$, —$SOOR^2$, —C≡S, —$NO_2$, —$CF_3$, —CN, wherein $R^2$ is a hydrogen atom or a straight-chain or branched alkyl or alkylene group, having from 1 to 16 carbon atoms, wherein one or more, preferably non-adjacent —$CH_2$— groups independently may be replaced by a group, selected from —O—, —CO—, —CO—O—, —O—CO—, —C=C—, —C≡C—, or by an optionally substituted alkyl, or by a polymerizable group, G is a hydrogen atom, optionally substituted alkyl, or a polymerizable group with the proviso, that when Y is —CN and A is unsubstituted phenylene, then B may not be phenylene para-substituted by —CN, —$NO_2$ or —COOH; and with the proviso that if ring system A is 1,4-phenylene, which is unsubstituted or substituted with halogen, cyano and/or nitro, and ring system B is 1,4-phenylene, which is unsubstituted or substituted with halogen, cyano and/or nitro, or pyrimidine-2,5-diyl, pyridine-2,5-diyl, 2,5-thiophenylene-diyl, 2,5-furanylene, 1,4-naphthylene or 2,6-naphthylene, then X is different from —CN and —COO-alkyl having from 1 to 12 carbon atoms.

Further embodiments of the present invention are outlined in the dependent claims.

In a further aspect, the functionalized photoreactive compounds are part of an oligomer, dendrimer or polymer, which may be a homopolymer or a copolymer. Said oligomer, dendrimer or polymer may be obtained by polymerization of the monomer of general formula (I) and may be in form of a gel or a network.

The invention relates in a further aspect to alignment layer materials comprising said functionalized photoreactive compounds according to the general formula (I) in monomeric, oligomeric, dendrimeric or polymeric form. Such alignment layer materials are particularly useful for the alignment of liquid crystals and polymerizable or crosslinkable liquid crystalline materials.

The invention relates in yet a further aspect to optical elements, e.g. polymerized or crosslinked films having a nematic, smectic or cholesteric order, and electro-optical elements, e.g. liquid crystal display cells, comprising an alignment layer made of a material comprising functionalized photoreactive compounds according to the general formula (I) in monomeric, oligomeric, dendrimeric or polymeric form.

In specific embodiments, the alignment layer has a pattern of different alignment directions, which pattern advantageously can be formed by photoalignment methods.

In a further aspect the invention also relates to the use of materials containing functionalized photoreactive compounds according to the general formula (I) for the preparation of alignment layers.

DETAILED DESCRIPTION OF THE INVENTION

Compounds according to the invention are compounds according to the general formula (I):

wherein

A and B each independently are a ring system of 5 to 40 atoms, wherein each ring system includes at least one unsaturation directly connected via electron conjugation (π-π bonding) to the double bond shown in formula (I), wherein the ring system may be unsubstituted or mono- or poly-substituted by a halogen atom, a hydroxyl group and/or a polar group like nitro, nitrile or a carboxy group, and/or a cyclic, straight-chain or branched alkyl residue having from 1 to 30 carbon atoms, which is unsubstituted, mono- or poly-substituted by methyl, fluorine and/or chlorine, wherein one or more, preferably non-adjacent —$CH_2$— groups independently may be replaced by a group selected from —O—, —CO— —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —$Si(CH_3)_2$—O—$Si(CH_3)_2$—, an aromatic or an alicyclic group, wherein $R^1$ is a hydrogen atom or lower alkyl; and/or an acryloyloxy, alkoxy, alkylcarbonyloxy, alkyloxocarbonyloxy, methacryloyloxy, vinyl, allyl, vinyloxy and/or allyloxy group, having from 1 to 20 carbon atoms, preferably having from 1 to 10 carbon atoms, $S^1$ is a single covalent bond or a spacer unit;

n is 1, 2 or 3;

X and Y represent groups of which one is a hydrogen atom and the other is an electron withdrawing group, which preferably is selected from the groups —$COR^2$, —$COOR^2$, —$COSR^2$, —CO—$NR^2$, —$SOR^2$, —$SOCF_3$, —$SO_2CF_2COR^2$, —$SOOR^2$, —C=S, —$NO_2$, —$CF_3$, —CN, wherein $R^2$ is a hydrogen atom or a straight-chain or branched alkyl or alkylene group, having from 1 to 16 carbon atoms, wherein one or more, preferably non-adjacent —$CH_2$— groups independently may be replaced by a group, selected from —O—, —CO—, —CO—O—, —O—CO—, —C=C—, —C≡C—, or by an optionally substituted alkyl, or by a polymerizable group, G is a hydrogen atom, optionally substituted alkyl, or a polymerizable group with the proviso, that when Y is —CN and A is unsubstituted phenylene, then B may not be phenylene para-substituted by —CN, —$NO_2$ or —COOH; and with the proviso that if ring system A is 1,4-phenylene, which is unsubstituted or substituted with halogen, cyano and/or nitro, and ring system B is 1,4-phenylene, which is unsubstituted or substituted with halogen, cyano and/or nitro, or pyrimidine-2,5-diyl, pyridine-2,5-diyl, 2,5-thiophenylene-diyl, 2,5-furanylene, 1,4-naphthylene or 2,6-naphthylene, then X is different from —CN and —COO-alkyl having from 1 to 12 carbon atoms.

In a further embodiment the present invention relates to compounds as defined herein above with the proviso that if ring systems A and B are independently selected from 1,4-phenylene, which is unsubstituted or substituted with halogen, cyano and/or nitro and in which 1 or 2 CH groups can be replaced by nitrogen, or 2,5-thiophenediyl, 2,5-furanylene, 1,4- or 2,6-naphthylene, in which a CH group can be replaced by nitrogen, then X or Y are different from —CN, —COO-alkyl having from 1 to 12 carbon atoms.

The compounds defined hereinabove distinguish themselves from compounds in the prior art, such as EP0611 786 B1, in that they show superior photosensitivity in combination with good alignment properties und good mechanical robustness. These properties are due to the very specific molecular arrangement of these compounds, which is characterized by a unique selection of specific substituents of electron withdrawing nature in combination with a specific extended conjugation system comprising two (at least partially) unsaturated ring systems linked by a double bond bearing said substituents. There has not been any report on compounds with such structural characteristics showing the above mentioned outstanding properties in the prior art.

It is understood that the wording "each ring system includes at least one unsaturation directly connected via electron conjugation (π-π bonding) to the double bond" indicates that each ring system A or B contains at least one unsaturated bond, i.e. double bond, that is directly linked to the double bond in formula (I) thereby extending the electron conjugation.

In a preferred embodiment ring systems A and B are a carbocyclic or heterocyclic ring group selected from a monocyclic ring of four to six atoms, or two adjacent monocyclic rings of five or six atoms, or a fused bicyclic ring system of eight, nine or ten atoms, or a fused tricyclic ring system of thirteen or fourteen atoms. More preferably ring systems A and B are selected from pyrimidine, pyridine, thiophenylene, furanylene, phenanthrylene, naphthylene, or phenylene.

In a further preferred embodiment $S^1$ is a single bond or a straight-chain or branched alkylene residue having 1 to 24, preferably 1 to 16, more preferably 1 to 12 carbon atoms, which is unsubstituted, mono-substituted by cyano or halogen, or poly-substituted by halogen and wherein one or more, preferably non-adjacent $CH_2$ groups independently may be replaced by a heteroatom or a group selected from but not limited to —O—, —CO— —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —C═C—, —C≡C—, —O—CO—O— and —Si(CH$_3$)$_2$—O—Si(CH$_3$)$_2$—, wherein $R^1$ is a hydrogen atom or lower alkyl.

More preferably $S^1$ is a single bond or a straight-chain or branched alkylene residue, having from 1 to 24, preferably from 1 to 16, more preferably from 1 to 12 carbon atoms, wherein one or more, preferably non-adjacent —CH$_2$— groups independently may be replaced by a group selected from —O—, —CO—, —COO—, —OCO—, —C═C—, —C≡C—.

In a further preferred embodiment the electron withdrawing groups for X and Y are —COR$^2$, —COOR$^2$, —SOCF$_3$, —NO$_2$, —CF$_3$, —CN, preferably —CN, —COR$^2$ or —COOR$^2$, more preferably —CN or —COOR$^2$, wherein $R^2$ is a hydrogen atom or a straight-chain or branched alkyl or alkylene group, having from 1 to 16, more preferably from 1 to 8 carbon atoms, wherein one or more, preferably non-adjacent —CH$_2$— groups independently may be replaced by a group, preferably selected from —O—, —CO—, —CO—O—, —O—CO—, —C═C—, —C≡C—, or by an optionally substituted alkyl, or by a polymerizable group.

In a further preferred embodiment the polymerizable group in X, Y and/or G is selected from acrylate, methacrylate, 2-chloroacrylate, 2-phenylacrylate, optionally N-lower alkyl substituted acrylamide, methacrylamide, 2-chloroacrylamide, 2-phenylacrylamide, vinyl ether and ester, allyl ether and ester epoxy, styrene and styrene derivatives, for example alpha-methylstyrene, p-methylstyrene, p-tert-butyl styrene, p-chlorostyrene, etc., siloxanes, imide monomers, amic acid monomers and their esters, amidimide monomers, maleic acid and maleic acid derivatives, for example, di-n-butyl maleate, dimethyl maleate, diethyl maleate, etc, fumaric acid and fumaric acid derivatives, for example, di-n-butyl fumarate, di-(2-ethylhexyl) fumarate, etc, urethanes or their corresponding homo- and co-polymers. More preferably the polymerizable group in X, Y and/or G is selected from acrylate, methacrylate, vinyl ether and ester, epoxy, styrene derivatives, siloxanes, imide monomers, amic acid monomers and their corresponding homo and copolymers.

In a yet a further embodiment

A is a ring system of formula (II):

  (II)

and

B is a ring system of formula (III):

  (III)

wherein:

$C^1$, $C^2$ each independently are a non-aromatic or aromatic, optionally substituted, carbocyclic or heterocyclic group of 5 to 14 atoms, preferably connected to each other at the opposite positions via the bridging groups $Z^1$ and $Z^2$, $Z^1$, $Z^2$ each independently are a single bond or a bridging group preferably selected from —CH(OH)—, —O—, —CH$_2$(CO)—, —SO—, —CH$_2$(SO)—, —SO$_2$—, —CH$_2$(SO$_2$)—, —COO—, —OCO—, —COF$_2$—, —CF$_2$CO—, —S—CO—, —CO—S—, —SOO—, —OSO—, —CH$_2$—CH$_2$—, —O—CH$_2$—, —CH$_2$O—, —CH═CH—, —C—S—, —SH═CH—COO—, —OCO—CH═CH—, —CH═N—, —C(CH$_3$)═N—, —O—CO—O—, —N═N—, or a short alkyl spacer of 1 to 6 carbon atoms, preferably 1 to 3 carbon atoms, a is 0, 1, 2 or 3, with the proviso that $C^2$, which is directly connected to the double bond, is unsaturated and conjugated to it.

The term "connected to each other at the opposite positions via the bridging groups $Z^1$ and $Z^2$" means that five- and six-memberd rings are preferably linked in 1,3- or 1,4-position and not in neighbouring 1,2-position. Analogous linking pattern in other e.g. higher membered rings will be obvious to a skilled person.

It is understood that ring system B has an analogous structure to ring system A of formula (II) with the exception that group B carries a terminal group. Thus, for a=0 group $C^2$ represents the terminal group and for a>0 groups $C^1$ are connected via the bridging groups $Z^1$, with the final group $C^1$ being the terminal group. Thus, for a=1 ring system B has the following formula

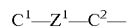

Likewise for a=2 or 3 ring system B has the following formula

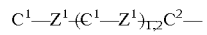

Preferred compounds are compounds according to the general formula (I) wherein

A is a ring system of formula (II):

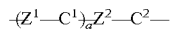 (II)

and

B is a ring system of formula (III):

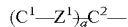 (III)

wherein:

$C^1$, $C^2$ each independently are a non-aromatic or aromatic, optionally substituted, carbocyclic or heterocyclic group of 5 to 14 atoms, preferably connected to each other at the opposite positions via the bridging groups $Z^1$ and $Z^2$, $Z^1$, $Z^2$ each independently are a single bond or a bridging group preferably selected from —CH(OH)—, —O—, —CH$_2$(CO)—, —SO—, —CH$_2$(SO)—, —SO$_2$—, —CH$_2$(SO$_2$)—, —COO—, —OCO—, —COF$_2$—, —CF$_2$CO—, —S—CO—, —CO—S—, —SOO—, —OSO—, —CH$_2$—CH$_2$—, —O—CH$_2$—, —CH$_2$O—, —CH=CH—, —C—S—, —SH=CH—COO—, —OCO—CH=CH—, —CH=N—, —C(CH$_3$)=N—, —O—CO—O—, —N=N—, or a short alkyl spacer of 1 to 6 carbon atoms, preferably 1 to 3 carbon atoms, a is 0, 1, 2 or 3, with the proviso that $C^2$, which is directly connected to the double bond, is unsaturated and conjugated to it;

$S^1$ is a single bond or a spacer unit such as a straight-chain or branched alkylene residue, having from 1 to 24, preferably 1 to 16, more preferably from 1 to 12 carbon atoms, wherein one or more —CH$_2$— groups independently may be replaced by a group selected from —O—, —CO—, —COO—, —OCO—, —C=C—, —C≡C—;

X and Y represent groups of which one is a hydrogen atom and the other is an electron withdrawing group selected from the groups —COR$^2$, —COOR$^2$, —SOCF$_3$, —NO$_2$, —CF$_3$, —CN, preferably —CN, —COR$^2$ or —COOR$^2$, more preferably —CN or —COOR$^2$, wherein R$^2$ is a hydrogen atom or a straight-chain or branched alkyl or alkylene group, having from 1 to 8 carbon atoms, wherein one or more, preferably non-adjacent —CH$_2$— groups independently may be replaced by a group, preferably selected from —O—, —CO—, —CO—O—, —O—CO—, —C=C—, —C≡C—, or by an optionally substituted alkyl, or by a polymerizable group; and G is a hydrogen atom, optionally substituted alkyl, or a polymerizable group.

Preferably, a is 0 or 1, more preferably 0.

Preferably $C^1$, $C^2$ in formula (II) independently have one of the following meanings:

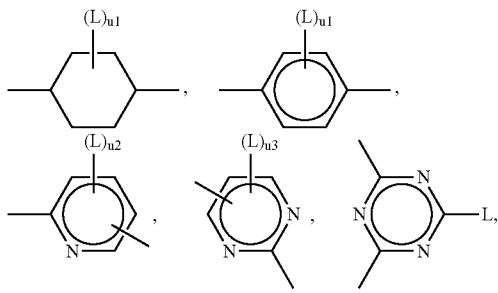

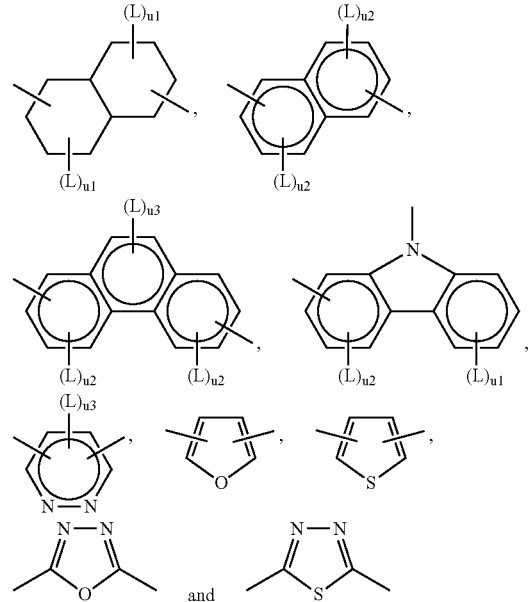

wherein

L is halogen, hydroxyl, and/or a polar group such as nitro, cyano or carboxy, and/or acryloyloxy, alkoxy, alkylcarbonyloxy, alkyloxocarbonyloxy, methacryloyloxy, vinyl, vinyloxy, allyl, allyloxy, and/or a cyclic, straight-chain or branched alkyl residue, which is unsubstituted, mono- or poly-substituted by fluorine and/or chlorine, and/or a silane group, and/or a siloxane group, wherein the alkyl residue has from 1 to 20 C-atoms, wherein one or more, preferably non-adjacent, —CH$_2$— groups independently may be replaced by a group, preferably selected from —O—, —CO—, —COO—, —OCO—, —C=C—, —C≡C—, —Si(CH$_3$)$_2$—, —Si(CH$_3$)$_2$—O—Si(CH$_3$)$_2$—.

u1 is 0, 1, 2, 3, or 4, u2 is 0, 1, 2, or 3, and u3 is 0, 1, or 2.

with the proviso that $C^2$, which is directly connected to the double bond, is unsaturated and conjugated to it.

More preferably $C^1$, $C^2$ are phenanthryl or phenanthrylene, biphenyl or biphenylene, naphthyl or naphthylene, phenyl or phenylene, pyridine or pyridinylene; preferably naphthyl or naphthylene, phenyl or phenylene, pyridine or pyridinylene.

Preferably L is selected from fluorine, nitro, cyano, carboxy, and/or acryloyloxy, methacryloyloxy, vinyl, vinyloxy, allyl, allyloxy, and/or a cyclic, straight-chain or branched alkyl residue of 1 to 12 C-atoms, which is unsubstituted, mono- or poly-substituted by fluorine, and/or hydroxyl, and/or —Si(CH$_3$)$_3$, and/or —Si(CH$_3$)$_2$—O—Si(CH$_3$)$_3$ and in which, preferably non-adjacent —CH$_2$— groups independently may be replaced by a group, preferably selected from —O—, —COO—, —OCO—, —C=C—, —C≡C—, —Si(CH$_3$)$_2$— and/or —Si(CH$_3$)$_2$—O—Si(CH$_3$)$_2$—.

More preferably L is selected from fluorine, nitro, cyano, alkyl, alkoxy, amino, alkylamino, dialkylamino or thioalkyl, most preferably from alkyl, alkoxy, amino, alkylamino, dialkylamino or thioalkyl.

Preferably $Z^1$, $Z^2$ in formulae (II) and (III) each independently are a single bond or a bridging group selected from —CH(OH)—, —O—, —CH$_2$(CO)—, —COO—, —OCO—, —COF$_2$—, —CF$_2$CO—, —CH$_2$—CH$_2$—, —O—CH$_2$—, —CH$_2$O—, —CH=CH—, —OCO—

—CH=CH—, —CH=N—, —C(CH$_3$)=N—, —O—CO—O—, —N=N—, or a short alkyl spacer of 1 to 6 carbon atoms, preferably 1 to 3 carbon atoms.

More preferably $Z^1$, $Z^2$ each independently are a single bond —O—, —CH$_2$(CO)—, —COO—, —OCO—, —CH$_2$—CH$_2$—, —OCO—CH=CH—, —N=N—, or a short alkyl spacer of 1 to 3 carbon atoms.

Thus more preferred compounds are compounds according to the general formula (I) wherein A is a ring system of formula (II):

$$-(Z^1-C^1)_a Z^2-C^2- \quad (II)$$

and

B is a ring system of formula (III):

$$-(C^1-Z^1)_a C^2- \quad (III)$$

wherein:

$C^1$, $C^2$ each independently are naphthyl or naphthylene, phenyl or phenylene, pyridine or pyridinylene, which is unsubstituted or mono- or poly-substituted by fluorine, nitro, cyano, alkyl, alkoxy, amino, alkylamino, dialkylamino or thioalkyl;

$Z^1$, $Z^2$ each independently are a single bond or —O—, —CH$_2$(CO)—, —COO—, —OCO—, —CH$_2$—CH$_2$—, —OCO—CH=CH—, —N=N—, or a short alkyl spacer of 1 to 3 carbon atoms, a is 0 or 1, preferably 0

$S^1$ is a single bond or a spacer unit such as a straight-chain or branched alkylene group, having from 1 to 24, preferably 1 to 16, more preferably from 1 to 12 carbon atoms, wherein one or more —CH$_2$— groups may independently replaced by a group, preferably selected from —O—, —COO—, —OCO—, —C=C—;

n is 1 or 2;

X,Y represent groups of which one is a hydrogen atom and the other is an electron withdrawing group selected from the groups —COOR$^2$ or CN, wherein R$^2$ is hydrogen, a straight-chain or branched alkyl or alkylene chain, having from 1 to 12 carbon atoms, wherein one or more —CH$_2$— groups independently may be replaced by a group, selected from —O—, —CO—, —COO—, —OCO—, —C=C—, —C≡C—, or by optionally substituted alkyl, or by a polymerizable group selected from acrylate, methacrylate, vinyl ether and ester, epoxy, siloxanes, imide monomers, amic acid monomers or their corresponding homo- and co-polymers;

G is a hydrogen atom, optionally substituted alkyl, or a polymerizable group selected from acrylate, methacrylate, vinyl ether and ester, epoxy, siloxanes, imide monomers, amic acid monomers or their corresponding homo- and co-polymers.

Preferred examples of the substructure A of formula (I) are given in the following listing, where "st-" represents the linkage to the double bond of the stilbene part and "O—" represents the linkage to the S1 group of the molecule:

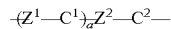
A001

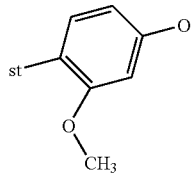
A002

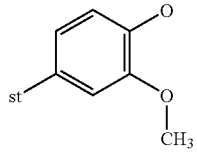
A003

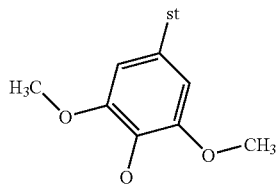
A004

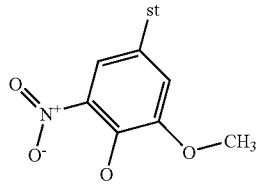
A005

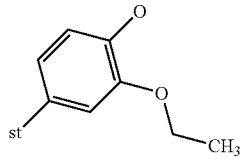
A006

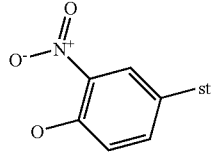
A007

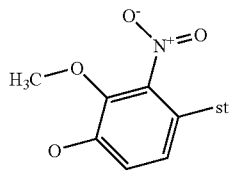
A008

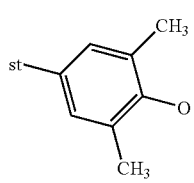
A009

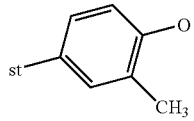
A010

A011 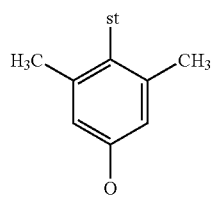
A012 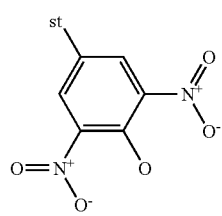
A013 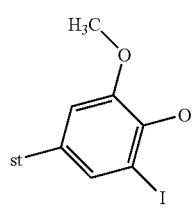
A014 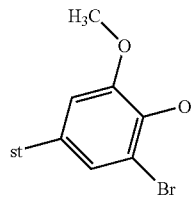
A015 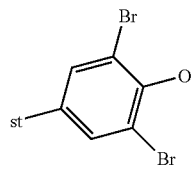
A016 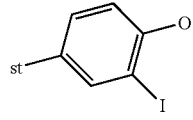
A017 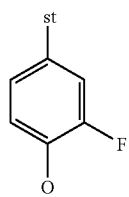
A018 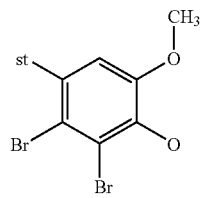
A019 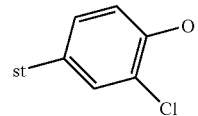
A020 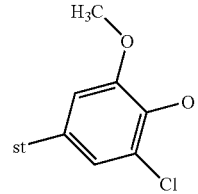
A021 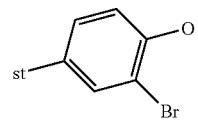
A022 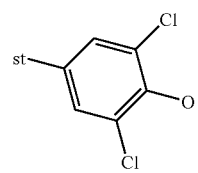
A023 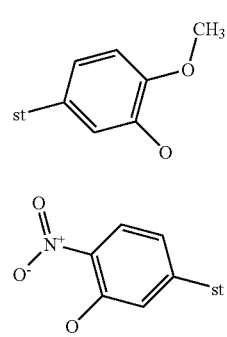
A024 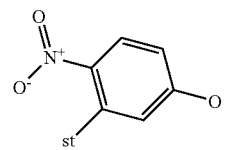
A025 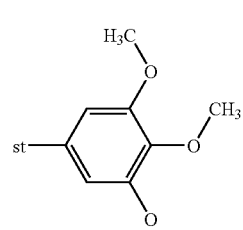
A026 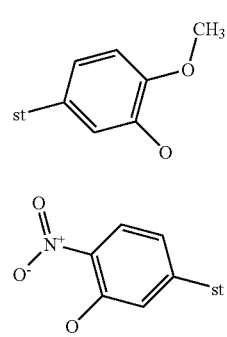
A027 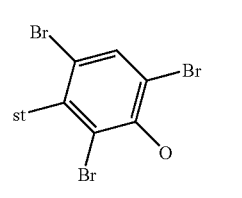

-continued
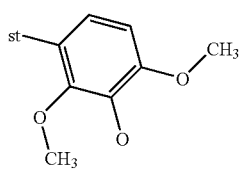
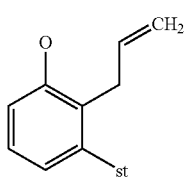
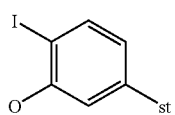
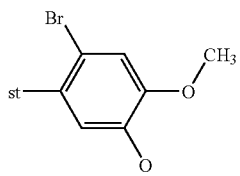
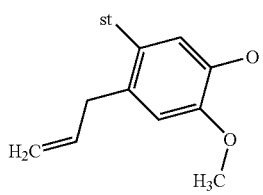
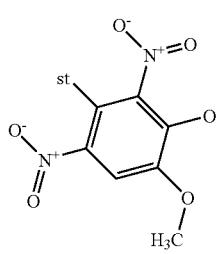
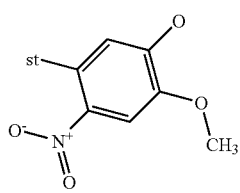
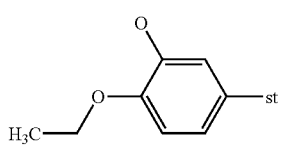
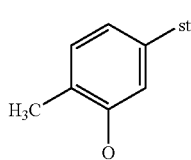
A028
A029
A030
A031
A032
A033
A034
A035
A036
Preferred examples of the substructure B of formula (I) are given in the following listing, where st- is the bound connected to the stilbene part:
B001
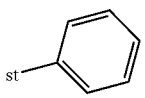
B002
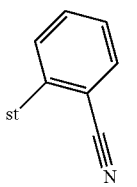
B003
B004
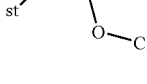
B005
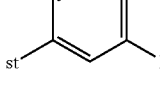
B006
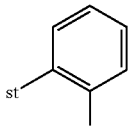
B007
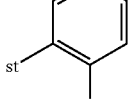
B008
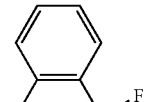
B009
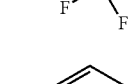
B010
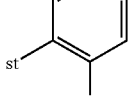

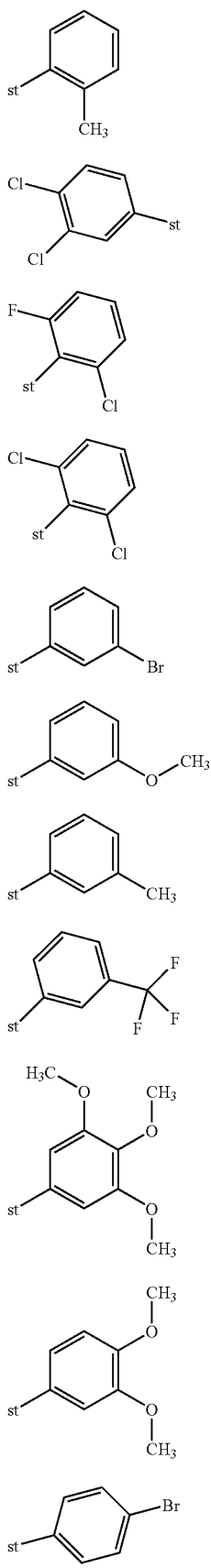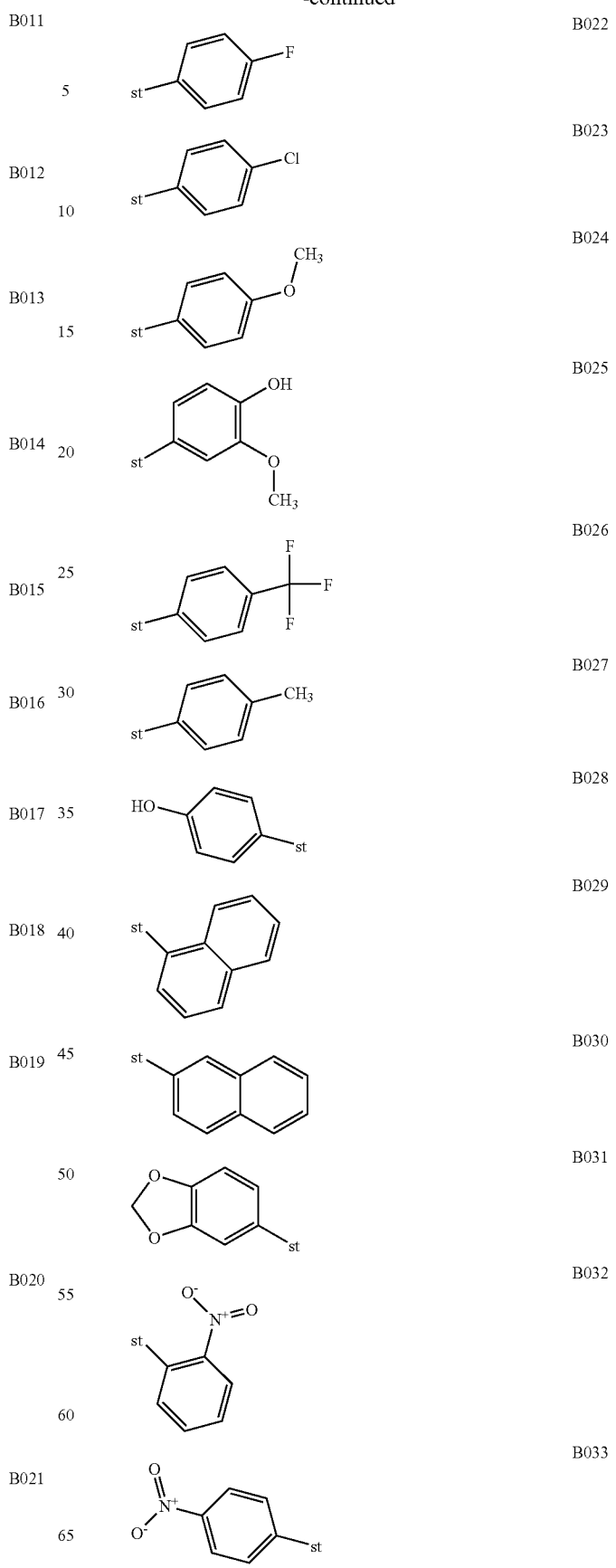

| | | |
|---|---|---|
| 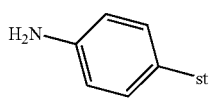 | B034 | 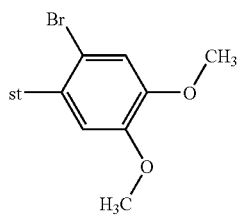 B043 |
| 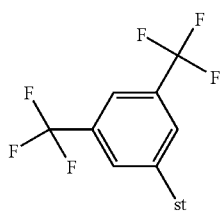 | B035 | 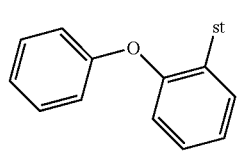 B044 |
| 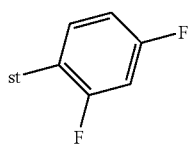 | B036 | 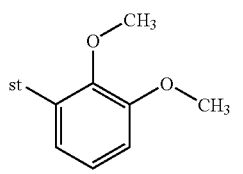 B045 |
| 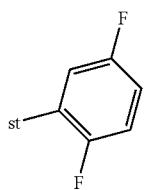 | B037 | 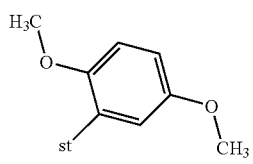 B046 |
| 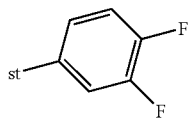 | B038 | 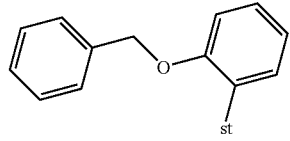 B047 |
| 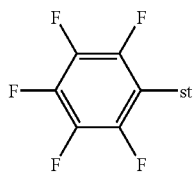 | B039 | 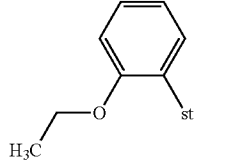 B048 |
| 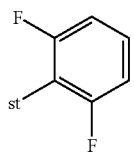 | B040 | 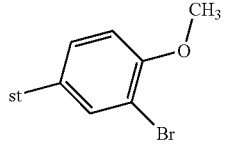 B049 |
| 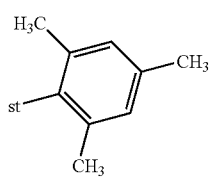 | B041 | 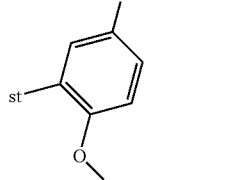 B050 |
| 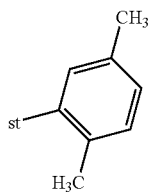 | B042 | 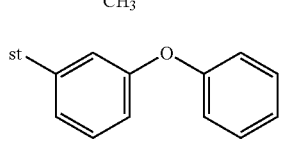 B051 |

| | |
|---|---|
| 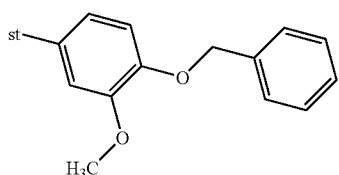 | B052 |
| 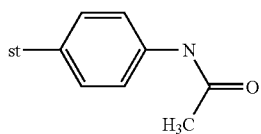 | B053 |
| 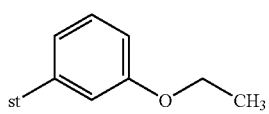 | B054 |
| 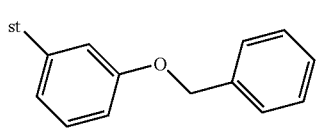 | B055 |
| 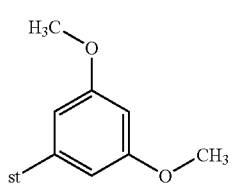 | B056 |
| 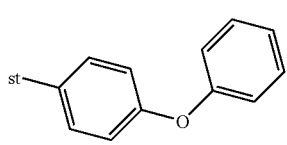 | B057 |
| 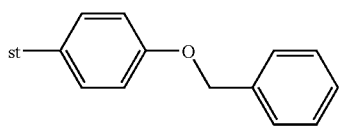 | B058 |
| 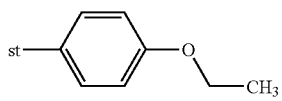 | B059 |
| 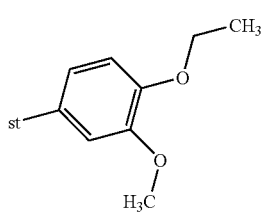 | B060 |
| 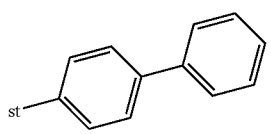 | B061 |
| 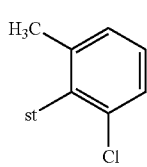 | B062 |
| | |
|---|---|
| 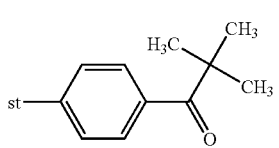 | B063 |
| 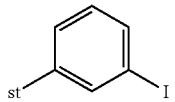 | B064 |
| 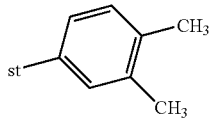 | B065 |
| 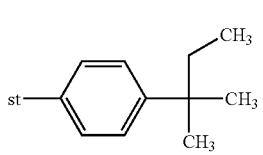 | B066 |
| 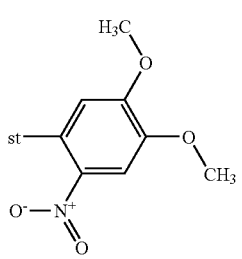 | B067 |
| 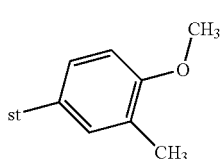 | B068 |
| 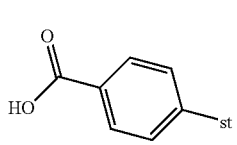 | B069 |
| 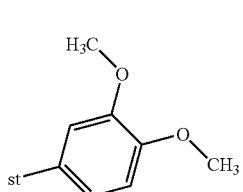 | B070 |
| 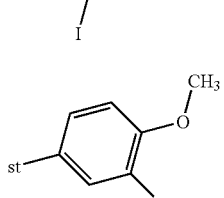 | B071 |
| 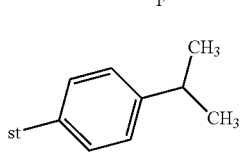 | B072 |

-continued
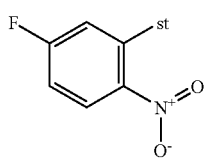
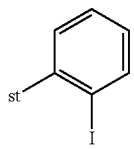
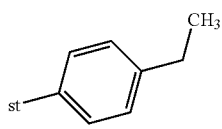
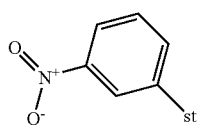
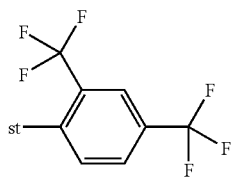
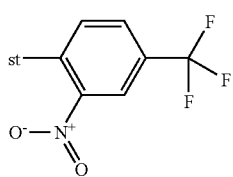
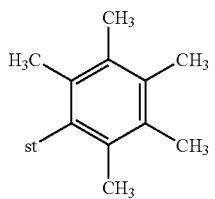
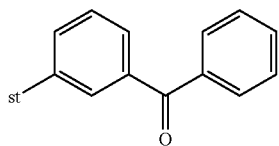
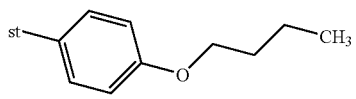
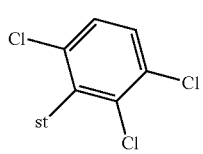
-continued
B073 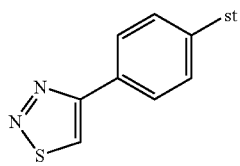
B074
B075 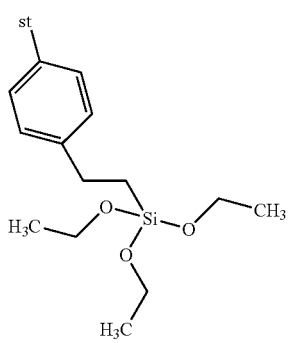
B076
B077 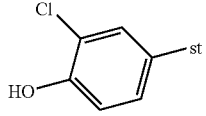
B078 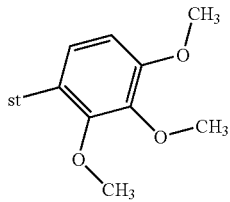
B079 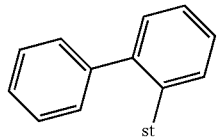
B080 
B081 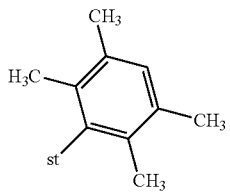
B082 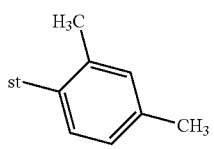
B083
B084
B085
B086
B087
B088
B089
B090

-continued
B091 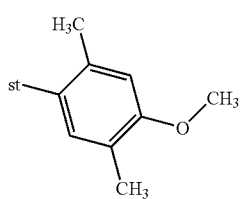
B092 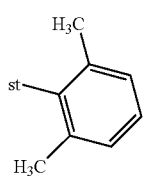
B093 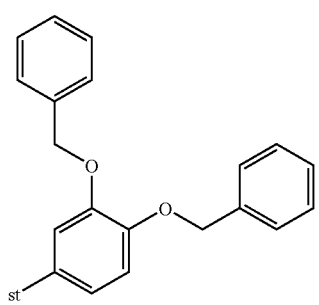
B094 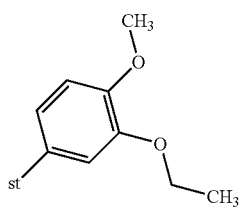
B095 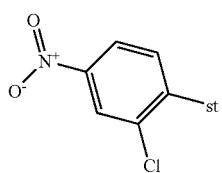
B096 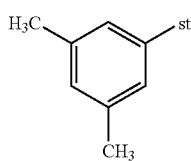
B097 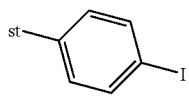
B098 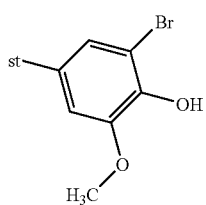
-continued
B099 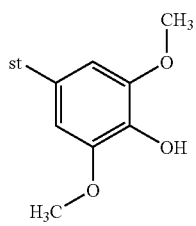
B100 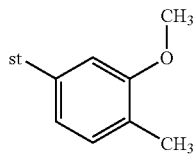
B101 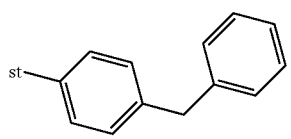
B102 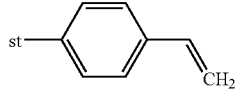
B103 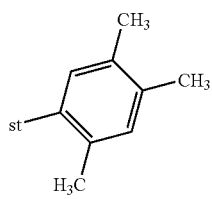
B104 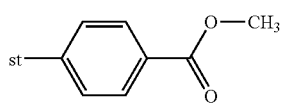
B105 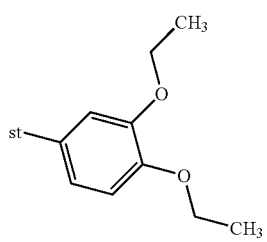
B106 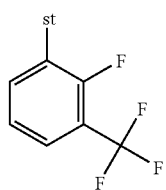
B107 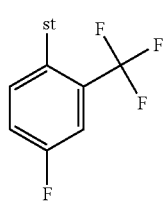

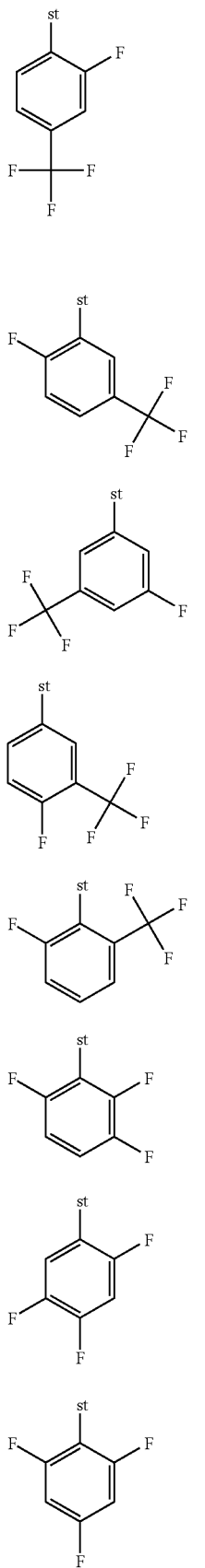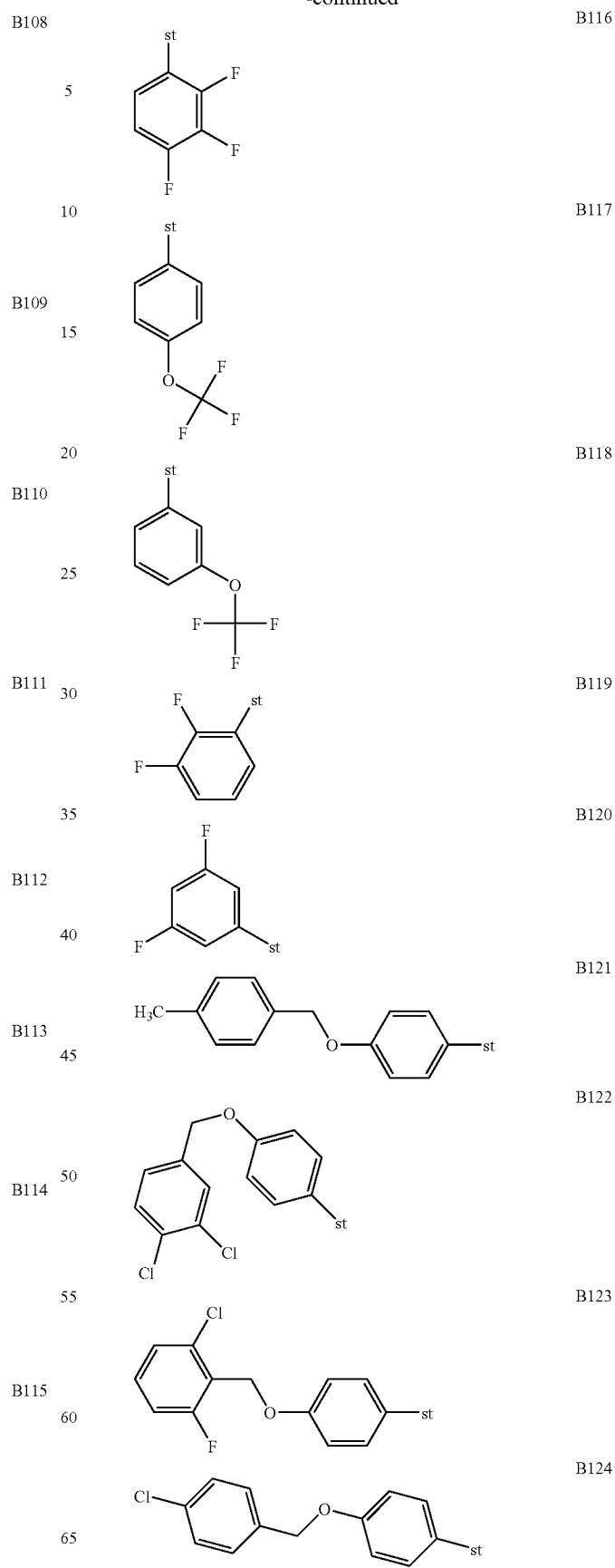

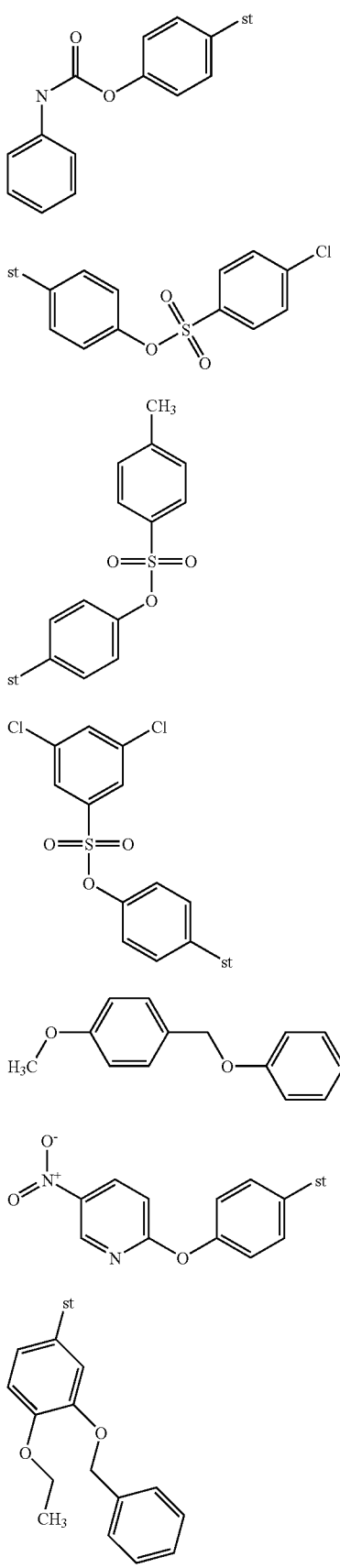
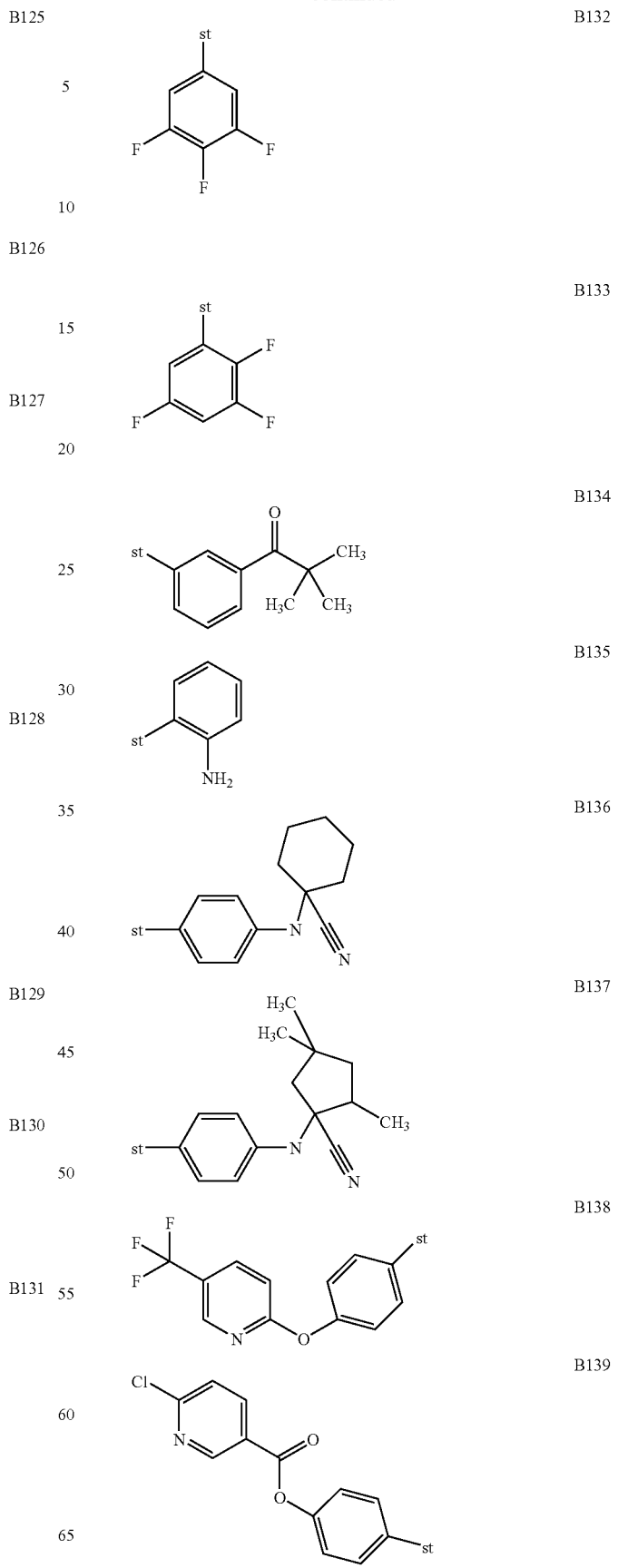

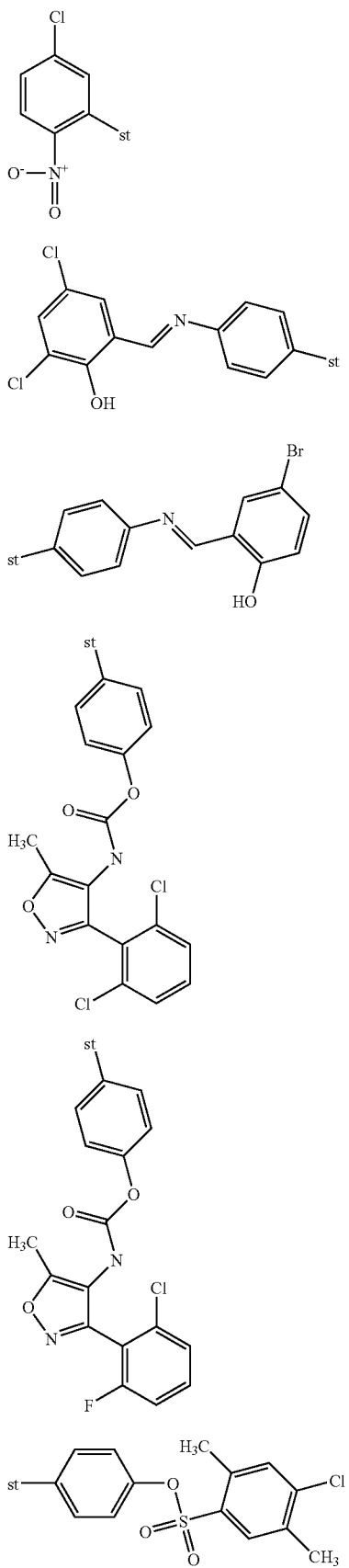
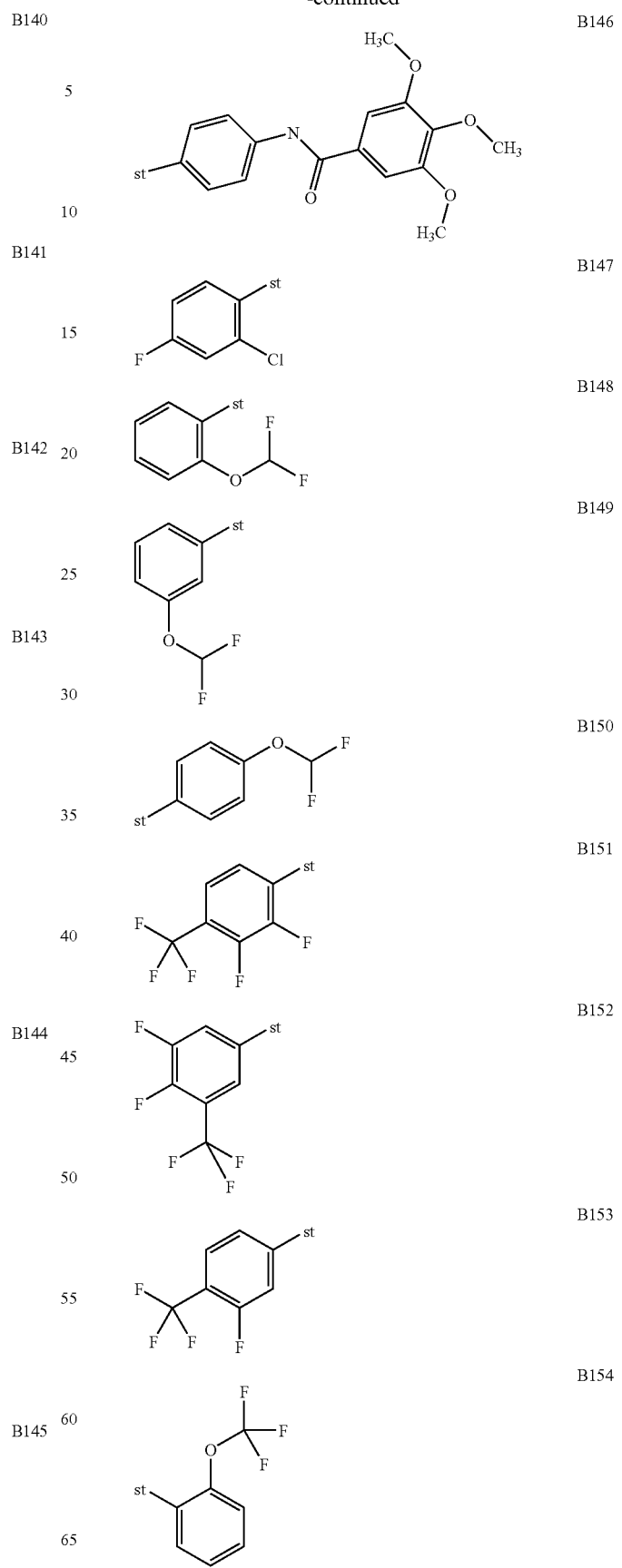

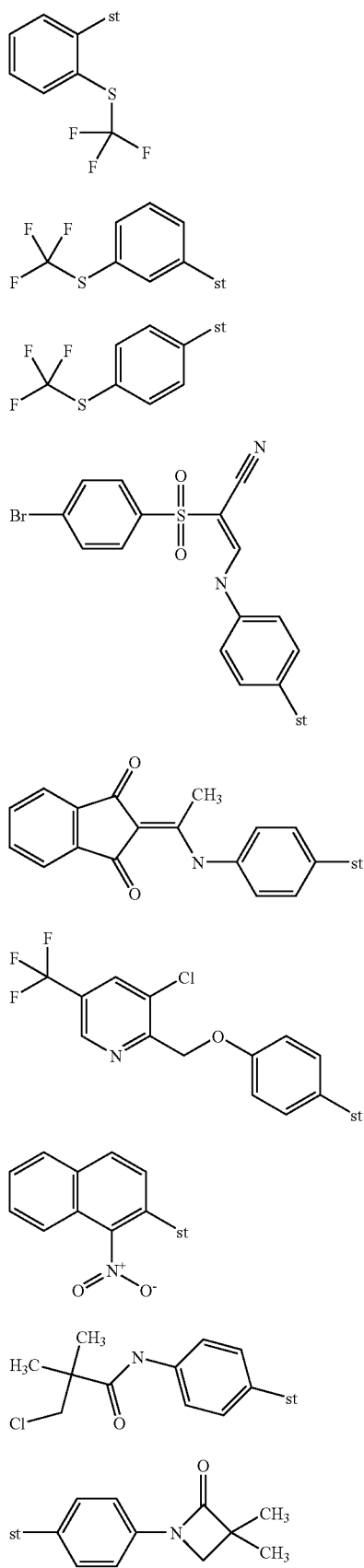
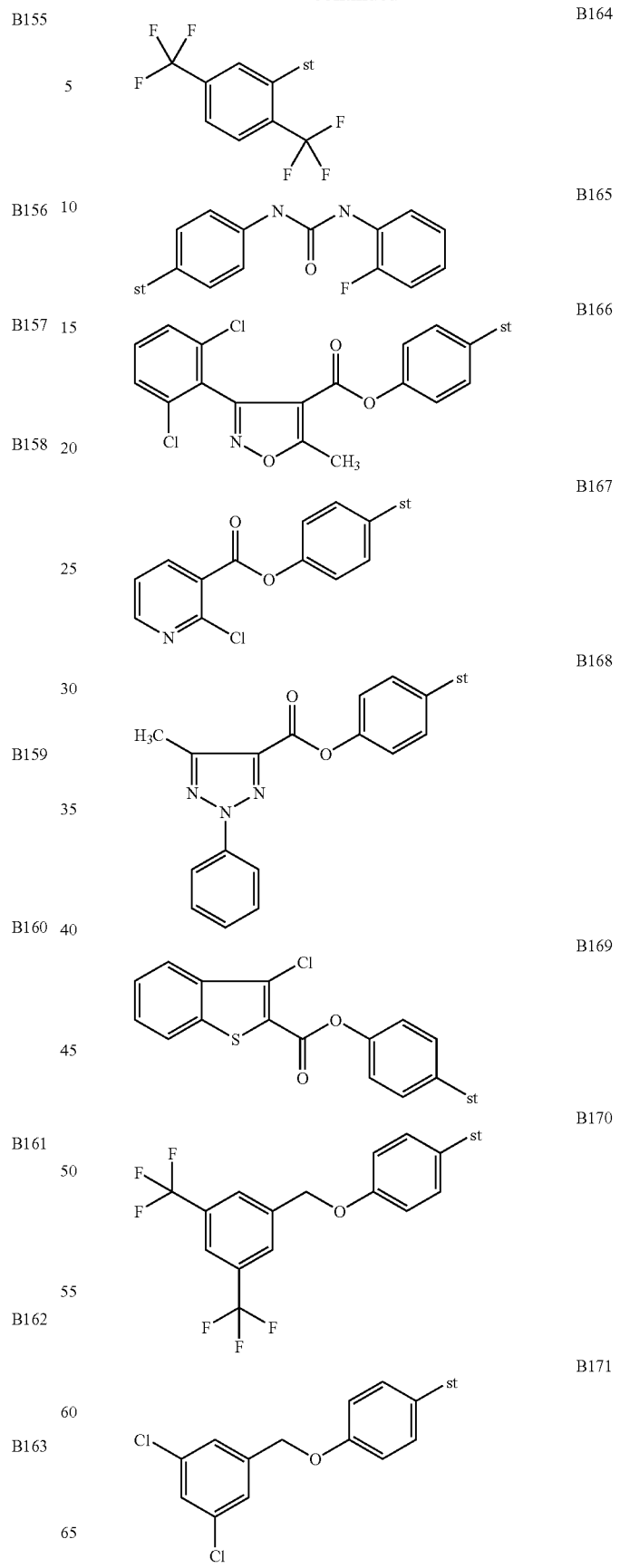

-continued
B172 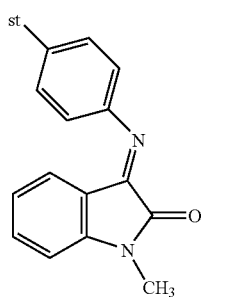
B173 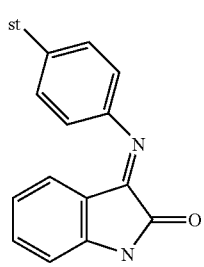
B174 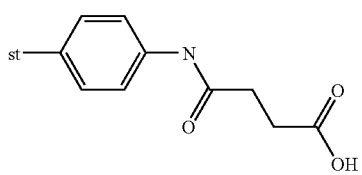
B175 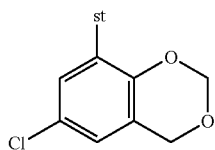
B176 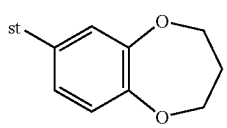
B177 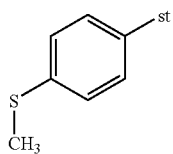
B178 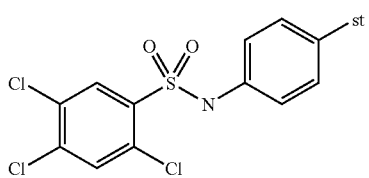
B179 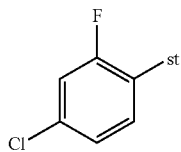
-continued
B180 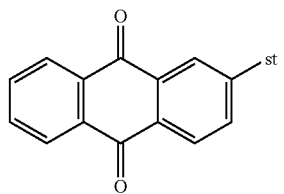
B181 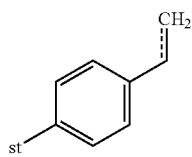
B182 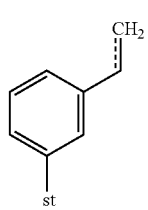
B183 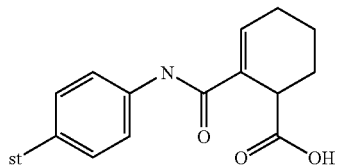
B184 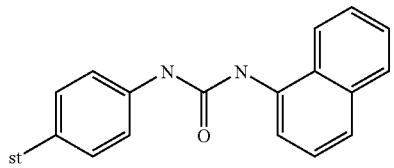
B185 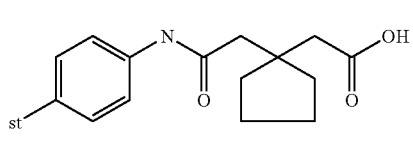
B186 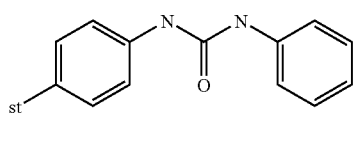
B187 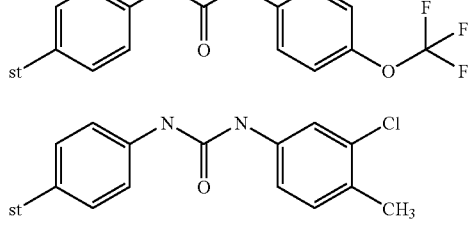
B188
B189

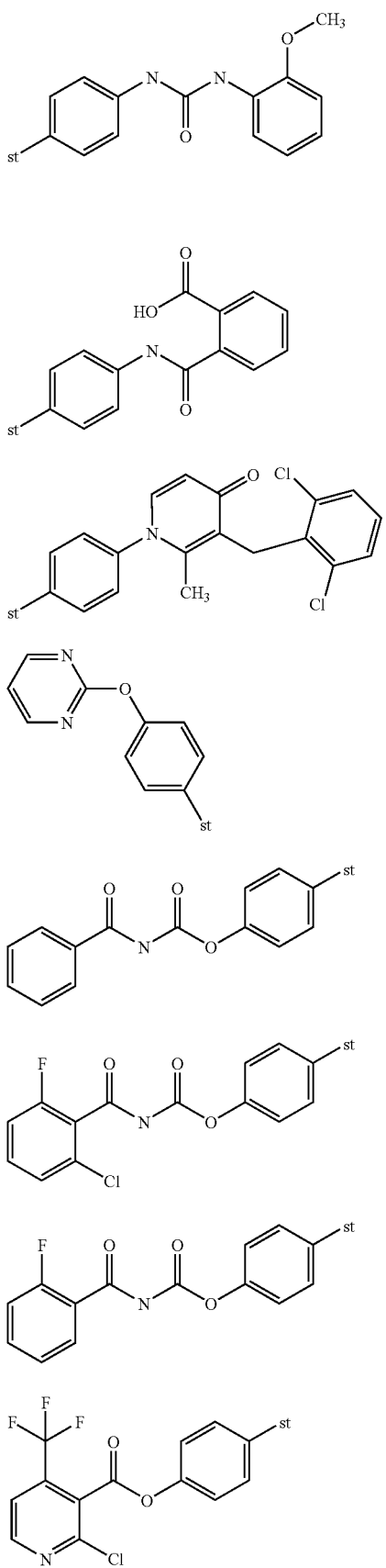
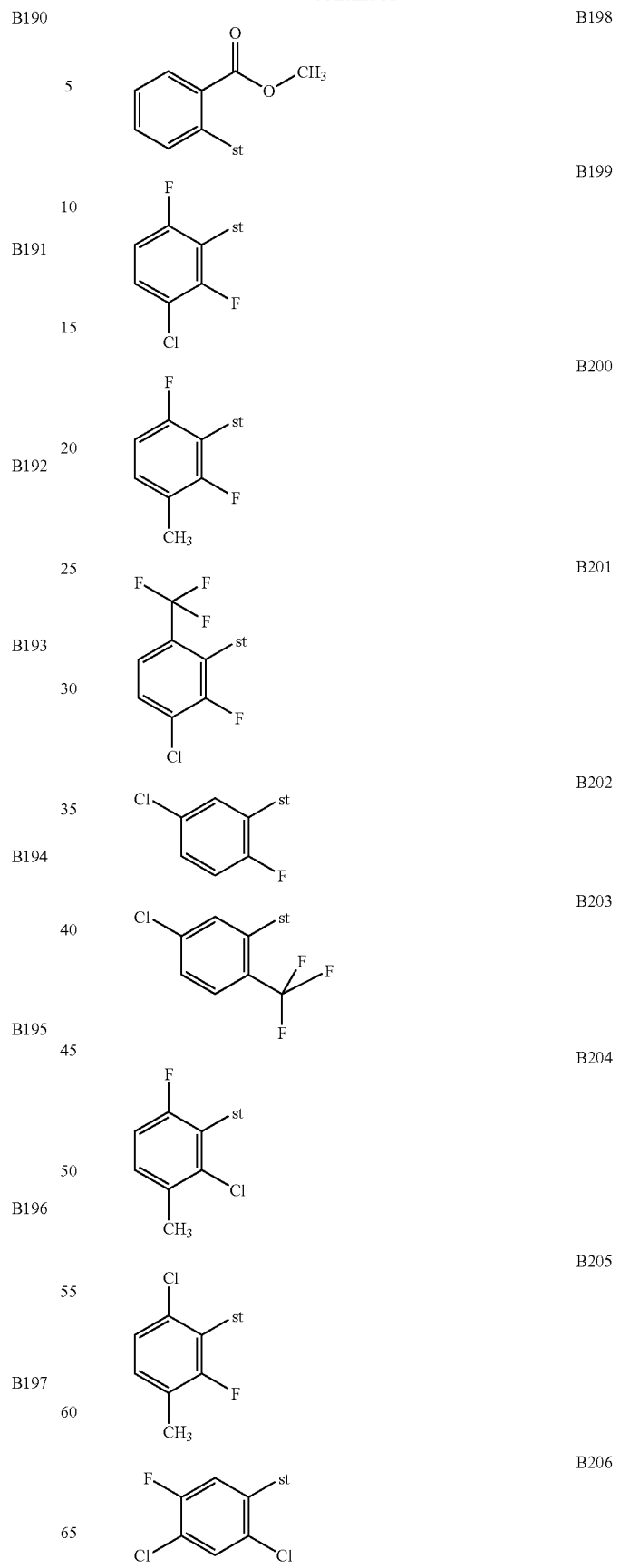

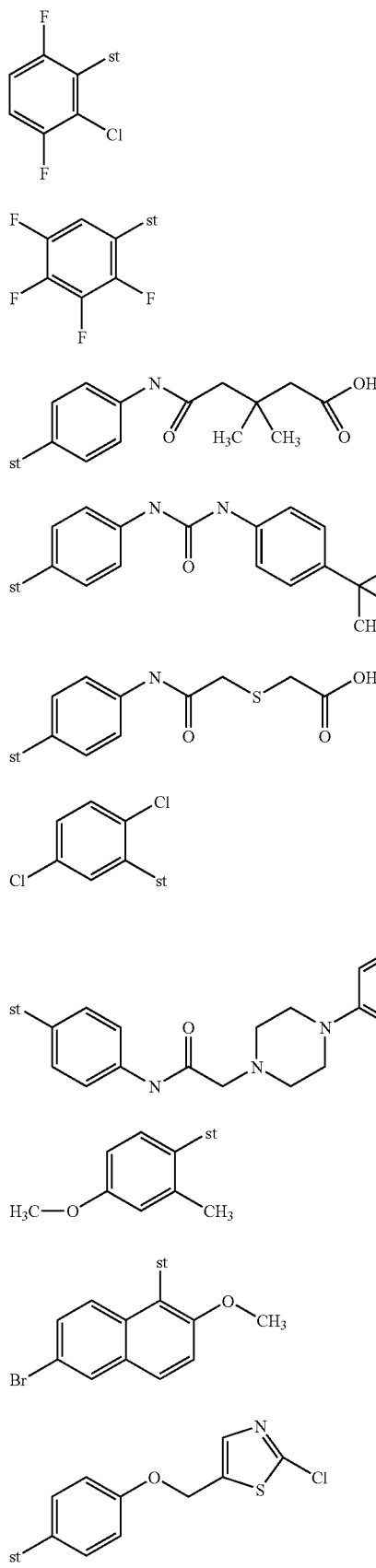
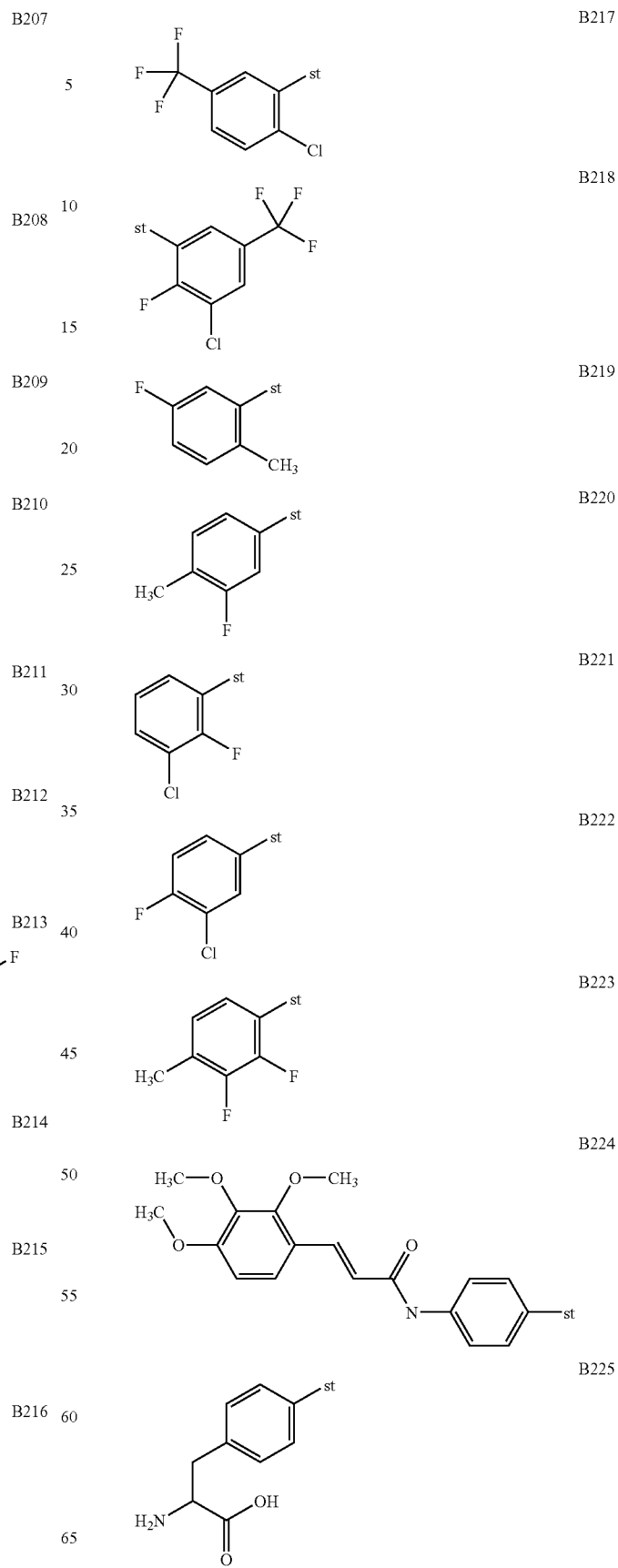

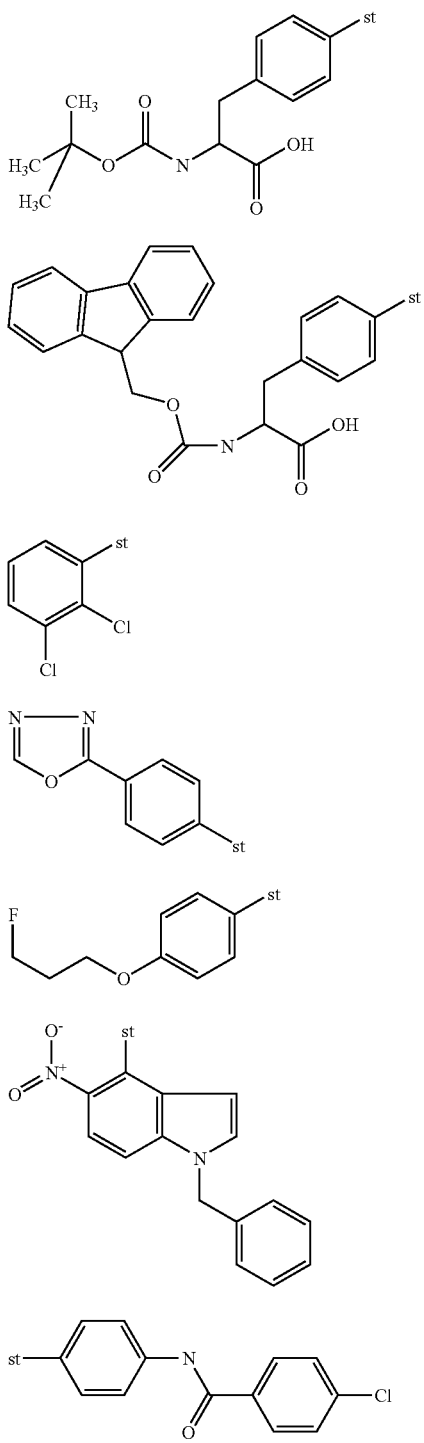
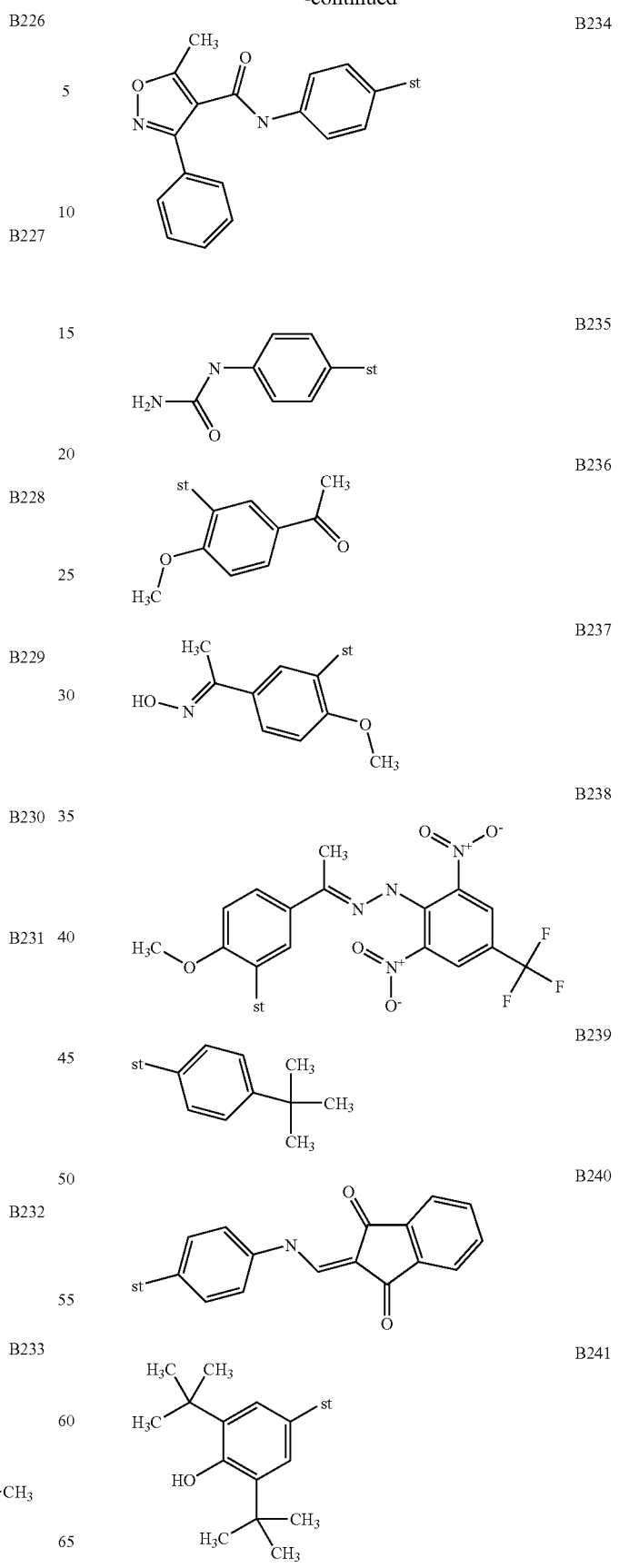

B242 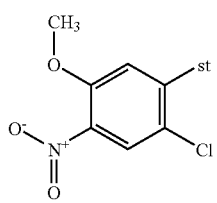
B243 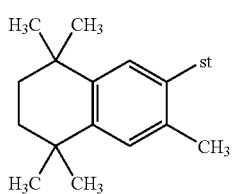
B244 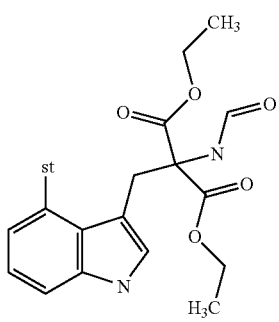
B245 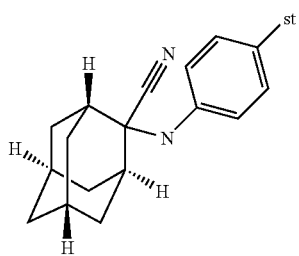
B246 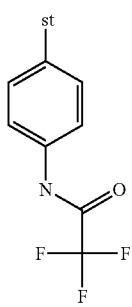
B247 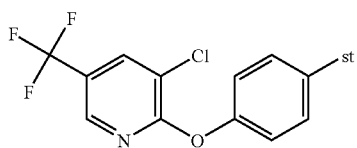
B248 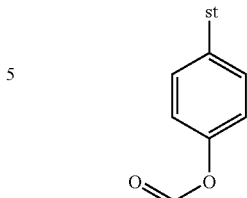
B249 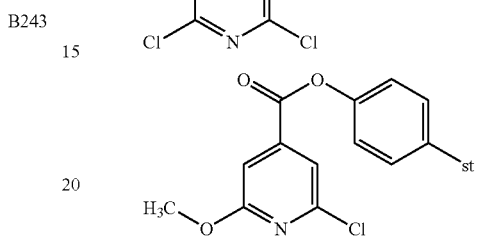
B250 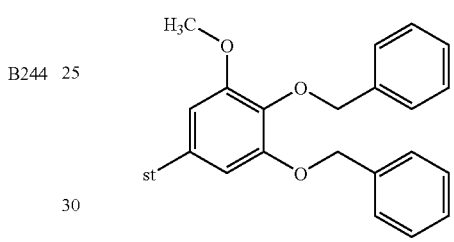
B251 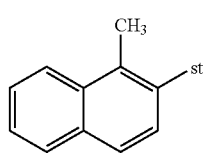
B252 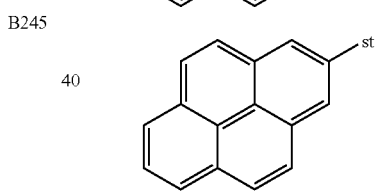
B253 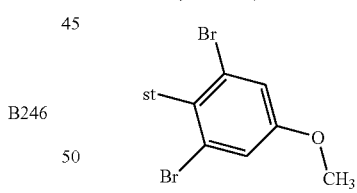
B254 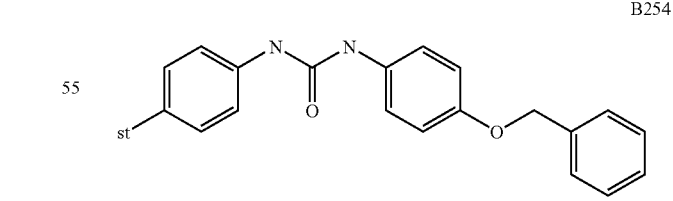
B255 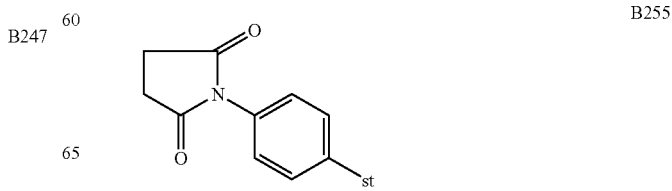

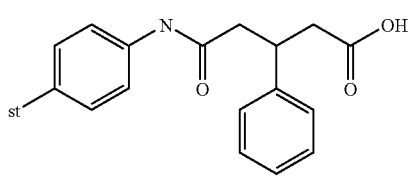 B256
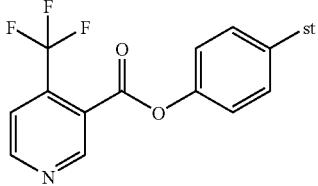 B260
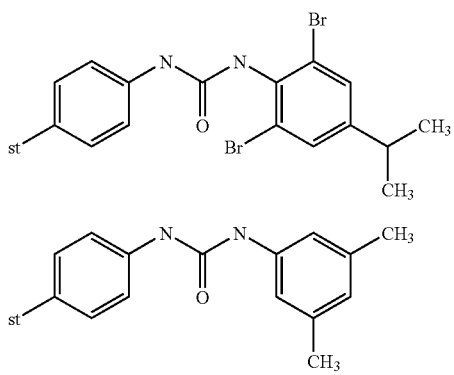 B257
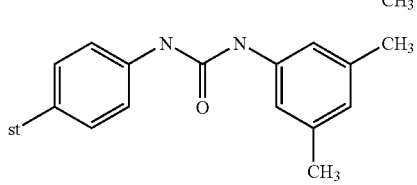 B258
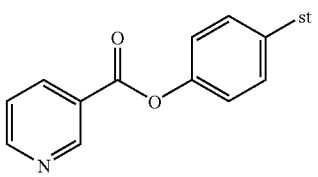 B261
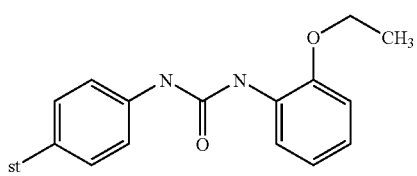 B259
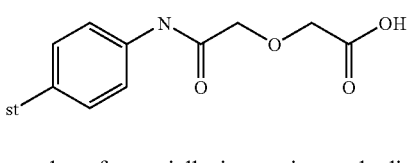 B262
Examples of especially interesting embodiments of formula (I) are given in the following table:
| | A | B | X | Y |
|---|---|---|---|---|
| C001 | | | H | CN |
| C002 | -O) | | H | CN |
| C003 | | | H | CN |

-continued

| | A | B | X | Y |
|---|---|---|---|---|
| C004 | 3,4-dimethoxyphenol (st at 5-position) | 4-(2-triethoxysilylethyl)phenyl (st) | H | CN |
| C005 | 2-nitro-4-st-phenol | 4-(trifluoromethoxy)phenyl (st) | H | CN |
| C006 | 2-nitro-5-st-phenol | 4-cyanophenyl (st) | H | CN |
| C007 | 1-st-naphthalen-2-ol | 4-methoxyphenyl (st) | H | CN |
| C008 | 2-st-naphthalen-1-ol | 4-(dimethylsilyloxy)phenyl (st) | H | CN |
| C009 | 4-st-phenol | 4-(vinyloxy)phenyl (st) | H | CN |

-continued

| | A | B | X | Y |
|---|---|---|---|---|
| C010 | 4-hydroxy-3-nitrophenyl | 4-methylphenyl | H | CN |
| C011 | 4-methoxy-phenyl (2-OMe) | 4-(trifluoromethoxy)phenyl | H | CN |
| C012 | 3,5-dimethoxy-4-hydroxyphenyl | 2,3-difluorophenyl | H | CN |
| C013 | 2-hydroxynaphthalen-1-yl | 4-acetylphenyl | H | CN |
| C014 | 4-hydroxyphenyl | 4-fluorophenyl | CN | H |
| C015 | 4-hydroxy-3-methoxyphenyl | 4-(trifluoromethyl)phenyl | CN | H |
| C016 | 2-allyl-4-hydroxy-5-methoxyphenyl | 4-nitrophenyl | CN | H |

-continued

| | A | B | X | Y |
|---|---|---|---|---|
| C017 | 2,6-dimethoxyphenol (st at 4-position) | 4-(2-(triethoxysilyl)ethyl)phenyl (st) | CN | H |
| C018 | 2-nitro-4-(st)-phenol | 4-(trifluoromethoxy)phenyl (st) | CN | H |
| C019 | 2-nitro-5-(st)-phenol | 4-cyanophenyl (st) | CN | H |
| C020 | 2-hydroxy-1-(st)-naphthyl | 4-methoxyphenyl (st) | CN | H |
| C021 | 1-hydroxy-2-(st)-naphthyl | 4-(trimethylsilyloxy)phenyl (st) | CN | H |
| C022 | 4-(st)-phenol | 4-(vinyloxy)phenyl (st) | CN | H |

-continued

| | A | B | X | Y |
|---|---|---|---|---|
| C023 | 4-hydroxy-3-nitrophenyl | 4-methylphenyl | CN | H |
| C024 | 4-methoxy-3-hydroxyphenyl (2-methoxy-4-hydroxyphenyl) | 4-(trifluoromethoxy)phenyl | CN | H |
| C025 | 3,5-dimethoxy-4-hydroxyphenyl | 2,3-difluorophenyl | CN | H |
| C026 | 2-hydroxynaphthalen-1-yl | 4-acetylphenyl | CN | H |
| C027 | 4-fluorophenyl | 4-nitrophenyl | H | 6-(methacryloyloxy)hexyl acetate |
| C028 | 4-(trifluoromethyl)phenyl | 4-(2-(triethoxysilyl)ethyl)phenyl | H | 6-(methacryloyloxy)hexyl acetate |
| C029 | 4-nitrophenyl | 4-fluorophenyl | H | 6-(methacryloyloxy)hexyl acetate |

-continued

| | A | B | X | Y |
|---|---|---|---|---|
| C030 | 4-(2-(triethoxysilyl)ethyl)phenyl (st) | 4-(trifluoromethoxy)phenyl (st) | H | 6-(methacryloyloxy)hexyl acetate |
| C031 | 4-(trifluoromethoxy)phenyl (st) | 4-cyanophenyl (st) | H | 6-(methacryloyloxy)hexyl acetate |
| C032 | 4-cyanophenyl (st) | 4-(vinyloxy)phenyl (st) | H | 6-(methacryloyloxy)hexyl acetate |
| C033 | 4-methoxyphenyl (st) | 4-(trimethylsilyloxy)phenyl (st) | H | 6-(methacryloyloxy)hexyl acetate |
| C034 | 4-(trimethylsilyloxy)phenyl (st) | 4-(trifluoromethyl)phenyl (st) | H | 6-(methacryloyloxy)hexyl acetate |
| C035 | 4-(vinyloxy)phenyl (st) | 4-(trifluoromethoxy)phenyl (st) | H | 6-(methacryloyloxy)hexyl acetate |
| C036 | 4-methylphenyl (st) | 4-(isopropenyl)phenyl (st) | H | 6-(methacryloyloxy)hexyl acetate |

-continued

| | A | B | X | Y |
|---|---|---|---|---|
| C037 | 4-(trifluoromethoxy)phenyl | 4-methylphenyl | H | ![acetoxy-pentyl methacrylate] |
| C038 | 2,3-difluorophenyl | 4-methoxyphenyl | H | ![acetoxy-pentyl methacrylate] |
| C039 | 4-acetylphenyl | 2,3-difluorophenyl | H | ![acetoxy-pentyl methacrylate] |
| C040 | 4-fluorophenyl | 4-nitrophenyl | ![acetoxy-pentyl methacrylate] | H |
| C041 | 4-(trifluoromethyl)phenyl | 4-(2-triethoxysilylethyl)phenyl | ![acetoxy-pentyl methacrylate] | H |
| C042 | 4-nitrophenyl | 4-fluorophenyl | ![acetoxy-pentyl methacrylate] | H |
| C043 | 4-(2-triethoxysilylethyl)phenyl | 4-(trifluoromethoxy)phenyl | ![acetoxy-pentyl methacrylate] | H |

-continued

| | A | B | X | Y |
|---|---|---|---|---|
| C044 | 4-(trifluoromethoxy)phenyl-st | 4-cyanophenyl-st | -C(=O)O-(CH₂)₆-O-C(=O)-C(CH₃)=CH₂ | H |
| C045 | 4-cyanophenyl-st | 4-(vinyloxy)phenyl-st | -C(=O)O-(CH₂)₆-O-C(=O)-C(CH₃)=CH₂ | H |
| C046 | 4-methoxyphenyl-st | 4-(trimethylsilyloxy)phenyl-st | -C(=O)O-(CH₂)₆-O-C(=O)-C(CH₃)=CH₂ | H |
| C047 | 4-(trimethylsilyloxy)phenyl-st | 4-(trifluoromethyl)phenyl-st | -C(=O)O-(CH₂)₆-O-C(=O)-C(CH₃)=CH₂ | H |
| C048 | 4-(vinyloxy)phenyl-st | 4-(trifluoromethoxy)phenyl-st | -C(=O)O-(CH₂)₆-O-C(=O)-C(CH₃)=CH₂ | H |
| C049 | 4-methylphenyl-st | 4-acetylphenyl-st | -C(=O)O-(CH₂)₆-O-C(=O)-C(CH₃)=CH₂ | H |
| C050 | 4-(trifluoromethoxy)phenyl-st | 4-methylphenyl-st | -C(=O)O-(CH₂)₆-O-C(=O)-C(CH₃)=CH₂ | H |
| C051 | 2,3-difluorophenyl-st | 4-methoxyphenyl-st | -C(=O)O-(CH₂)₆-O-C(=O)-C(CH₃)=CH₂ | H |

| | A | B | X | Y |
|---|---|---|---|---|
| C052 | | | | H |

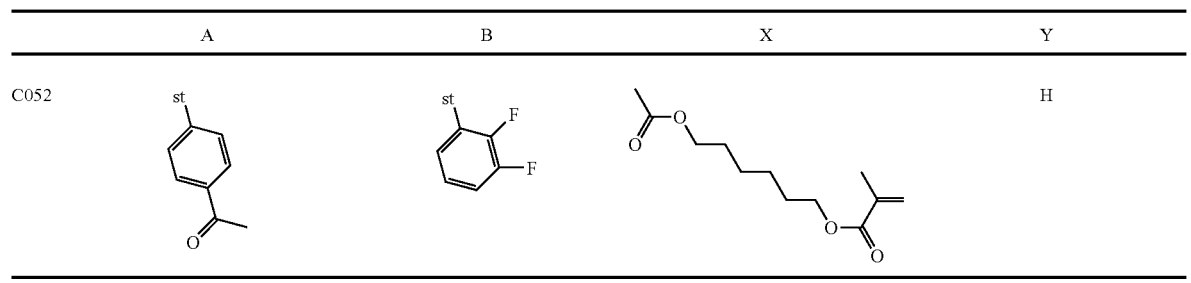

The term "alkyl", unless the context requires otherwise, includes straight-chain and branched alkyl, as well as saturated and unsaturated groups.

The term "lower alkyl", as used in the context of the present invention, taken on its own or in a combination such as "lower alkoxy", etc., preferably denotes straight-chain and branched saturated hydrocarbon groups having from 1 to 6, preferably from 1 to 3, carbon atoms. Methyl, ethyl, propyl and isopropyl groups are especially preferred. In case of "lower alkoxy", methoxy, ethoxy, propoxy and isopropoxy groups are especially preferred.

The term "aliphatic", unless the context requires otherwise, includes straight-chain and branched alkyl, as well as saturated and unsaturated groups. Possible substituents include alkyl, aryl (thus giving an araliphatic group) and cycloalkyl, as well as amino, cyano, epoxy, halogen, hydroxy, nitro, oxo etc. Possible heteroatoms which may replace carbon atoms include nitrogen, oxygen and sulphur. In the case of nitrogen further substitution is possible with groups such as alkyl, aryl and cycloalkyl.

The term "alicylic", as used in the context of the present invention, preferably denotes optionally substituted non-aromatic carbocyclic or heterocyclic ring systems, with 3 to 30 carbon atoms, e.g. cyclopropane, cyclobutane, cyclopentane, cyclopentene, cyclohexane, cyclohexene, cyclohexadiene, decaline, tetrahydrofuran, dioxane, pyrrolidine, piperidine or a steroidal skeleton such as cholesterol.

The term "aromatic", as used in the context of the present invention, preferably denotes optionally substituted carbocyclic and heterocyclic aromatic groups, incorporating five, six, ten or 14 ring atoms, e.g. furan, benzene, pyridine, pyrimidine, naphthalene, phenanthrene, biphenylene or tetraline units.

The term "phenylene", as used in the context of the present invention, preferably denotes a 1,2-, 1,3- or 1,4-phenylene group, which is optionally substituted. It is preferred that the phenylene group is either a 1,3- or a 1,4-phenylene group. 1,4-phenylene groups are especially preferred.

The term "halogen" denotes a chloro, fluoro, bromo or iodo substituent, preferably a chloro or fluoro substituent.

The term "polar group", as used in the context of the present invention primarily denotes a group like a nitro, cyano, or a carboxy group.

The term "heteroatom", as used in the context of the present invention primarily denotes oxygen, sulphur and nitrogen, preferably oxygen and nitrogen, in the latter case preferably in the form of —NH—.

The term "optionally substituted" as used in the context of the present invention primarily means substituted by lower alkyl, lower alkoxy, hydroxy, halogen or by a polar group as defined above.

With respect to straight or branched alkyl, alkylene, alkoxy, alkoxycarbonyl, alkylcarbonyl, alkylcarbonyloxy groups it is repeatedly pointed out that some or several of the —CH$_2$— groups may be replaced e.g. by heteroatoms, but also by other groups. In such cases it is generally preferred that such replacement groups are not directly linked to each other. It is alternatively preferred that heteroatoms, and in particular oxygen atoms are not directly linked to each other.

The term "polymerizable group" as used in the context of the present invention refers to a functional group that can be subjected to polymerization (optionally with other comonomers) to yield an oligomer, dendrimer or polymer according to the present invention. For a person skilled in the art it will be obvious which functional groups are intended for any specific polymer. Thus for example in case of "imid monomer" as the indicated polymer backbone group it is obvious to a person skilled in the art that the actual monomer units for polymerization to yield a polyimid are e.g. diamines and dianhydrides. Similarly regarding "urethane monomer" the actual monomer units are diols and diisocyanates.

The compounds according to the present invention in form of prefinished monomers may be readily prepared using methods that are well known to the person skilled in the art. Suitable methods can for instance be found in Houben-Weyl, Methoden der Organischen Chemie, Thieme-Verlag, Stuttgart.

Subsequently these prefinished monomers are typically subjected to direct polymerisation to obtain an oligomer, dendrimer or polymer. Thus, the compounds of the present invention may also be part of an oligomer, a dendrimer or a polymer, which may be a homopolymer or a copolymer.

In a specific embodiment the compounds of formula (I) may be formulated with any other monomers, functional moieties and additives.

For the direct polymerisation, the monomers and (optionally) the comonomers are firstly prepared separately from the individual components. Subsequently the formation of the polymers is effected in a manner known per se for any given polymer for example under the influence of UV radiation or heat or by the action of radical or ionic catalysts. Potassium peroxodisulfate, dibenzoyl peroxide, azobisisobutyronitrile or di-tert-butyl peroxide are examples of radical initiators. Ionic catalysts are alkali-organic compounds such as phenyllithium or naphthylsodium or Lewis acids such as BF$_3$, AlCl$_3$, SnCl$_3$ or TiCl$_4$. The monomers can be polymerised in solution, suspension, emulsion or substance.

If copolymerized with other comonomers the obtained copolymers are consisting of a monomer unit derivating from formula (I) as defined in any of the proceeding meanings and any other known monomer unit that is commercially available or not.

Upon polymerization it may further be advantageous to terminate the growing polymer chain after a suitable chain length is reached by capping the polymerizable group present at the chain end by using specific reagents well known in the art.

Suitable polymers include polyacrylates, polymethacrylates, polyacrylamides, polymethacrylamides, polyvinylether and polyvinylester, polyallylether and ester, polystyrenes, polysiloxanes, polyimides, polyamic acids and their esters, polyamidimides, polymaleic acids, polyfumaric acids polyurethanes and derivatives thereof.

These polymers may all be prepared according to well known methods in the art. Thus for example the poly(meth)acrylates described herein may be prepared in line with methods such as described in Polymer Synthesis Characterization: A Laboratory Manual (Stanley R. Sandler, Wolf Karo, JoAnne Bonesteel, Eli M. Pearce) and Principles of Polymerization (George Odian).

Thus in the case when the monomer unit is bearing an acrylic or methacrylic end, the comonomer unit can be represented by compounds listed below. Most of them are commercially available from chemical suppliers such as Aldrich, ABCR, ACROS, Fluka.

2,2,2-trifluoroethyl acrylate
2-hydroxyethyl acrylate
acrylic acid
glycidyl acrylate
methyl acrylate
tert-butyl acrylate
ethyl acrylate
butyl acrylate
2-ethylhexyl acrylate
3-sulfopropyl acrylate, potassium salt
4-hydroxybutyl acrylate
2-bromoethyl acrylate
2-cyanoethyl acrylate
tetrahydrofurfuryl acrylate
allyl acrylate
stearyl acrylate
2-(2-ethoxyethoxy)ethyl acrylate
2-hydroxypropyl acrylate
iso-hexadecyl acrylate
2-tetrahydrofuryl acrylate
n,n-dimethylaminoethyl acrylate
1h,1h-perfluorooctyl acrylate
1h,1h-heptafluorobutyl acrylate
2,2,3,3,3-pentafluoropropyl acrylate
1h,1h,5h-octafluoropentyl acrylate
1,1,1,3,3,3-hexafluoroisopropyl acrylate
d,l-menthyl acrylate
beta-carboxyethyl acrylate
1h,1h,11h-eicosafluoroundecyl acrylate
2-fluoroethyl acrylate
1h,1h,2h,2h-perfluorodecyl acrylate
pentafluorobenzyl acrylate
pentafluorophenyl acrylate
1h,1h,2h,2h-perfluorooctyl acrylate
2,2,3,3-tetrafluoropropyl acrylate
isobutyl acrylate
lauryl acrylate
n,n-diethylaminoethyl acrylate
2-ethoxyethyl acrylate
(r)-(+)-alpha-acryloyloxy-beta,beta-dimethyl-gamma-butyrolactone
2,2,3,4,4,4-hexafluorobutyl acrylate
2-chloroethyl acrylate
cyclohexyl acrylate
methallyl acrylate
phenyl acrylate
acrylic anhydride
benzyl acrylate
2-methoxyethyl acrylate
cinnamyl acrylate
3-methoxybutyl acrylate
iso-propyl acrylate
n-decyl acrylate
undecyl acrylate
tridecyl acrylate
2-ethylbutyl acrylate
n-propyl acrylate
acryloxytri-n-butyltin
2-n-butoxyethyl acrylate
n-amyl acrylate
n-hexyl acrylate
n-heptyl acrylate
n-octyl acrylate
2-hydroxy-3-chloropropyl acrylate
2-phenoxyethyl acrylate
iso-amyl acrylate
sec-butyl acrylate
n-(3-acryloxy-2-hydroxypropyl)-3-aminopropyltriethoxysilane
(3-acryloxypropyl)methylbis(trimethylsiloxy)silane
(3-acryloxypropyl)dimethylmethoxy-silane
3-acryloxypropyl tris(trimethylsiloxy)silane
(3-acryloxypropyl)trimethoxysilane
(3-acryloxypropyl)methyldichlorosilane
(3-acryloxypropyl)trichlorosilane
vinyl acrylate
2,3-dibromopropyl acrylate
mono-(acryloyloxyethyl)phthalate
3-acryloxypropyl-2-n-phenyl carbamate
2-hydroxy-3-phenoxypropyl acrylate
potassium acrylate
sodium acrylate
[2-(acryloyloxy)ethyl](4-benzoylbenzyl)dimethylammonium bromide
n-acryloxysuccinimide
1h,1h,9h-hexadecafluorononyl acrylate
3,3,5-trimethylcyclohexyl acrylate
n-nonyl acrylate
cyclopentyl acrylate
perfluorooctyl acrylate
2-allyloxyethoxyethyl acrylate
crotyl acrylate
4-cumylphenyl acrylate
2,4,6-tribromophenyl acrylate
hexadecyl acrylate
propargyl acrylate
acrylate, ammonium
acrylate, cesium
lithium acrylate
acrylate, rubidium
n-(acryloxyethyl)phthalimide
n-(acryloxyethyl)succinimide
mono-2-acryloyloxyethyl maleate
2-allyloxyethyl acrylate
allyloxy propyl acrylate
behenyl acrylate
1,3-bis(4-benzoyl-3-hydroxyphenoxy)-2-propyl acrylate
isobornyl acrylate
2-(bromo-1-naphthyloxy)-ethyl acrylate
2-(1-bromo-2-naphthyloxy)-ethyl acrylate
p-chlorophenoxyethyl acrylate
4-chlorophenyl acrylate
2-cyanoethoxyethyl acrylate
cyclol acrylate
iso-decyl acrylate
dibutyltin acrylate n,n-diethylaminoethyl acrylate q-salt, methosulfate
[2-(acryloyloxy)ethyl]trimethylammonium chloride
3,6-dioxaheptyl acrylate
furfuryl acrylate
2,3-dihydroxypropyl acrylate
hexoxyethyl acrylate
3-iodobenzyl acrylate
d-menthyl acrylate
l-menthyl acrylate
2-methyl butyl acrylate
2-n-morpholinoethyl acrylate
alpha-naphthyl acrylate
beta-naphthyl acrylate
2-(1-naphthyloxy)-ethyl acrylate
2-(2-naphthyloxy)-ethyl acrylate
2-nitroethyl acrylate
p-nitrophenyl acrylate
nonylphenyl acrylate
norbornyl acrylate
2-octyl acrylate
isooctyl acrylate
pentabromophenyl acrylate
pentachlorophenyl acrylate
neo-pentyl acrylate
(perfluorocyclohexyl)methyl acrylate
2-phenylethyl acrylate
phenylpropyl acrylate
mono-2-acryloyloxyethyl phthalate
1-piperidineethyl acrylate
silver acrylate
sorbitol acrylate
trichloroethyl acrylate
[2-(acryloyloxy)ethyl]trimethylammonium methyl sulfate
3,5,5-trimethylhexyl acrylate
vinylbenzyl acrylate
2-(n-butylperfluorooctanesulfamido)ethyl acrylate
2-(n-ethylperfluorooctanesulfamido)ethyl acrylate
3-(trifluoromethyl)benzyl acrylate
1h,1h,7h-dodecafluoroheptyl acrylate
3-dimethylamino neopentyl acrylate
1h,1h,3h-hexafluorobutyl acrylate
2-(4-benzoyl-3-hydroxyphenoxy)ethyl acrylate
monoacryloxyethyl phosphate
2,2-dinitropropyl acrylate
abitol acrylate
potassium acrylate, hemihydrate
2-(acryloxyethoxy)trimethylsilane
(3-acryloxypropyl)methyldimethoxysilane
acryloxytrimethylsilane
acryloxytriphenyltin
sodium acrylate, hemihydrate
dicyclopentenyl acrylate
dicaprolactone 2-(acryloyloxy)ethyl ester
di(ethylene glycol) 2-ethylhexyl ether acrylate
dicyclopentenyloxyethyl acrylate
3-(dimethylamino)propyl acrylate
4,4-dimethyl-2-oxotetrahydrofuran-3-yl acrylate
2-(perfluorobutyl)ethyl acrylate
3-(perfluorobutyl)-2-hydroxypropyl acrylate
3-(perfluorohexyl)-2-hydroxypropyl acrylate
3-(perfluorooctyl)-2-hydroxypropyl acrylate
2-(perfluorodecyl)ethyl acrylate
2-(perfluoro-3-methylbutyl)ethyl acrylate
3-(perfluoro-3-methylbutyl)-2-hydroxypropyl acrylate
2-(perfluoro-5-methylhexyl)ethyl acrylate
2-(perfluoro-9-methyloctyl)ethyl acrylate
2-(perfluoro-9-methyldecyl)ethyl acrylate
urethane acrylate
mono-2-(acryloyloxy)ethyl succinate
heptafluoro-2-propyl acrylate
(3-(allanoyloxy)-5-[4-(benzoylamino)-2-oxopyrimidin-1 (2h)-yl]tetrahydrofuran-2-y
dihydrodicyclopentadienyl acrylate
2-(acryloyloxy)ethyl acetoacetate
acrylic acid 3-(1-oxo-1,3-dihydro-isoindol-2-yl)-phenyl ester
4-tert-butylcyclohexyl acrylate
acrylic acid 3-(3,5-dioxo-4-aza-tricyclo(5.2.1.0(2,6))dec-8-en-4-yl)-ph ester
acrylic acid 3-(4-nitro-1,3-dioxo-1,3-dihydro-isoindol-2-yl)-phenyl ester
acrylic acid 3-(4,5,6,7-tetrachloro-1,3-dioxo-1,3-2h-isoindol-2-yl)-phenyl ester
methyl furyl acrylate
rcl r35,845-2
acrylic acid 3-(2,5-dioxo-pyrrolidin-1-yl)-phenyl ester
acrylic acid 3-(1,3-dioxo-1,3-dihydro-isoindol-2-yl)-phenyl ester
cobalt acrylate
manganese acrylate
3-acryloyloxypropyl-2-n-phenyl carbamate
acrylated bisphenol "a" glycidyl ether
3-(perfluoro-5-methylhexyl)-2-hydroxypropyl acrylate
3-(perfluoro-7-methyloctyl)-2-hydroxypropyl acrylate
neopentyl glycol acrylate benzoate
2'-cinnamoyloxyethyl acrylate
triisopropylsilyl acrylate
uvecryl p 36
2-[[(butylamino)carbonyl]oxy]ethyl acrylate
1h,1h-perfluoro-n-decyl acrylate
methacrylic acid
2-hydroxyethyl methacrylate
2-hydroxypropyl methacrylate
glycidyl methacrylate
methacrylic anhydride
methyl methacrylate
2-(dimethylamino)ethyl methacrylate
allyl methacrylate
3-methacryloxypropyltrimethoxysilane
isobutyl methacrylate
lauryl methacrylate
ethyl methacrylate
2-ethoxyethyl methacrylate
n-butyl methacrylate
2-ethylhexyl methacrylate
potassium sulfopropylmethacrylate
2,2,2-trifluoroethyl methacrylate
cyclohexyl methacrylate
tetrahydrofurfuryl methacrylate
2-(tert-butylamino)ethyl methacrylate
n-hexyl methacrylate
1,6-hexanediol dimethacrylate
3-methyl-2-benzothiazolinone, azine with 4'(2-(me-acryloyl-o)ethoxy)acetophenone
2-(p-nitrophenoxy)ethyl methacrylate
stearyl methacrylate
2-hydroxy-3-methacryloxypropyl trimethyl ammonium chloride
2-phenylethyl methacrylate
2-(diethylamino)ethyl methacrylate
1h,1h-perfluorooctyl methacrylate
1h,1h-heptafluorobutyl methacrylate
2,2,3,3,3-pentafluoropropyl methacrylate
1h,1h,5h-octafluoropentyl methacrylate 1,1,1,3,3,3-hexafluoroisopropyl methacrylate
n-(3-sulfopropyl)-n-methacryloxyethyl-n,n-dimethylammonium betaine
3-chloro-2-hydroxypropyl methacrylate
d,l-menthyl methacrylate
1h,1h,11h-perfluoroundecyl methacrylate
2-fluoroethyl methacrylate
1h,1h,2h,2h-perfluorodecyl methacrylate
2,2,3,4,4,4-hexafluorobutyl methacrylate
pentafluorobenzyl methacrylate
pentafluorophenyl methacrylate
2,2,3,3-tetrafluoropropyl methacrylate
2-bromoethyl methacrylate
methacrylato chromic chloride
2-chloroethyl methacrylate
cyclopentyl methacrylate
1,4-cyclohexanedimethyl 1,4-dimethacrylate
2-cyanoethyl methacrylate
barium methacrylate
potassium methacrylate
magnesium methacrylate
sodium methacrylate
zinc methacrylate
furfuryl methacrylate
phenyl methacrylate
neopentyl glycol dimethacrylate
methallyl methacrylate
2-methoxyethyl methacrylate
propargyl methacrylate
3-methoxybutyl methacrylate
tert-butyl methacrylate
isopropyl methacrylate
iso-amyl methacrylate
n-decyl methacrylate
sec-butyl methacrylate.
2-ethylbutyl methacrylate
n-propyl methacrylate
2-n-butoxyethyl methacrylate
hydroxypropyl methacrylate
methacryloxypropylmethyidichlorosilane
benzyl methacrylate
2-phenoxyethyl methacrylate
methacryloxypropyltris(methoxyethoxy)silane
3-methacryloxypropyl pentamethyl disiloxane
iso-decyl methacrylate
methacryloxytri-n-butyltin
n-amyl methacrylate
n-octyl methacrylate
trimethylsilyl methacrylate
2-(trimethylsiloxy)ethyl methacrylate
methacryloxypropylbis(trimethylsiloxy)methylsilane
methacryloxypropyltris(trimethylsiloxy)silane
methacryloxypropyidimethylethoxysilane
3-methacryloxypropylmethyidiethoxysilane
3-methacryloxypropyldimethylchlorosilane
2-methacryloxyethyldimethyl(3-trimethoxysilylpropyl)ammonium chloride
acetoacetoxyethyl methacrylate
methacryloxypropyltrichlorosilane
3-methacryloxypropyltris(vinyidimethylsiloxy)silane
trimethylsilylmethyl methacrylate
(methacryloxymethyl)phenyldimethylsilane
methacryloxypropenyl trimethoxysilane
methacrylate, calcium
tridecyl methacrylate
vinyl methacrylate
methoxyethoxyethyl methacrylate
[2-(methacryloyloxy)ethyl]trimethylammonium chloride
mono-(2-(methacryloyloxy)-ethyl)phthalate
2-hydroxy-3-phenoxypropyl methacrylate
methacryloxypropyltriethoxysilane
2-diisopropylaminoethyl methacrylate
1h,1h,2h,2h-perfluorooctyl methacrylate
2-aminoethyl methacrylate hydrochloride
2-trimethylammonium ethyl methacrylate methosulfate
trityl methacrylate
perfluorooctyl methacrylate
2,4,6-tribromophenyl methacrylate
4-hydroxybutyl methacrylate
hexadecyl methacrylate
undecyl methacrylate
n-nonyl methacrylate
2-allyloxyethoxyethyl methacrylate
3,3,5-trimethylcyclohexyl methacrylate
2,3-dibromopropyl methacrylate
cinnamyl methacrylate
crotyl methacrylate
1h,1h,9h-hexadecafluorononyl methacrylate
n-heptyl methacrylate
2-allyloxyethyl methacrylate
allyloxy propyl methacrylate
neo-pentyl methacrylate
2-(1-aziridinyl)-ethyl methacrylate
behenyl methacrylate
5-norbornene-2-methanol methacrylate
1,3-bis(4-benzoyl-3-hydroxyphenoxy)-2-propyl methacrylate
ethoxyethoxyethyl methacrylate
p-chlorophenoxyethyl methacrylate
4-cumylphenyl methacrylate
dibutyltin methacrylate
n,n-diethylaminoethyl methacrylate q-salt, methosulfate
diethylene glycol mono-methacrylate
2,3-dihydroxypropyl methacrylate
3,3-dimethyl butanol-2 methacrylate
ethyl triglycol methacrylate
ethylidene dimethacrylate
ethylthioethyl methacrylate
hexoxyethyl methacrylate
2-(1-imidazoloyl)ethyl methacrylate
3-iodobenzyl methacrylate
isocyanatoethyl methacrylate
d-menthyl methacrylate
l-menthyl methacrylate
aluminum methacrylate
n-(methacryloxyethyl)phthalimide
n-(methacryloxyethyl)succinimide
4-methacryloxyethyl trimellitic anhydride
4-methacryloxy-2-hydroxybenzophenone
mono-(2-(methacryloyloxy)-ethyl)maleate
2-methacryloyloxymethyl-2,3-dihydro-4h-pyran
methoxypropyl methacrylate
3-methyl butanol-2 methacrylate
3-methylbuten-2-yl-methacrylate
2-methyl butyl methacrylate
3-(4-methylphenoxy)-2-hydroxypropyl methacrylate
2-n-morpholinoethyl methacrylate
alpha-naphthyl methacrylate
2-naphthyl methacrylate
2-(1-naphthyloxy)-ethyl methacrylate
2-(2-naphthyloxy)-ethyl methacrylate
2-nitroethyl methacrylate
p-nitrophenyl methacrylate
nonylphenyl methacrylate norbornyl methacrylate
iso-octyl methacrylate
pentabromophenyl methacrylate
pentachlorophenyl methacrylate
perfluorocyclohexyl methyl methacrylate
phenylpropyl methacrylate
1-piperidineethyl methacrylate
sorbitol methacrylate
2-sulfoethyl methacrylate
tribromoneopentyl methacrylate
trichloroethyl methacrylate
1h,1h,7h-dodecafluoroheptyl methacrylate
3,5,5-trimethylhexyl methacrylate
methacryloxyethoxy tris(trimethylsiloxy)silane
vinylbenzyl methacrylate
2-(n-ethylperfluorooctanesulfamido)ethyl methacrylate
3-(trifluoromethyl)benzyl methacrylate
isobornyl methacrylate
poly(ethylene glycol)methacrylate
hydroxypropyl methacrylate
lead methacrylate 2-ethylhexanoate
2-methacryloxyethyl glucoside
bis-(2,3-dibromopropyl) 2-(methacryloyloxy)-ethyl phosphate
3-methyl-2-benzothiazolinone, azine with 4-(2-(me-acryloyl-o)eto)-m-anisaldehyde
2-(methacryloyloxy)ethyl n-(3-bromophenyl)carbamate
2-(methacryloyloxy)ethyl n-(n-(3,5-dichlorophenyl)carbamoyl)carbamate
2-(methacryloyloxy)ethyl n-(4-isopropylphenyl)carbamate
ethylene glycol methacrylate phosphate
trimethylol propane diallyl ether mono-methacrylate
abitol methacrylate
isocyanatoethyl methacrylate butyl urethane
isocyanatoethyl methacrylate octyl urethane
isocyanatoethyl methacrylate caprolactam adduct
isocyanatoethyl methacrylate pyrrolidone adduct
methacrylic acid hydroxypropyl ester
calcium methacrylate, hydrate
2-hydroxy-4-[2-hydroxy-3-(methacryloyloxy)-propoxy] benzophen
methacryloxydiphenylantimony
(2-methacryloxyethoxy)triisopropoxytitanate
(methacryloxymethyl)bis(trimethylsiloxy)methylsilane
(methacryloxymethyl)dimethylethoxysilane
methacryloxymethyltriethoxysilane
methacryloxymethyltrimethoxysilane
methacryloxymethyltrimethylgermane
methacryloxymethyltris(trimethylsiloxy)silane
methacryloxypropyldimethylmethoxysilane
methacryloxypropylmethyldimethoxysilane
methacryloxypropylsilatrane
methacryloxytriethylgermane
titanium methacrylate triisopropoxide
dicyclopentenyl methacrylate
tetrahydropyranyl methacrylate
caprolactone 2-(methacryloyloxy)ethyl ester
2-methyl-2-nitropropyl methacrylate
2-(2-oxo-1-imidazolidinyl)ethyl methacrylate
tetrakis(2-methacryloxyethoxy)silane
2-(methylthio)ethyl methacrylate
2-[3-(2h-benzotriazol-2-yl)-4-hydroxyphenyl]ethyl methacrylate
dicyclopentenyloxyethyl methacrylate
2-methyl-acrylic acid 4-hydroxy-phenyl ester
2-(perfluorobutyl)ethyl methacrylate
2-(perfluorodecyl)ethyl methacrylate
2-(perfluoro-3-methylbutyl)ethyl methacrylate
3-(perfluoro-3-methylbutyl)-2-hydroxypropyl methacrylate
2-(perfluoro-5-methylhexyl)ethyl methacrylate
3-(perfluoro-5-methylhexyl)-2-hydroxypropyl methacrylate
2-(perfluoro-7-methyloctyl)ethyl methacrylate
3-(perfluoro-7-methyloctyl)-2-hydroxypropyl methacrylate
2-(perfluoro-9-methyldecyl)ethyl methacrylate
3-(perfluoro-8-methyldecyl)-2-hydroxypropyl methacrylate
(9-anthryl)methacrylate
(9-phenanthryl)methyl methacrylate
n-(3-methacryloxy-2-hydroxypropyl)-3-aminopropyltriethoxysilane
4-(methacryloyloxy)chalcone
mono-2-(methacryloyloxy)ethyl succinate
2-(sulfooxy)ethyl methacrylate, ammonium salt
ethylene methacrylate phosphate
2-me-acrylic acid 2-(4-(1,3-dioxo-1,3-dihydro-isoindol-2-yl)-phenyl)-ethyl ester
2-(2'-methacryloxy-5'-methylphenyl)benzotriazole
2-me-acrylic acid 3(3,5-dioxo-4-aza-tricyclo(5.2.1.0(2,6)) dec-8-en-4-yl)ph ester
2-me-acrylic acid 4-(4-nitro-1,3-dioxo-1,3-dihydro-isoindol-2-yl)-phenyl ester
rcl r35,715-4
9-anthracenylmethyl methacrylate
1-pyrenylmethyl methacrylate
2-methyl-acrylic acid 3-(1-oxo-1,3-dihydro-isoindol-2-yl)-phenyl ester
2-me-acrylic acid 3-(4-nitro-1,3-dioxo-1,3-dihydro-isoindol-2-yl)-phenyl ester
2-methyl-acrylic acid 3-(2,5-dioxo-pyrrolidin-1-yl)-phenyl ester
2-methyl-acrylic acid 4-(2,5-dioxo-pyrrolidin-1-yl)-phenyl ester
rcl r35,836-3
2-methyl-acrylic acid 4-acetylamino-phenyl ester
(1-pyrene)methyl methacrylate
2-hydroxypropyl 2-(methacryloyloxy)ethyl phthalate
peg monomethacrylate
3-methylbuten-2-yl-l-methacrylate
(methacryloxymethyl)bis(trimethylsiloxy)-(methylsiloxy) methylsilane
(r)-2-hydroxy-2'-methacryloxy-1,1'-bi-2-naphthol
4-[[6-(methacryloyloxy)hexyl]oxy]benzenecarboxylic acid
hexafluoroisopropyl urethane of isocyanato ethyl methacrylate
dicyclopentenyl-2-methacrylate
(r)-(−)-isobornylmethacrylate
3-perfluorohexyl-2-hydroxypropyl methacrylate
3-perfluorooctyl-2-hydroxypropyl methacrylate
(1-naphthyl)ethyl methacrylate
(1-naphthyl)methyl methacrylate
o-methacryloyl hoechst 33258
o-(methacryloxyethyl)-n-(triethoxysilylpropyl)urethane
4-[3-(methacryloyloxy)propoxy]benzenecarboxylic acid
4-[4-(methacryloyloxy)butoxy]benzenecarboxylic acid
hexafluoroisopropylurethane-n-ethyl methacrylate
2-methyl-acrylic acid 2-(4-(4,5-dihydro-oxazol-2-yl)-phenoxy)-ethyl ester
3-methacryloxypropyltris(pentamethyldisiloxy)silane
di(propylene glycol)allyl ether methacrylate
triacetoneaminoylmethacrylate
1h,1h-perfluoro-n-decyl methacrylate 3-(perfluorobutyl)-2-hydroxypropyl methacrylate 2-methyl-acrylic acid 4-(3-phenyl-acryloyl)-phenyl ester 3-(5-nitro-1,3-dioxo-1,3-dihydro-2h-isoindol-2-yl)phenyl 2-methylacrylate n-(2-hydroxy-3((2-methyl-1-oxo-2-propenyl)oxy)propyl)-n-(4-methylphenyl)-glycine or could be monomers selected for example from U.S. RE36625, U.S. Pat. No. 6,201,087, U.S. Pat. No. 6,107,427, U.S. Pat. No. 6,632,909, U.S. Pat. No. 6,649,230, U.S. Pat. No. 6,833,421, WO-02/053609, WO-03/008472, and WO-2004/060861.

The polyamic acids, polyamic acid esters and polyimides according to the present invention may be prepared in line with known methods, such as those described in Plast. Eng. 36 (1996), (Polyimides, fundamentals and applications), Marcel Dekker Inc. For example, the polycondensation reaction for the preparation of the polyamic acids is carried out in solution in a polar aprotic organic solvent, such as γ-butyrolactone, N,N-dimethylacetamide, N-methylpyrrolidone or N,N-dimethylformamide. In most cases equimolar amounts of the dianhydride and the diamine are used, that is to say one amino group per anhydride group. If it is desired to stabilise the molecular weight of the polymer, it is possible for that purpose to add an excess or a less-than-stoichiometric amount of one of the two components or to add a monofunctional compound in the form of a dicarboxylic acid monoanhydride or in the form of a monoamine. Examples of such monofunctional compounds are maleic anhydride, phthalic anhydride, aniline and so on. The reaction is carried out preferably at a temperature of less than 100° C.

The cyclisation of the polyamic acids to form the polyimides can be carried out by heating, that is to say by condensation with removal of water or by other imidisation reactions with reagents. When carried out purely thermally, the imidisation of the polyamic acids is not always complete, that is to say the resulting polyimides may still contain proportions of polyamic acid. The imidisation reactions are generally carried out at a temperature of from 60 to 250° C., but preferably at less than 200° C. In order to achieve imidisation at rather lower temperatures there are additionally mixed into the reaction mixture reagents that facilitate the removal of water. Such reagents are, for example, mixtures consisting of acid anhydrides, such as acetic acid anhydride, propionic acid anhydride, phthalic acid anhydride, trifluoroacetic acid anhydride, and tertiary amines, such as triethylamine, trimethylamine, tributylamine, pyridine, N,N-dimethylaniline, lutidine, collidine etc. The amount of reagents used in that case is preferably at least two equivalents of amine and four equivalents of acid anhydride per equivalent of polyamic acid to be condensed.

The imidisation reaction can be carried out before or alternatively only after application to a support. The latter variant is preferred especially when the polyimide in question has poor solubility in the customary solvents.

Thus the polymer material or oligomer material from the class of polyamic acids, polyamic acid esters or polyimides (and any mixtures thereof) may be obtained by or obtainable by the reaction of at least one compound represented by the general formula (I) wherein G represents a diamine group and optionally one or more additional other diamines (as e.g. given above), with one or more tetracarboxylic acid anhydrides of the general formula (IV)

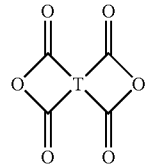

(IV)

wherein:

T represents a tetravalent organic radical.

The tetravalent organic radical T is preferably derived from an aliphatic, alicyclic or aromatic tetracarboxylic acid dianhydride.

Preferred examples of aliphatic or alicyclic tetracarboxylic acid dianhydrides are:

1,1,4,4-butanetetracarboxylic acid dianhydride, ethylenemaleic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornylacetic acid dianhydride, 2,3,4,5-tetrahydrofurantetracarboxylic acid dianhydride, rel-[1S,5R,6R]-3-oxabicyclo[3.2.1]octane-2,4-dione-6-spiro-3'-(tetrahydrofuran2',5'-dione), 4-(2,5-dioxotetrahydrofuran-3-yl)tetrahydronaphthalene-1,2-dicarboxylicacid dianhydrid 5-(2,5-dioxotetrahydrofuran-3-yl)-3-methyl-3-cyclohexene-1,2-dicarboxylic-acid dianhydride, bicyclo[2.2.2]oct-7-ene-2,3,5,6-tetracarboxylic acid dianhydride, bicyclo[2.2.2]octane-2,3,5,6-tetracarboxylic acid dianhydride, 1,8-dimethylbicyclo[2.2.2]oct-7-ene-2,3,5,6-tetracarboxylic acid dianhydride, and the like.

Preferred examples of aromatic tetracarboxylic acid dianhydrides are:

pyromellitic acid dianhydride, 3,3',4,4'-benzophenonetetracarboxylic acid dianhydride, 4,4'-oxydiphthalic acid dianhydride, 3,3',4,4'-diphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-dimethyidiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenyipropane dianhydride, 3,3',4,4'-biphenyltetracarboxylic acid dianhydride, ethylene glycol bis(trimellitic acid)dianhydride, 4,4'-(1,4-phenylene)bis(phthalic acid)dianhydride, 4,4'-(1,3-phenylene)bis(phthalic acid)dianhydride, 4,4'-(hexafluoroisopropylidene)diphthalic acid dianhydride, 4,4'-oxydi(1,4-phenylene)bis(phthalic acid)dianhydride, 4,4'-methylenedi(1,4-phenylene)bis(phthalic acid)dianhydride, and the like.

More preferably the tetracarboxylic acid dianhydrides used to form the tetravalent organic radical T are selected from:

1,2,3,4-cyclobutanetetracarboxylic acid dianhydride,
1,2,3,4-cyclopentanetetracarboxylic acid dianhydride,
2,3,5-tricarboxycyclopentylacetic acid dianhydride,
5-(2,5-dioxotetrahydrofuran-3-yl)-3-methyl-3-cyclohexene-1,2-dicarboxylic acid dianhydride,
4-(2,5-dioxotetrahydrofuran-3-yl)tetrahydronaphthalene-1,2-dicarboxylic acid dianhydride,
4,4'-(hexafluoroisopropylidene)diphthalic acid dianhydride and
bicyclo[2.2.2]oct-7-ene-2,3,5,6-tetracarboxylic acid dianhydride.

The term "diamine" or "diamine compound" is to be understood as designating a chemical structure which has at least two amino groups, i.e. which may also have 3 or more amino groups.

The diamine represents an optionally substituted aliphatic, aromatic or alicyclic diamino group having from 1 to 40 carbon atoms and preferably made from or selected from the following group of structures: aniline, p-phenylenediamine, m-phenylenediamine, benzidine, diaminofluorene, or their derivatives, with the proviso that compounds listed which do not carry two amino groups are taken as derivatives with at least one additional amino group, and more preferably made from or selected from the following commercially available amino compounds (example of suppliers: Aldrich, ABCR, ACROS, Fluka) which can also be used as comonomers:

4-amino-2,3,5,6-tetrafluorobenzoic acid
4-amino-3,5-diiodobenzoic acid, 3,4-diaminobenzoic acid
4-amino-3-methylbenzoic acid,
4-amino-2-chlorobenzoic acid
4-aminosalicylic acid
4-aminobenzoic acid
4-aminophthalic acid
1-(4-aminophenyl)ethanol
4-aminobenzyl alcohol
4-amino-3-methoxybenzoic acid
4-aminophenyl ethyl carbinol
4-amino-3-nitrobenzoic acid
4-amino-3,5-dinitrobenzoic acid
4-amino-3,5-dichlorobenzoic acid
4-amino-3-hydroxybenzoic acid
4-aminobenzyl alcohol hydrochloride
4-aminobenzoic acid hydrochloride
pararosaniline base
4-amino-5-chloro-2-methoxybenzoic acid
4-(hexafluoro-2-hydroxyisopropyl)aniline
piperazine-p-amino benzoate
4-amino-3,5-dibromobenzoic acid
isonicotinic acid hydrazide p-aminosalicylate salt
4-amino-3,5-diiodosalicylic acid
4-amino-2-methoxybenzoic acid
2-[2-(4-aminophenyl)-2-hydroxy-1-(hydroxymethyl)ethyl]isoindoline-1,3-dione
4-amino-2-nitrobenzoic acid
2,4-diaminobenzoic acid
p-aminobenzoic acid,
[3,5-3h]-4-amino-2-methoxybenzoic acid
L-(+)-threo-2-amino-1-(4-aminophenyl)-1,3-propanediol
L-(+)-threo-2-(N,N-dimethylamino)-1-(4-aminophenyl)-1,3-propanediol
ethyl 2-(4-aminophenyl)-3,3,3-trifluoro-2-hydroxypropanoate
ethyl 2-(4-amino-3-methylphenyl)-3,3,3-trifluoro-2-hydroxypropanoate
ethyl 2-(4-amino-3-methoxyphenyl)-3,3,3-trifluoro-2-hydroxypropanoate
3,4-diaminobenzyl alcohol dihydrochloride
4-aminonaphthalene-1,8-dicarboxylic acid
4-amino-3-chloro-5-methylbenzoic acid
4-amino-2,6-dimethylbenzoic acid
4-amino-3-fluorobenzoic acid
4-amino-5-bromo-2-methoxybenzenecarboxylic acid
2,7-diaminofluorene
4,4'-diaminooctafluorobiphenyl
3,3'-diaminobenzidine
3,3',5,5'-tetramethylbenzidine
3,3'-dimethoxybenzidine
o-tolidine
3,3'-dinitrobenzidine
2-nitrobenzidine
3,3'-dihydroxybenzidine
o-olidine sulfone
benzidine,
3,3'-dichlorobenzidine
2,2',5,5'-tetrachlorobenzidine,
benzidine-3,3'-dicarboxylic acid
4,4'-diamino-1,1'-binaphthyl
4,4'-diaminodiphenyl-3,3'-diglycolic acid
dihydroethidium
o-dianisidine
2,2'-dichloro-5,5'-dimethoxybenzidine
3-methoxybenzidine
3,3'-dichlorobenzidine(diphenyl-d6),
2,7-diamino-9-fluorenone
3,5,3',5'-tetrabromo-biphenyl-4,4'-diamine
2,2'-bis(trifluoromethyl)benzidine
2,2'-dichloro[1,1'-biphenyl]-4,4'-diamine
3,9-diamino-1,11-dimethyl-5,7-dihydro-dibenzo(a,c)cyclohepten-6-one
3,3'-bis(trifluoromethyl)benzidine
dibenzo(1,2)dithiine-3,8-diamine
3,3'-tolidine-5-sulfonic acid
3,3'-dichlorobenzidine-d6
tetramethylbenzidine
3,3'-diaminobenzophenone, 3,3'-diaminodiphenylmethane,
4,4-bis-(3-amino-4-hydroxyphenyl)-valeric acid
2,2-bis(3-amino-4-hydroxyphenyl)hexafluoropropane
2,2-bis(3-amino-4-methylphenyl)hexafluoropropane
tetrabromo methylenedianiline
2,7-diamino-9-fluorenone
2,2-bis(3-aminophenyl)hexafluoropropane
bis-(3-amino-4-chloro-phenyl)-methanone
bis-(3-amino-4-dimethylamino-phenyl)-methanone
3-[3-amino-5-(trifluoromethyl)benzyl]-5-(trifluoromethyl)aniline
1,5-diaminonaphthalene or their derivatives, again with the proviso that compounds listed which do not carry two amino groups are taken as derivatives with at least one additional amino group.

Preferred examples of additional other diamines are:
ethylenediamine, 1,3-propylenediamine, 1,4-butylenediamine, 1,5-pentylenediamine,
1,6-hexylenediamine, 1,7-heptylenediamine, 1,8-octylenediamine, 1,9-nonylenediamine, 1,10-decylenediamine, 1,11-undecylenediamine,
1,12-dodecylenediamine, α,α'-diamino-m-xylene, α,α'-diamino-p-xylene,
(5-amino-2,2,4-trimethylcyclopentyl)methylamine, 1,2-diaminocyclohexane,
4,4'-diaminodicyclohexylmethane, 1,3-bis(methylamino)cyclohexane,
4,9-dioxadodecane-1,12-diamine, 3,5-diaminobenzoic acid methyl ester,
3,5-diaminobenzoic acid hexyl ester, 3,5-diaminobenzoic acid dodecyl ester,
3,5-diaminobenzoic acid isopropyl ester, 4,4'-methylenedianiline, 4,4'-ethylenedianiline,
4,4'-diamino-3,3'-dimethyldiphenylmethane, 3,3',5,5'-tetramethylbenzidine,
4,4'-diaminodiphenyl sulfone, 4,4'-diaminodiphenyl ether, 1,5-diaminonaphthalene,
3,3'-dimethyl-4,4'-diaminobiphenyl, 3,4'-diaminodiphenyl ether,
3,3'-diaminobenzophenone, 4,4'-diaminobenzophenone,
4,4'-diamino-2,2'-dimethylbibenzyl, bis[4-(4-aminophenoxy)phenyl]sulfone,
1,4-bis(4-aminophenoxy)benzene, 1,3-bis(4-aminophenoxy)benzene,
1,3-bis(3-aminophenoxy)benzene, 2,7-diaminofluorene,
9,9-bis(4-aminophenyl)fluorene, 4,4'-methylene-bis(2-chloroaniline),
4,4'-bis(4-aminophenoxy)biphenyl, 2,2',5,5'-tetrachloro-4,4'-diaminobiphenyl,
2,2'-dichloro-4,4'-diamino-5,5'-dimethoxybiphenyl, 3,3'-dimethoxy-4,4'-diaminobiphenyl,
4,4-(1,4-phenyleneisopropylidene)bisaniline,
4,4'-(1,3-phenyleneisopropylidene)bisaniline,
2,2-bis[4-(4-aminophenoxy)phenyl]propane,
2,2-bis[3-(4-aminophenoxy)phenyl]hexafluoropropane,
2,2-bis[3-amino-4-methylphenyl]hexafluoropropane,
2,2-bis(4-aminophenyl)hexafluoropropane,
2,2'-bis[4-(4-amino-2-trifluoromethylphenoxy)phenyl]hexafluoropropane,
4,4'-diamino-2,2'-bis(trifluoromethyl)biphenyl, and
4,4'-bis[(4-amino-2-trifluoromethyl)phenoxy]-2,3,5,6,2',3',5',6'-octafluorobiphenyl,
as well as diamines disclosed in U.S. Pat. No. 6,340,506, WO-00/59966 and WO-01/53384.

The polymers of the present invention have a molecular weight $M_w$ between 1 000 and 5 000 000, preferably however between 5 000 and 2 000 000, especially advantageously however between 10 000 and 1 000 000.

The number of monomer building blocks from which the polymer chains according to the invention are synthesised can vary within a wide range. It is generally from 2 to 2000, but especially from 3 to 200.

The polymers according to the invention may further contain additives such as silane-containing compounds and epoxy-containing crosslinking agents for further improving the adhesion of the polymer to a substrate. Example for silane adhesion promoters were described in the literature, for example *Plast. Eng.* 36 (1996) (Polyimides, fundamentals and applications). The above epoxy-containing crosslinking agent preferably includes 4,4'-methylenebis(N,N-diglycidylaniline), trimethylolpropane triglycidyl ether, benzene-1,2,4,5-tetracarboxylic acid 1,2:4,5-N,N'-diglycidyidiimide, polyethylene glycol diglycidyl ether, N,N-diglycidylcyclohexylamine and the like.

The polymers according to the invention may contain additives such a photosensitiser, a photoradical generator and/or a cationic photoinitiator. Example for such additives were 2,2-dimethoxyphenylethanone, mixture of diphenylmethanone and N,N-dimethylbenzenamine or ethyl 4-(dimethylamino)benzoate, xanthone, thioxanthone, IRGACURE™ 184, 369, 500, 651 and 907 (Ciba), Michler's ketone, triaryl sulfonium salt and the like.

The polymers according to the invention may be used as a single polymer or as mixture with other polymers, oligomers, monomers, photoactive polymers, photoactive oligomers and/or photoactive monomers. Thus the properties of the layer may be modified to give what is sought. For example, an induced pretilt angles, good surface wetting, high voltage holding ratio, a specific anchoring energy etc. may be obtained.

The polymers according to the invention can then be applied to a support and, after any imidisation step which may be necessary, crosslinked by irradiation with linearly polarised light, that is to say by cycloaddition of their side-chains containing the photoreactive group, there being obtained, depending upon the direction of polarisation of the light radiated in, a preferred direction of orientation and of the angle of tilt for liquid crystals that are bought into contact with the alignment layer. By spatially selective irradiation of the molecular units according to the invention it is hence possible for very specific regions of a surface to be aligned and provided with a defined angle of tilt. At the same time the alignment layer so produced is also stabilised by the cycloaddition.

Such alignment layers can be produced, for example, by first preparing a solution of the resulting polymer material, which is applied to a support, which is optionally coated with an electrode (for example a glass plate coated with indium-tin oxide (ITO)), in a spin-coating apparatus, so that homogeneous layers of 5 nanometer to 2 micrometer thickness are produced. Then, or optionally after prior imidisation, the regions to be oriented can be irradiated, for example, with a high-pressure mercury vapour lamp, a xenon lamp or a pulsed UV laser, using a polariser and optionally a mask for creating images of structures. The irradiation time is dependent upon the output of the individual lamps and can vary from a few seconds to several hours. The photoreaction can also be carried out, however, by irradiation of the homogeneous layer using filters that, for example, allow only the radiation suitable for the crosslinking reaction to pass through.

Such alignment layers of the invention may be used in the production of optical or electro-optical devices having at least one orientation layer as well as unstructured and structured optical elements and multi-layer systems. Thus the invention further relates to an optical or electro-optical device comprising one or more oligomers, dendrimers or polymers according to the present invention in cross-linked form.

The examples which follow further illustrate the invention. They are given by way of illustration and not by way of limitation. Variations on these examples falling within the scope of the invention will be apparent to a person skilled in the art.

EXAMPLES

A) Synthesis Examples

Example A1

Preparation of 8-{4-[2-cyano-2-(3,4-dimethoxyphenyl)vinyl]-2-methoxyphenoxy}octyl polymethacrylate

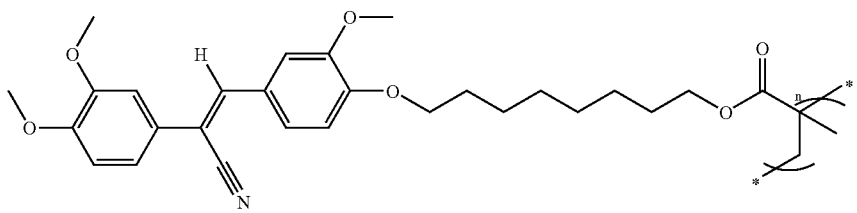

28.4 g (56 mmol) of 8-{4-[2-cyano-2-(3,4-dimethoxyphenyl)vinyl]-2-methoxyphenoxy}octyl methacrylate and 137 mg (0.559 mmol) of 1,1'-Azobis(cyclohexanecarbonitrile) were dissolved in 140 ml of N,N-dimethylformamide. The solution was purged with argon (several vacuum-argon cycles), heated to 80° C. for 16 h. The polymer which was isolated by precipitation in 1.2 l of methanol was filtrated, washed with water and dried overnight at 40° C. under vacuum.

15.0 g of 8-{4-[2-cyano-2-(3,4-dimethoxyphenyl)vinyl]-2-methoxyphenoxy}octyl polymethacrylate as a yellow solid were obtained (54% yield).

$\lambda_{max}$=366 nm

Preparation of 8-{4-[2-cyano-2-(3,4-dimethoxyphenyl)vinyl]-2-methoxyphenoxy}octyl methacrylate

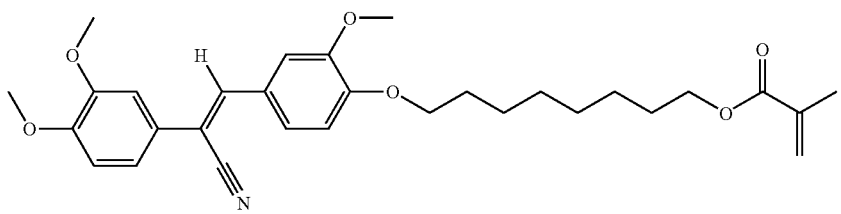

37.5 g (85 mmol) of 8-{4-[2-cyano-2-(3,4-dimethoxyphenyl)vinyl]-2-methoxyphenoxy}-octan-1-ol were dissolved in 200 ml of tetrahydrofurane. 25.9 g (256 mmol) of triethylamine and 1 g (8.5 mmol) of 4-dimethylaminopyridine were added at room temperature. The solution was cooled to 0° C. and 15.8 g (102 mmol) of methacrylic anhydride in 20 ml of tetrahydrofurane were added dropwise to the solution. After 2 h reaction at 0° C., the solution was then allowed to heat up to room temperature. After 15 h reaction, the solution was poured on 1.5 g of icy water. The precipitate was filtrated, washed with water and dried overnight at 40° C. under vacuum. 38.0 g of 8-{4-[2-cyano-2-(3,4-dimethoxyphenyl)vinyl]-2-methoxyphenoxy}octyl methacrylate as a yellow solid were obtained (88% yield).

$\lambda_{max}$=366 nm

Preparation of 8-{4-[2-cyano-2-(3,4-dimethoxyphenyl)vinyl]-2-methoxyphenoxy}-octan-1-ol

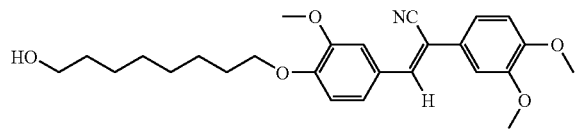

10.0 g (36 mmol) of 4-[(8-hydroxyoctyl)oxy]-3-methoxybenzaldehyde were dissolved in 150 ml tert-Butyl methyl ether. 7.0 g (39 mmol) of (3,4-dimethoxyphenyl)acetonitrile were added at room temperature to the solution. Then, 400 mg (3.6 mmol) potassium tert-butoxyde were added to the dark-yellow solution which was stirred for 20 h at 65° C. The yellow suspension was then poured on 300 ml icy water containing 3 ml acetic acid. The precipitate was filtrated, washed with water and dried overnight at 60° C. under vacuum.

14.2 g (32 mmol) of 8-{4-[2-cyano-2-(3,4-dimethoxyphenyl)vinyl]-2-methoxyphenoxy}-octan-1-ol as a yellow solid were obtained (90% yield).

Preparation of

4-[(8-hydroxyoctyl)oxy]-3-methoxybenzaldehyde

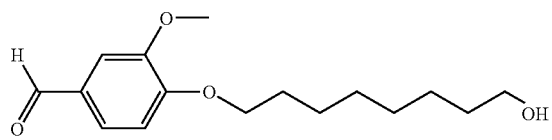

38.0 g (250 mmol) of 4-hydroxy-3-methoxybenzaldehyde and 45.3 g (275 mmol) of 8-chlorooctan-1-ol were dissolved in 100 ml N,N-dimethylformamide. 51.8 g (375 mmol) of potassium carbonate and 415 mg (2.5 mmol) of potassium iodide were added and the suspension was heated to 120° C. After 1 h reaction, the reaction was finished and sodium thiosulfate was added to the mixture which was then poured on 300 ml icy water. The precipitate was filtrated, washed with water and dried overnight at 60° C. under vacuum.

57.0 g of 4-[(8-hydroxyoctyl)oxy]-3-methoxybenzaldehyde as a white solid were obtained (81% yield).

Example A2

This example was prepared in a manner analogous to Example A1.

6-{4-[2-cyano-2-phenylvinyl]phenoxy}hexyl polymethacrylate

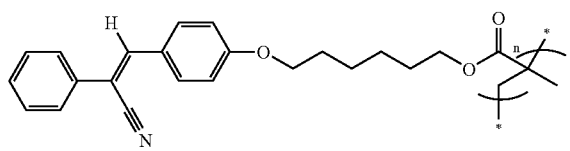

$\lambda_{max}$=335 nm

55% overall yield

Example A3

This example was prepared in a manner analogous to Example A1.

8-{4-[2-cyano-2-phenylvinyl]phenoxy}octyl polymethacrylate

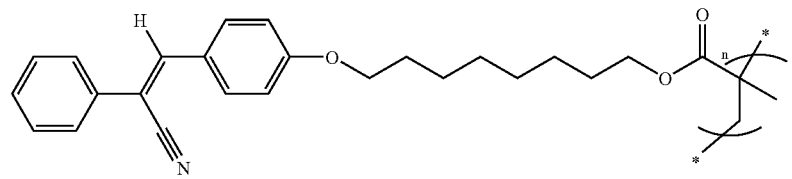

λ$_{max}$=340 nm
43% overall yield

Example A4

This example was prepared in a manner analogous to Example A1.

11-{4-[2-cyano-2-phenylvinyl]phenoxy}undecyl polymethacrylate

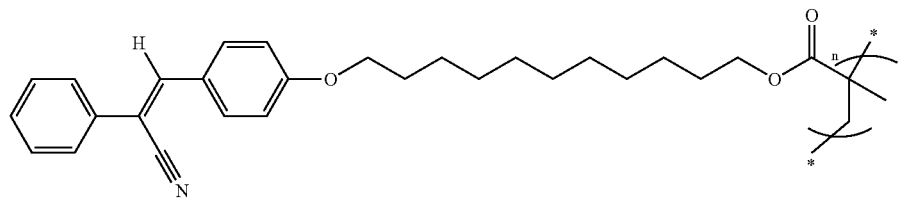

λ$_{max}$=336 nm
47% overall yield

Example A5

This example was prepared in a manner analogous to Example A1.

8-{4-[2-cyano-2-(4-methoxyphenyl)vinyl]phenoxy}octyl polymethacrylate

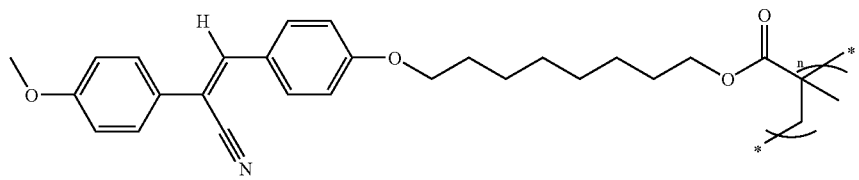

λ$_{max}$=348 nm
55% overall yield

Example A6

This example was prepared in a manner analogous to Example A1.

6-{4-[2-cyano-2-(4-hexoxyphenyl)vinyl]phenoxy}hexyl polymethacrylate

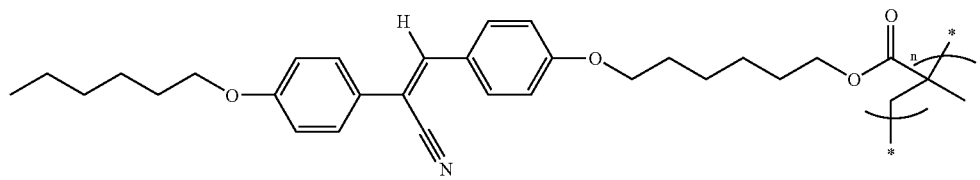

$\lambda_{max}$=346 nm
42% overall yield

Example A7

This example was prepared in a manner analogous to Example A1.

8-{4-[2-cyano-2-(4-hexoxyphenyl)vinyl]phenoxy}octyl polymethacrylate

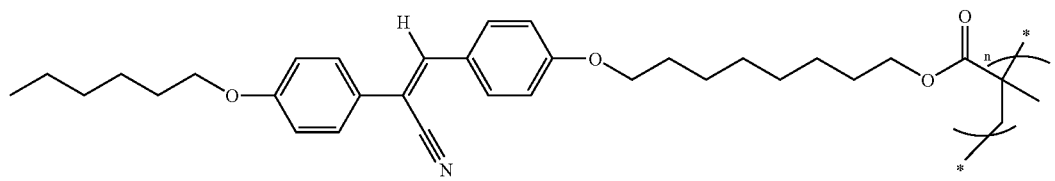

$\lambda_{max}$=350 nm
45% overall yield

Example A8

This example was prepared in a manner analogous to Example A1.

11-{4-[2-cyano-2-(3,4,5-trimethoxyphenyl)vinyl]phenoxy}undecyl polymethacrylate

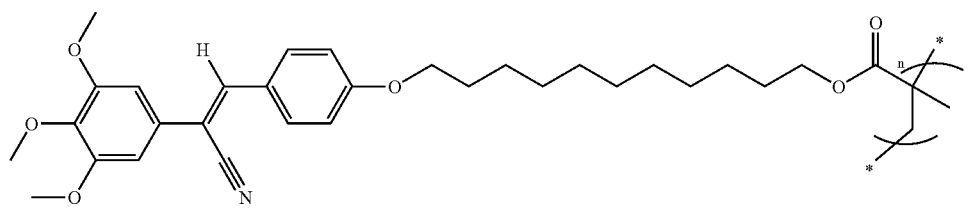

$\lambda_{max}$=349 nm
43% overall yield

Example A9

This example was prepared in a manner analogous to Example A1.

8-{4-[2-cyano-2-(4-methoxyphenyl)vinyl]-2-methoxyphenoxy}octyl polymethacrylate

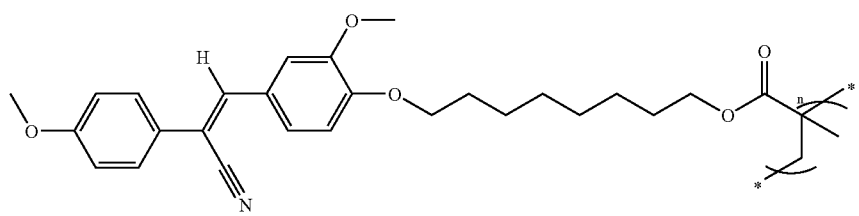

λ_max=360 nm
45% overall yield

Example A10

This example was prepared in a manner analogous to Example A1.

11-{4-[2-cyano-2-(2-naphtyl)-vinyl]phenoxy}undecyl methacrylate

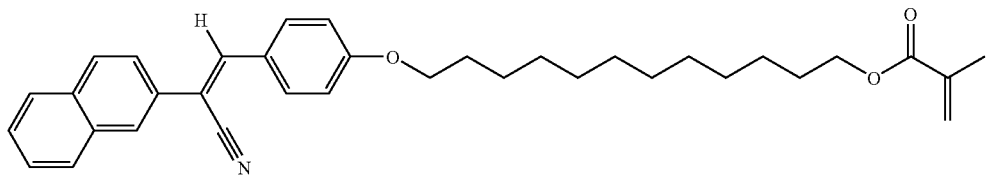

75% overall yield

Example A11

This example was prepared in a manner analogous to Example A1.

8-{4-[1-cyano-2-(1-naphtyl)-vinyl]phenoxy}octyl polymethacrylate

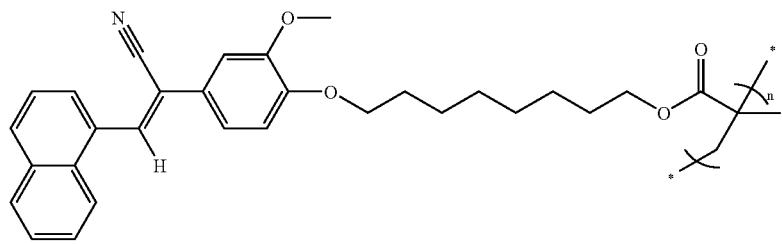

λ_max=342 nm
53% overall yield

Example A12

This example was prepared in a manner analogous to Example A1.

8-{4-[2-cyano-2-(3,4,5-trimethoxyphenyl)vinyl]-2-methoxyphenoxy}octyl polymethacrylate

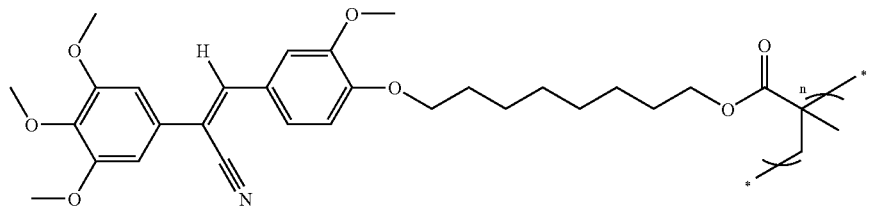

λ_max=358 nm

Example A13

This example was prepared in a manner analogous to Example A1.

11-{4-[2-cyano-2-(2,3,4,5,6-pentafluorophenyl)vinyl]phenoxy}undecyl methacrylate

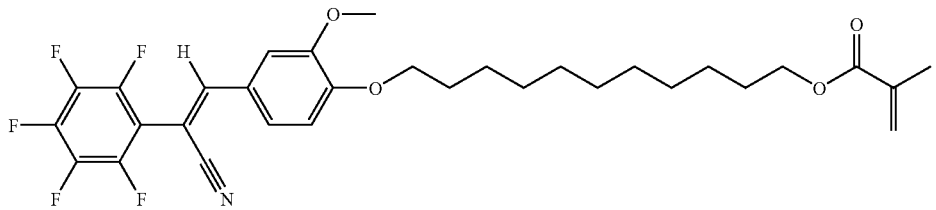

70% overall yield

Example A14

This example was prepared in a manner analogous to Example A1.

8-{2-[(2-cyano-2-phenylvinyl]-4-[2-cyano-2-phenylvinyl]phenoxy}octyl methacrylate

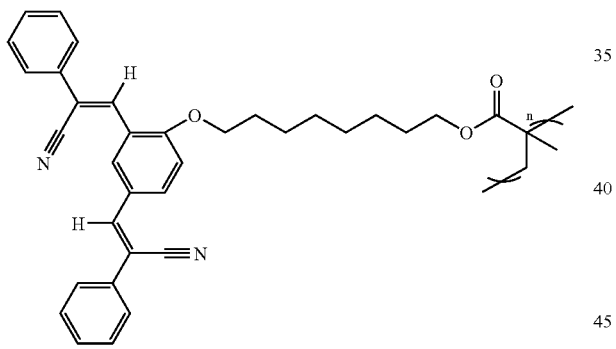

Example A15

This example was prepared in a manner analogous to Example A1.

3-[4-(allyloxy)phenyl]-2-phenylacrylonitrile

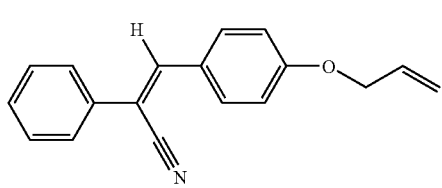

Example A16

This example was prepared in a manner analogous to Example A1.

3-[4-(allyloxy)phenyl]-2-(3,4-dimethoxyphenyl)acrylonitrile

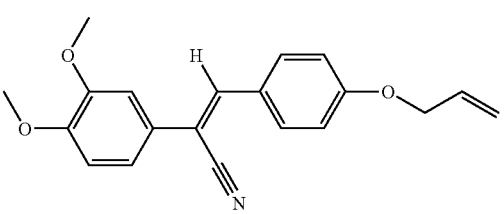

Example A17

This example was prepared in a manner analogous to Example A1.

2-{4-[2-cyano-2-(3,4-dimethoxyphenyl)vinyl]-2-methoxyphenoxy}ethyl polymethacrylate

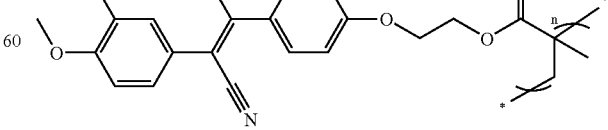

$\lambda_{max}$=362 nm

45% overall yield

Example A18

This example was prepared in a manner analogous to Example A1.

2-{4-[2-cyano-2-(3,4-dimethoxyphenyl)vinyl]-2-methoxyphenoxy}ethoxyethyl polymethacrylate

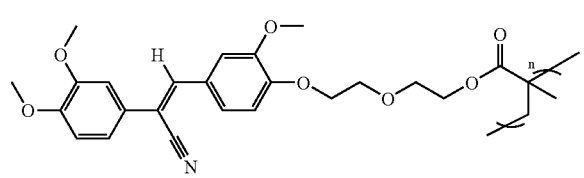

$\lambda_{max}$=364 nm

55% overall yield

Example A19

This example was prepared in a manner analogous to Example A1.

4-{4-[2-cyano-2-(3,4-dimethoxyphenyl)vinyl]-2-methoxyphenoxy}butyl polymethacrylate

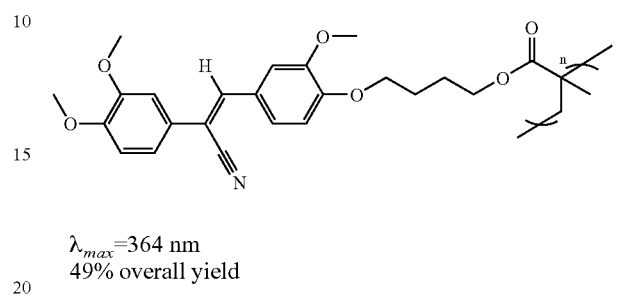

$\lambda_{max}$=364 nm
49% overall yield

Example A20

This example was prepared in a manner analogous to Example A1.

6-{4-[2-cyano-2-(3,4-dimethoxyphenyl)vinyl]-2-methoxyphenoxy}hexyl polymethacrylate

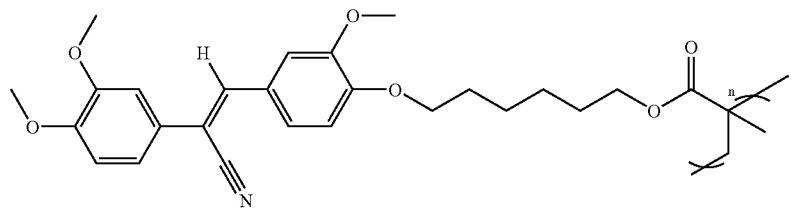

$\lambda_{max}$=364 nm
57% overall yield

Example A21

This example was prepared in a manner analogous to Example A1.

11-{4-[2-cyano-2-(3,4-dimethoxyphenyl)vinyl]-2-methoxyphenoxy}undecyl polymethacrylate

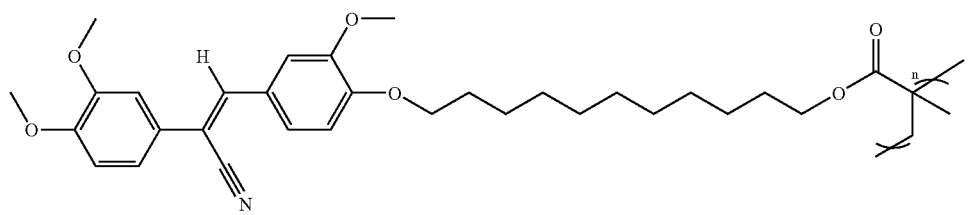

$\lambda_{max}$=362 nm
57% overall yield

Example A22

This example was prepared in a manner analogous to Example A1.

8-{4-[2-cyano-2-(3,4-dimethoxyphenyl)vinyl]-phenoxy}octyl polymethacrylate

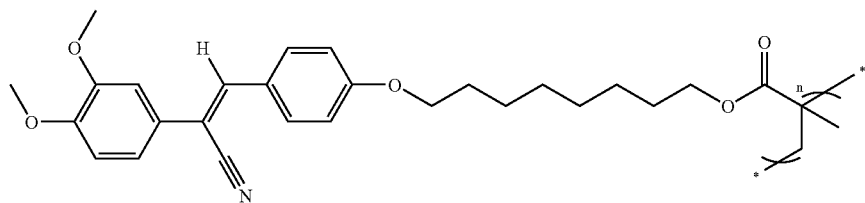

$\lambda_{max}$=356 nm
45% overall yield

Example A23

This example was prepared in a manner analogous to Example A1.

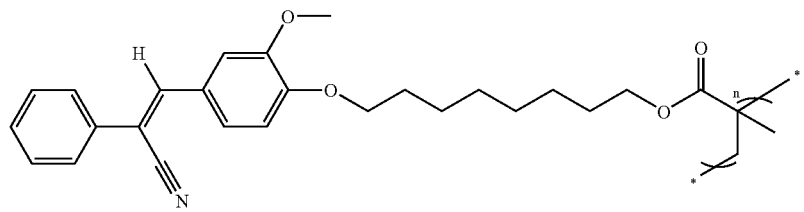

8-{4-[2-cyano-2-phenylvinyl]-2-methoxyphenoxy}octyl polymethacrylate $\lambda_{max}$=356 nm
35% overall yield

Example A24

This example was prepared in a manner analogous to Example A1.

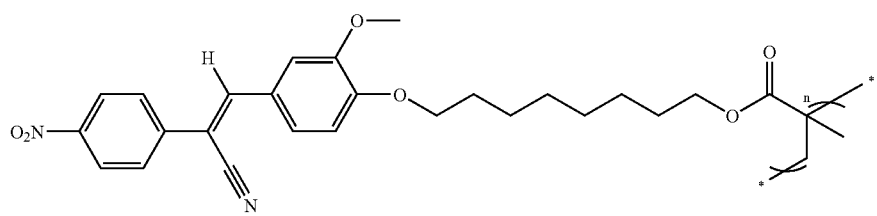

8-{4-[2-cyano-2-(4-nitrophenyl)vinyl]-2-methoxyphenoxy}octyl polymethacrylate

32% overall yield

Example A25

This example was prepared in a manner analogous to Example A1.

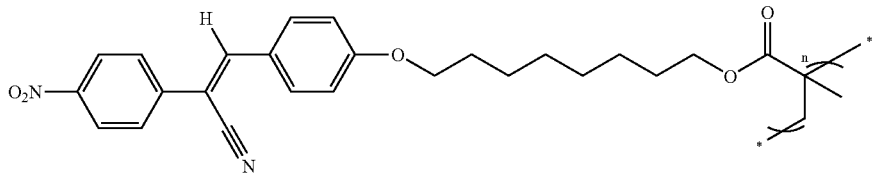

8-{4-[2-cyano-2-(4-nitrophenyl)vinyl]phenoxy}octyl polymethacrylate

35% overall yield

Example A26

This example was prepared in a manner analogous to Example A1.

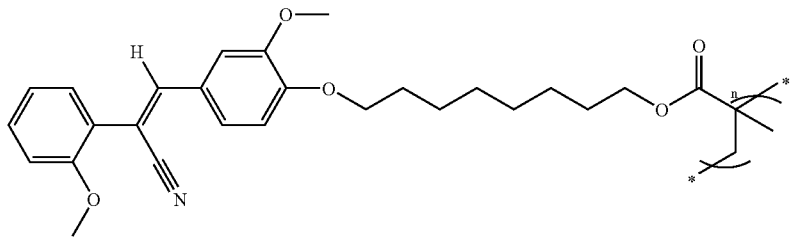

8-{4-[2-cyano-2-(2-methoxyphenyl)vinyl]-2-methoxyphenoxy}octyl polymethacrylate

45% overall yield

Example A27

Polyimide

Preparation of poly(amic acid) from cyclobutanedianhydride and 6-{4-[2-cyano-2-(4-hexoxyphenyl)vinyl]phenoxy}hexyl 3,5-diaminobenzoate

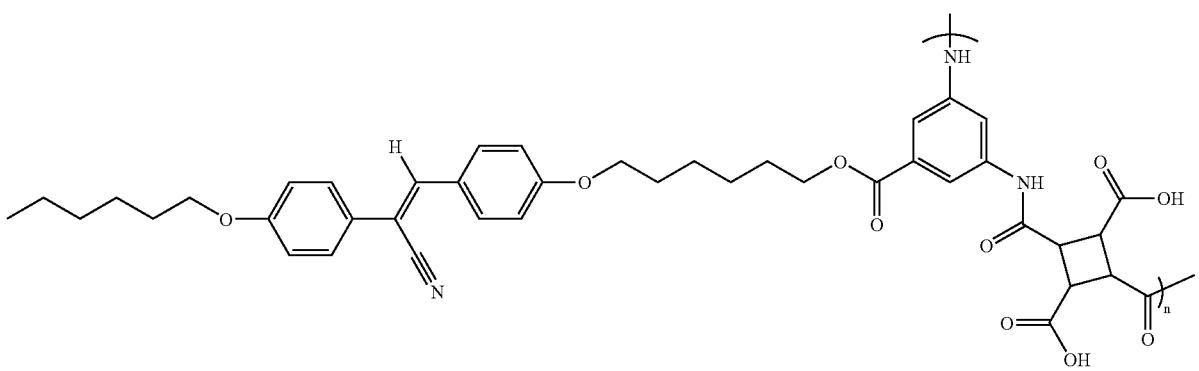

1.93 g (3.5 mmol) of 6-{4-[2-cyano-2-(4-hexoxyphenyl)vinyl]phenoxy}hexyl 3,5-diaminobenzoate were dissolved in 13.5 ml of tetrahydrofurane under argon. The solution was cooled to 0° C. and 617 mg (3.15 mmol) of cyclobutanedianhydride were suspended in the solution. After the mixture was stirred for 2 h at 0° C., a clear solution was obtained and 69 mg (0.35 mmol) of cyclobutanedianhydride were added. The solution was stirred for 20 h at room temperature. The solution was then diluted with 2 ml of tetrahydrofurane and precipitated in 250 ml of tert-butyl methyl ether. The precipitate was then filtrated, washed with tert-butyl methyl ether and vacuum dried overnight. 2.66 g of the brown solid was dissolved in 9 ml of tetrahydrofurane, filtrated over a 0.45 μm PTFE filter and precipitated in 700 ml of deionised water. The polymer was dried at room temperature under vacuum during 24 h.

2.42 g of poly(amic acid) from cyclobutanedianhydride and 6-{4-[2-cyano-2-(4-hexoxyphenyl)vinyl]phenoxy}hexyl 3,5-diaminobenzoate as a yellow solid were obtained (96% yield).

Preparation of 6-{4-[2-cyano-2-(4-hexoxyphenyl)vinyl]phenoxy}hexyl 3,5-diaminobenzoate

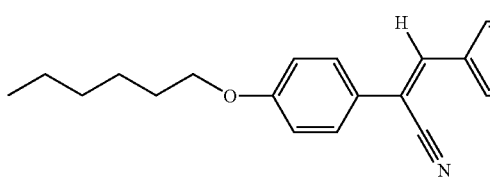

3.00 g (4.9 mmol) of 6-{4-[2-cyano-2-(4-hexoxyphenyl)vinyl]phenoxy}hexyl 3,5-dinitrobenzoate were dissolved in a mixture of 59 ml of tetrahydrofurane and 6 ml of water. The addition of 7.90 g (29.2 mmol) of iron(III) chloride hexahydrate gave a yellow suspension to which 3.18 g (48.7 mmol) of Zn dust were added portionwise within 1 h. After 1 h 30 reaction under argon, the reaction mixture filtrated over celite and the filtrate was thrown on 300 ml of Water. The precipitate was filtrated and dissolved in ethyl acetate. The organic phase was washed with water, dried with sodium sulfate and evaporated to dryness. 2.60 g of a brown solid were obtained which were purified by column chromatography using ethyl acetate/toluene 1:1 as an eluent and finally crystallized from ethyl acetate/hexane 2:5.

1.93 g of 6-{4-[2-cyano-2-(4-hexoxyphenyl)vinyl]phenoxy}hexyl 3,5-diaminobenzoate were as a beige solid were obtained (71% yield).

Preparation of 6-{4-[2-cyano-2-(4-hexoxyphenyl)vinyl]phenoxy}hexyl 3,5-dinitrobenzoate

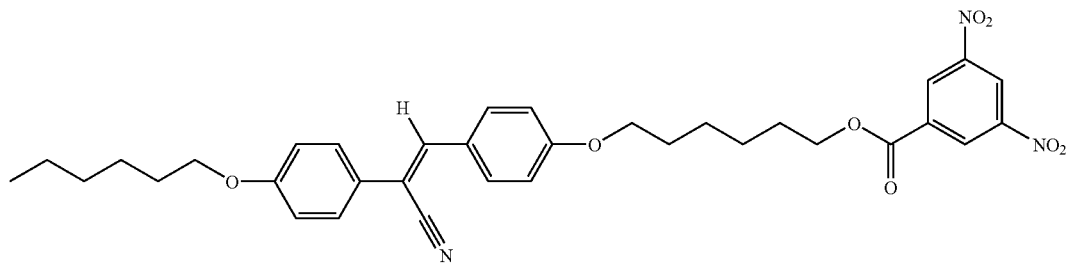

2.3 g (5.4 mmol) of 6-{4-[2-cyano-2-(4-hexoxyphenyl) vinyl]phenoxy}hexan-1-ol were dissolved in 60 ml of methylene chloride. 92 mg (0.75 mmol) of 4-dimethylaminopyridine were added and 1.44 g (7.5 mmol) of N-(3-dimethylaminopropyl)-N'-ethylcarbodiimide hydrochloride (EDC hydrochloride) were added at 0° C. under argon. The solution was allowed to react at room temperature for 15 h. The organic phase was then washed with water, dried with sodium sulfate and evaporated to dryness. 3.56 g of an orange solid were crystallized from ethyl acetate/hexane 2:5. The yellow crystals were filtrated, washed with hexane and dried overnight at 40° C.

3.00 g of 6-{4-[2-cyano-2-(4-hexoxyphenyl)vinyl] phenoxy}hexyl 3,5-dinitrobenzoate as a yellow solid were obtained (91% yield).

Preparation of 6-{4-[2-cyano-2-(4-hexoxyphenyl) vinyl]phenoxy}hexan-1-ol

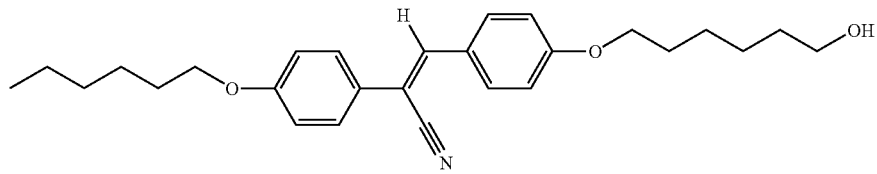

6-{4-[2-cyano-2-(4-hexoxyphenyl)vinyl]phenoxy}hexan-1-ol was synthesized in a similar manner as described in Example A1.

Example A28

Copolymer 1.00 g (1.906 mmol) of 2-methoxy-4-[(1E)-3-methoxy-3-oxo-1-propenyl]phenyl 4-{[8-(methacryloyloxy)octyl]oxy}) benzoate, 21.4 mg (0.039 mmol) of 11-{4-[2-cyano-2-(3,4,5-trimethoxyphenyl)vinyl]phenoxy}undecyl methacrylate and 4.8 mg (0.020 mmol) of 1,1'-azobis(cyclohexanecarbonitrile) were dissolved in 4.9 ml of N,N-dimethylformamide. The polymerization was carried out as described in Example A1.

900 mg of copolymer as a white powder were obtained (88% yield).

$\lambda_{max}$=276 nm

Example A29

Preparation of polymethacrylate of 6-(methacryloyloxy)hexyl-2,3-diphenylacrylate

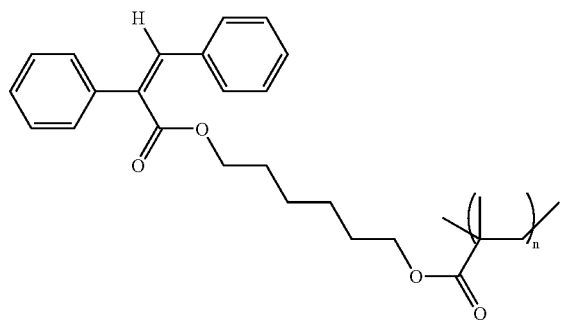

960 mg (2.5 mmol) of 6-(methacryloyloxy)hexyl-2,3-diphenylacrylate and 6.0 mg (0.024 mmol) of 1,1'-azobis (cyclohexanecarbonitrile) were dissolved in 15 ml of N,N-dimethylformamide. The solution was purged with argon (several vacuum-argon cycles) and heated to 80° C. for 16 h. The polymer which was isolated by precipitation in 150 ml of methanol was filtrated, washed with water and dried overnight at 40° C. under vacuum.

660 mg of polymethacrylate of 6-(methacryloyloxy)hexyl-2,3-diphenylacrylate as a white solid were obtained (69% yield).

$\lambda_{max}$=284 nm

Preparation of 6-(methacryloyloxy)hexyl-2,3-diphenylacrylate

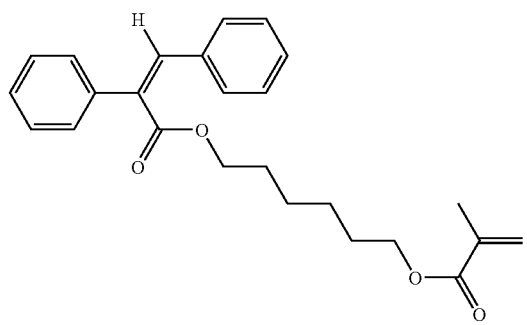

1.71 g (14.5 mmol) of 6-hydroxyhexyl-2,3-diphenylacrylate and 1.50 g (17.4 mmol) of methacrylic acid were dissolved in 30 ml of methylene chloride. 248 mg (2.0 mmol) of 4-dimethylaminopyridine were added at room temperature. The solution was cooled to 0° C. and 6.75 g (35.2 mmol) of N-(3-dimethylaminopropyl)-N'-ethylcarbodiimide hydrochloride (EDC hydrochloride) were added. The solution was then allowed to heat up to room temperature. After 48 h reaction, the solution was then washed with water, dried with sodium sulfate and evaporated to dryness. The orange oil was purified by column chromatography using ethyl acetate/toluene 1:19 as an eluent.

2.27 g of 6-(methacryloyloxy)hexyl-2,3-diphenylacrylate as an yellow oil were obtained (91% yield).
$\lambda_{max}$=284 nm Preparation of 6-hydroxyhexyl-2,3-diphenylacrylate

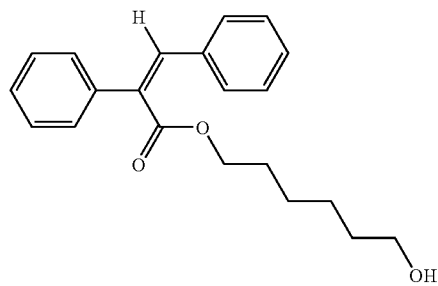

3.50 g (15.6 mmol) of 2,3-diphenylacrylic acid were dissolved in 28 ml of N,N-dimethylformamide. 2.6 ml (17.2 mmol) of 1,8-diazabicyclo[5.4.0]undec-7-ene (DBU) and 0.634 g (1.7 mmol) of tetrabutylammonium iodide were added to the mixture. 2.56 g (18.7 mmol) of 6-chlorohexan-1-ol were dissolved in 17 ml of N,N-dimethylformamide and added dropwise to the reaction solution which was then heated at 65° C. After 20 h, the reaction mixture was extracted with methylene chloride and water. The organic phase was dried over sodium sulfate, filtrated and evaporated to dryness. The orange oil was purified by column chromatography using ethyl acetate/toluene 1:3 as an eluent.

4.72 g of 6-hydroxyhexyl-2,3-diphenylacrylate as an yellow oil were obtained (93% yield).

Example A30

This example was prepared in a manner analogous to Example A21.

Polymethacrylate of 2-(methacryloyloxy)1-methyl-ethyl-2,3-diphenylacrylate

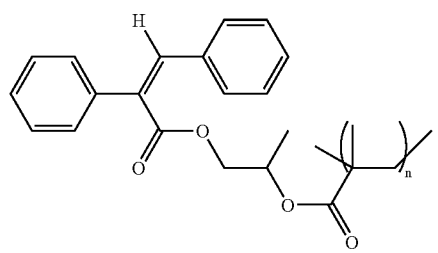

$\lambda_{max}$=284 nm

B) Application Examples

Example B1

Application as Photoalignment Material

This example illustrates how an alignment layer can be made of a material comprising functionalized photoreactive compounds according to the invention.

A two percent by weight solution S of the photoreactive polymer formulation of Example A1 was prepared using cyclopentanone as a solvent. The solution was stirred for 30 minutes at room temperature.

Solution S was spin-coated at 3000 rpm onto a glass substrate, which was then dried for 10 minutes at 180° C.

The substrates were subsequently irradiated with polarized UVA light from a mercury high-pressure lamp, the direction of incidence being perpendicular to the substrate surface. For the polarization a Moxtec polarizer was used. By varying the exposure duration, different irradiation energies of 1, 2, 4, 8, 16, 32, and 64 mJ/cm² were applied.

The layers thus prepared showed the desired alignment properties for liquid crystals; an illustrative example is given in Example B2 below.

Analogous experiments were made for the polymers and monomers of all Examples A2 ff. described above. Also in these cases the layers showed the desired alignment properties.

Example B2

Orientation of a Liquid Crystalline Polymer (LCP)

This example illustrates the use of an alignment layer comprising functionalized photoreactive compounds according to the invention to orient cross-linkable monomers during the making of a liquid crystalline polymer (LCP).

A mixture $M_{LCP}$ was prepared comprising the following liquid crystalline diacrylate monomers:

Mon1:

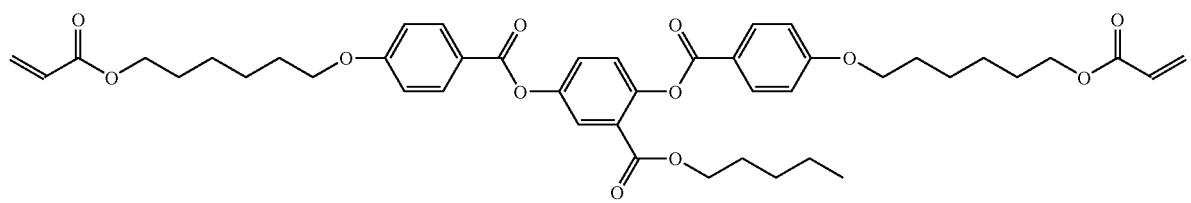

Mon2:

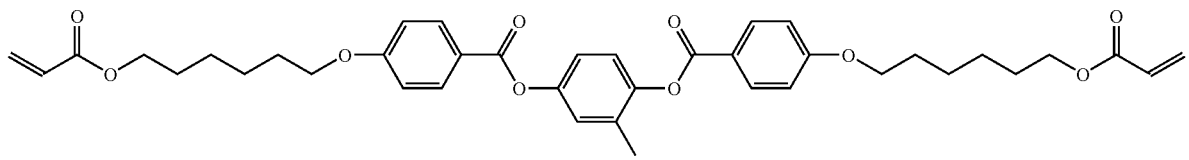

Mon3:

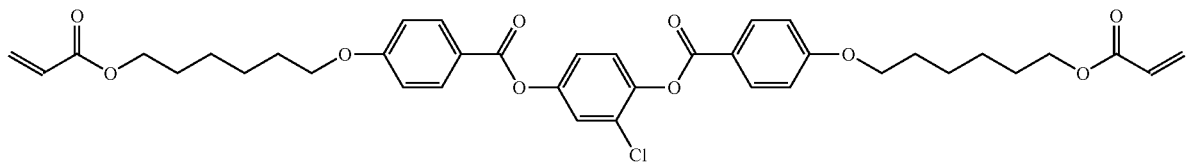

In addition to the diacrylate monomers, photoinitiator IRGACURE™ 369 from Ciba SC as well as BHT which served as an inhibitor were added to the mixture. Thus the composition of mixture $M_{LCP}$ was as follows:

| | |
|---|---|
| Mon1 | 77 wt. % |
| Mon2 | 14.5 wt. % |
| Mon3 | 4.7 wt. % |
| IRGACURE ™ 369 | 1.9 wt. % |
| BHT | 1.9 wt. % |

Finally, a solution S(LCP) was made by dissolving 20 wt. % of mixture $M_{LCP}$ in anisole.

Like in example B1, to produce an alignment layer the solution S was spincoated on a glass plate, dried and subsequently exposed to polarized UV-light, having an incidence angle of 70°. Then diacrylate solution S(LCP) was spincoated at 800 rpm for 2 minutes on top of the alignment layer. To cross-link the diacrylates the plate was then exposed to isotropic UV-light under nitrogen atmosphere for 5 minutes.

Between crossed polarizers it was found that the LCP layer was well aligned according to the direction of the polarized UV-light used to irradiate the alignment layer.

The invention claimed is:
1. Compounds according to the general formula (I):

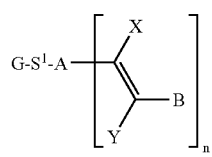

(I)

wherein
A and B each independently are a ring system of 5 to 40 atoms, wherein each ring system includes at least one unsaturation directly connected via electron conjugation (π-π bonding) to the double bond shown in formula (I), wherein the ring system may be unsubstituted or mono- or poly-substituted by
(i) a halogen atom,
(ii) a hydroxyl group and/or
(iii) a polar group like nitro, nitrile or a carboxy group, and/or
(iv) a cyclic, straight-chain or branched alkyl residue having from 1 to 30 carbon atoms, which is unsubstituted, mono- or poly-substituted by methyl, fluorine and/or chlorine, wherein one or more, preferably non-adjacent —$CH_2$— groups independently may be replaced by a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C— and —Si($CH_3$)$_2$—O—Si($CH_3$)$_2$—, an aromatic or an alicyclic group, wherein $R^1$ is a hydrogen atom or lower alkyl; and/or
(v) an acryloyloxy, alkoxy, alkylcarbonyloxy, alkyloxocarbonyloxy, methacryloyloxy, vinyl, allyl, vinyloxy and/or allyloxy group, having from 1 to 20 carbon atoms, preferably having from 1 to 10 carbon atoms,
$S^1$ is a single covalent bond or a spacer unit;
n is 1, 2 or 3;
X and Y represent groups of which one is a hydrogen atom and the other is an electron withdrawing group, which preferably is selected from the groups —$COR^2$, —$COOR^2$, —$COSR^2$, —CO—$NR^2$, —$SOR^2$, —$SOCF_3$, —$SO_2CF_2COR^2$, —$SOOR^2$, —C≡S, —$NO_2$, —$CF_3$, —CN, wherein $R^2$ is a hydrogen atom or a straight-chain or branched alkyl or alkylene group, having from 1 to 16 carbon atoms, wherein one or more, preferably non-adjacent —$CH_2$— groups independently may be replaced by a group, selected from —O—, —CO—, —CO—O—, —O—CO—, —C=C—, —C≡C—, or by an optionally substituted alkyl, or by a polymerizable group,
G is a hydrogen atom, optionally substituted alkyl, or a polymerizable group
with the proviso, that when Y is —CN and A is unsubstituted phenylene, then B may not be phenylene para-substituted by —CN, —$NO_2$ or —COOH; and
with the proviso that if ring system A is 1,4-phenylene, which is unsubstituted or substituted with halogen, cyano and/or nitro, and ring system B is 1,4-phenylene, which is unsubstituted or substituted with halogen, cyano and/or nitro, or pyrimidine-2,5-diyl, pyridine-2,5-diyl, 2,5-thiophenylenediyl, 2,5-furanylene, 1,4-naphthylene or 2,6-naphthylene, then X is different from —CN and —COO-alkyl having from 1 to 12 carbon atoms.
2. Compounds according to claim 1:
wherein ring systems A and B are a carbocyclic or heterocyclic ring group selected from a monocyclic ring of four to six atoms, or two adjacent monocyclic rings of five or six atoms, or a fused bicyclic ring system of eight, nine or ten atoms, or a fused tricyclic ring system of thirteen or fourteen atoms.

3. Compounds according to claim 1 or 2:
wherein ring systems A and B are selected from pyrimidine, pyridine, thiophenylene, furanylene, phenanthrylene, naphthylene, or phenylene.

4. Compounds according to claim 1:
wherein $S^1$ is a single bond or a straight-chain or branched alkylene residue having 1 to 24 carbon atoms, which is unsubstituted, mono-substituted by cyano or halogen, or poly-substituted by halogen and wherein one or more, preferably non-adjacent $CH_2$ groups independently may be replaced by a heteroatom or a group selected from but not limited to —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —C=C—, —C≡C—, —O—CO—O— and —$Si(CH_3)_2$—O—$Si(CH_3)_2$—, wherein $R^1$ is a hydrogen atom or lower alkyl.

5. Compounds according to claim 4:
wherein $S^1$ is a single bond or a straight-chain or branched alkylene residue, having from 1 to 24 carbon atoms, wherein one or more, preferably non-adjacent —$CH_2$— groups independently may be replaced by a group selected from —O—, —CO—, —COO—, —OCO—, —C=C—, —C≡C—.

6. Compounds according to claim 1, wherein:
the electron withdrawing groups for X and Y are —$COR^2$, —$COOR^2$, —$SOCF_3$, —$NO_2$, —$CF_3$, —CN, preferably —CN, —$COR^2$ or —$COOR^2$, more preferably —CN or —$COOR^2$, wherein $R^2$ is a hydrogen atom or a straight-chain or branched alkyl or alkylene group, having from 1 to 8 carbon atoms, wherein one or more, preferably non-adjacent —$CH_2$— groups independently may be replaced by a group, preferably selected from —O—, —CO—, —CO—O—, —O—CO—, —C=C—, —C≡C—, or by an optionally substituted alkyl, or by a polymerizable group.

7. Compounds according to claim 1, wherein:
the polymerizable group is selected from acrylate, methacrylate, 2-chloroacrylate, 2-phenylacrylate, optionally N-lower alkyl substituted acrylamide, methacrylamide, 2-chloroacrylamide, 2-phenylacrylamide, vinyl ether and ester, allyl ether and ester epoxy, styrene derivatives, siloxanes, imide monomers, amic acid monomers and their esters, amidimides, maleic acid derivatives, fumaric acid derivatives, urethane monomers or their corresponding homo- and co-polymers.

8. Compounds according to claim 1:
with the proviso that if ring systems A and B are independently selected from 1,4-phenylene, which is unsubstituted or substituted with halogen, cyano and/or nitro and in which 1 or 2 CH groups can be replaced by nitrogen, or 2,5-thiophenediyl, 2,5-furanylene, 1,4- or 2,6-naphthylene, in which a CH group can be replaced by nitrogen, then X or Y are different from —CN, —COO-alkyl having from 1 to 12 carbon atoms.

9. Compounds according to claim 1 wherein:
A is a ring system of formula (II):

  (II)

and
B is a ring system of formula (III):

  (III)

wherein:
$C^1$, $C^2$ each independently are a non-aromatic or aromatic, optionally substituted, carbocyclic or heterocyclic group of 5 to 14 atoms, preferably connected to each other at the opposite positions via the bridging groups $Z^1$ and $Z^2$,
$Z^1$, $Z^2$ each independently are a single bond or a bridging group preferably selected from —CH(OH)—, —O—, —$CH_2$(CO)—, —SO—, —$CH_2$(SO)—, —$SO_2$—, —$CH_2(SO_2)$—, —COO—, —OCO—, —$COF_2$—, —$CF_2$CO—, —S—CO—, —CO—S—, —SOO—, —OSO—, —$CH_2$—$CH_2$—, —O—$CH_2$—, —$CH_2$O—, —CH=CH—, —C≡S—, —SH=CH—COO—, —OCO—CH=CH—, —$C(CH_3)$=N—, —O—CO—O—, —N=N—, or a short alkyl spacer of 1 to 6 carbon atoms, preferably 1 to 3 carbon atoms,
a is 0, 1, 2 or 3,
with the proviso that $C^2$, which is directly connected to the double bond, is unsaturated and conjugated to it.

10. Compounds of formula (I) according to claim 1:

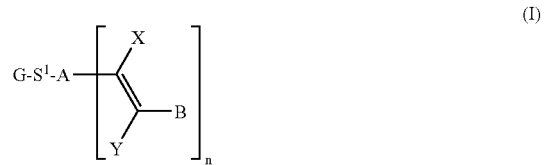  (I)

wherein
A is a ring system of formula (II):

  (II)

and
B is a ring system of formula (III):

  (III)

wherein:
$C^1$, $C^2$ each independently are a non-aromatic or aromatic, optionally substituted, carbocyclic or heterocyclic group of 5 to 14 atoms, preferably connected to each other at the opposite positions via the bridging groups $Z^1$ and $Z^2$,
$Z^1$, $Z^2$ each independently are a single bond or a bridging group preferably selected from —CH(OH)—, —O—, —$CH_2$(CO)—, —SO—, —$CH_2$(SO)—, —$SO_2$—, —$CH_2(SO_2)$—, —COO—, —OCO—, —$COF_2$—, —$CF_2$CO—, —S—CO—, —CO—S—, —SOO—, —OSO—, —$CH_2$—$CH_2$—, —O—$CH_2$—, —$CH_2$O—, —CH=CH—, —C≡S—, —SH=CH—COO—, —OCO—CH=CH—, —CH=N—, —$C(CH_3)$=N—, —O—CO—O—, —N=N—, or a short alkyl spacer of 1 to 6 carbon atoms, preferably 1 to 3 carbon atoms,
a is 0, 1, 2 or 3, preferably 0 or 1;
with the proviso that $C^2$, which is directly connected to the double bond, is unsaturated and conjugated to it;
$S^1$ is a single bond or a spacer unit such as a straight-chain or branched alkylene residue, having from 1 to 24 carbon atoms, wherein one or more —$CH_2$— groups independently may be replaced by a group selected from —O—, —CO—, —COO—, —OCO—, —C=C—, —C≡C—;
X and Y represent groups of which one is a hydrogen atom and the other is an electron withdrawing group selected from the groups —$COR^2$☐, —$COOR^2$, —$SOCF_3$, —NO₂, —CF₃, —CN, preferably —CN, —COR² or —COOR², more preferably —CN or —COOR², wherein R² is a hydrogen atom or a straight-chain or branched alkyl or alkylene group, having from 1 to 8 carbon atoms, wherein one or more, preferably non-adjacent —CH₂— groups independently may be replaced by a group, preferably selected from —O—, —CO—, —CO—O—, —O—CO—, —C=C—, —C≡C—, or by an optionally substituted alkyl, or by a polymerizable group; and n is 1, 2 or 3, preferably 1 or 2;

G is a hydrogen atom, optionally substituted alkyl, or a polymerizable group.

11. Compounds according claim 9, wherein
a is 0 or 1, preferably 0.

12. Compounds according to claim 9, wherein
$C^1$, $C^2$ in formula (II) independently have one of the following meanings:

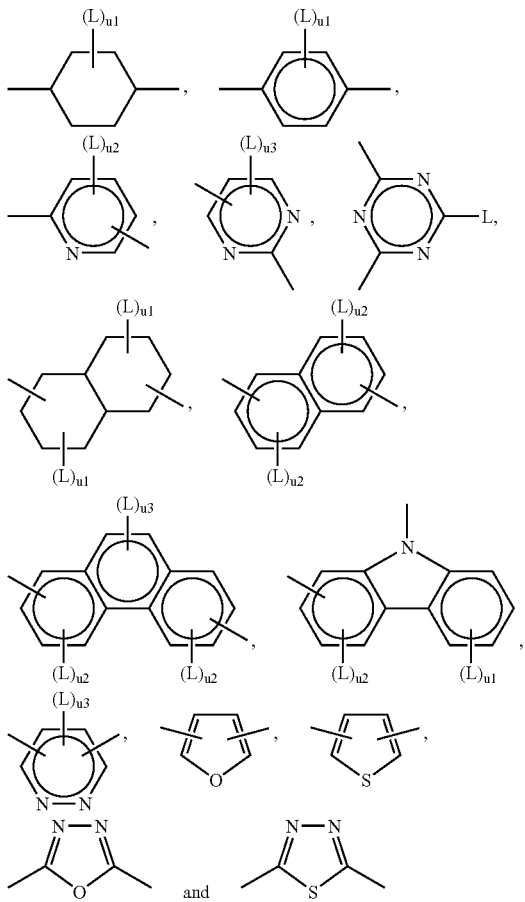

wherein

L is halogen, hydroxyl, and/or a polar group such as nitro, cyano or carboxy, and/or acryloyloxy, alkoxy, alkylcarbonyloxy, alkyloxocarbonyloxy, methacryloyloxy, vinyl, vinyloxy, allyl, allyloxy, and/or a cyclic, straight-chain or branched alkyl residue, which is unsubstituted, mono- or poly-substituted by fluorine and/or chlorine, and/or a silane group, and/or a siloxane group, wherein the alkyl residue has from 1 to 20 C-atoms, wherein one or more, preferably non-adjacent, —CH₂— groups independently may be replaced by a group, preferably selected from —O—, —CO—, —COO—, —OCO—, —C=C—, —C≡C—, —Si(CH₃)₂—, —Si(CH₃)₂—O—Si(CH₃)₂—, u1 is 0, 1, 2, 3, or 4,
u2 is 0, 1, 2, or 3, and
u3 is 0, 1, or 2
with the proviso that $C^2$, which is directly connected to the double bond, is unsaturated and conjugated to it.

13. Functionalized photoreactive compounds according to claim 9 wherein
$C^1$, $C^2$ are phenanthryl or phenanthrylene, biphenyl or biphenylene, naphthyl or naphthylene, phenyl or phenylene, pyridine or pyridinylene; preferably naphthyl or naphthylene, phenyl or phenylene, pyridine or pyridinylene.

14. Compounds according to claim 12
wherein L is selected from fluorine, nitro, cyano, carboxy, and/or acryloyloxy, methacryloyloxy, vinyl, vinyloxy, allyl, allyloxy, and/or a cyclic, straight-chain or branched alkyl residue of 1 to 12 C-atoms, which is unsubstituted, mono- or poly-substituted by fluorine, and/or hydroxyl, and/or —Si(CH₃)₃, and/or —Si(CH₃)₂—O—Si(CH₃)₃ and in which, preferably non-adjacent —CH₂— groups independently may be replaced by a group, preferably selected from —O—, —COO—, —OCO—, —C=C—, —C≡C—, —Si(CH₃)₂— and/or —Si(CH₃)₂—O—Si(CH₃)₂—.

15. Compounds according to claim 12 wherein L is selected from fluorine, nitro, cyano, alkyl, alkoxy, amino, alkylamino, dialkylamino or thioalkyl.

16. Compounds according to claim 9 wherein:
$Z^1$, $Z^2$ each independently are a single bond —O—, —CH₂(CO)—, —COO—, —OCO—, —CH₂—CH₂—, —OCO—CH=CH—, —N=N—, or a short alkyl spacer of 1 to 3 carbon atoms.

17. Compounds of formula (I)—according to claim 1:

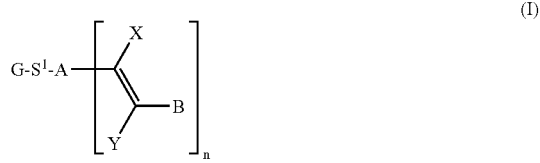

wherein
A is a ring system of formula (II):

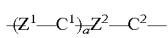

and
B is a ring system of formula (III):

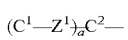

wherein:
$C^1$, $C^2$ each independently are naphthyl or naphthylene, phenyl or phenylene, pyridine or pyridinylene, which is unsubstituted or mono- or poly-substituted by fluorine, nitro, cyano, alkyl, alkoxy, amino, alkylamino, dialkylamino or thioalkyl;
$Z^1$, $Z^2$ each independently are a single bond or —O—, —CH₂(CO)—, —COO—, —OCO—, —CH₂—CH₂—, —OCO—CH=CH—, —N=N—, or a short alkyl spacer of 1 to 3 carbon atoms,
a is 0 or 1, preferably 0
$S^1$ is a single bond or a spacer unit such as a straight-chain or branched alkylene group, having from 1 to 24 carbon atoms, wherein one or more —$CH_2$— groups may independently replaced by a group, preferably selected from —O—, —COO—, —OCO—, —C=C—;

n is 1 or 2;

X,Y represent groups of which one is a hydrogen atom and the other is an electron withdrawing group selected from the groups —$COOR^2$ or CN, wherein $R^2$ is hydrogen, a straight-chain or branched alkyl or alkylene chain, having from 1 to 12 carbon atoms, wherein one or more —$CH_2$— groups independently may be replaced by a group, selected from —O—, —CO—, —COO—, —OCO—, —C=C—, —C≡C—, or by optionally substituted alkyl, or by a polymerizable group selected from acrylate, methacrylate, vinyl ether and ester, epoxy, styrene derivatives, siloxanes, imide monomers, amic acid monomers or their corresponding homo- and co-polymers;

G is a hydrogen atom, optionally substituted alkyl, a polymerizable group selected from acrylate, methacrylate, vinyl ether and ester, epoxy, styrene derivatives, siloxanes, imide monomers, amic acid monomers or their corresponding homo- and co-polymers.

18. Compounds according to claim 1 which are part of an oligomer, a dendrimer or a polymer, which may be a homopolymer or a copolymer.

19. Oligomer, dendrimer or polymer comprising at least one compound according to claim 1 as monomer unit.

20. Oligomer, dendrimer or polymer according to claim 19 in form of a gel or a network.

21. Oligomer, dendrimer or polymer according to claim 19 further comprising additives such as silane-containing compounds, epoxy-containing crosslinking agents, a photosensitiser, a photoradical generator and/or a cationic photoinitiator.

22. Oligomer, dendrimer or polymer according to claim 19 further comprising in admixture other polymers, oligomers, monomers, photoactive polymers, photoactive oligomers and/or photoactive monomers.

23. Oligomer, dendrimer or polymer according to claim 19 which is applied to a support and crosslinked by irradiation with linearly polarised light.

24. Method for the preparation of an alignment layer for liquid crystals by photoreacting one or more oligomers, dendrimers or polymers according to claim 19.

25. Alignment layer comprising one or more oligomers, dendrimers or polymers according to claim 19.

26. Alignment layer according to claim 25 having a pattern of different alignment directions.

27. Method for the preparation of an alignment layer as described in claim 25, wherein one or more of the oligomers, dendrimers or polymers preferably in solution is applied to a support, which is optionally provided with an electrode, and optionally after prior imidisation, said applied oligomers, dendrimers or polymers are crosslinked by irradiation with linearly polarized light.

28. Method according to claim 27 wherein the alignment direction is controlled by photoalignment methods.

29. Optical and electro-optical unstructured or structured constructional elements preferably liquid crystal display cells, multi-layer and hybrid layer elements comprising at least one alignment layer as described in claim 25.

\* \* \* \* \*

UNITED STATES PATENT AND TRADEMARK OFFICE
CERTIFICATE OF CORRECTION

PATENT NO.       : 7,959,990 B2
APPLICATION NO.  : 12/067376
DATED            : June 14, 2011
INVENTOR(S)      : Zoubair Mohammed Cherkaoui et al.

It is certified that error appears in the above-identified patent and that said Letters Patent is hereby corrected as shown below:

In column 102, line 67 (Claim 10), please delete "from the groups —$COR^2$□, —$COOR^2$, —$SOCF_3$," and insert therefor -- from the groups —$COR^2$, —$COOR^2$, —$SOCF_3$, --.

Signed and Sealed this
Nineteenth Day of April, 2016

Michelle K. Lee
*Director of the United States Patent and Trademark Office*